United States Patent
Kondo et al.

(10) Patent No.: US 7,342,601 B2
(45) Date of Patent: Mar. 11, 2008

(54) COMMUNICATION SYSTEM, COMMUNICATION DEVICE, SEATING-ORDER DETERMINATION DEVICE, COMMUNICATION METHOD, RECORDING MEDIUM, GROUP-DETERMINATION-TABLE GENERATING METHOD, AND GROUP-DETERMINATION-TABLE GENERATING DEVICE

(75) Inventors: Tetsujiro Kondo, Tokyo (JP); Tomoyuki Ohtsuki, Kanagawa (JP); Junichi Ishibashi, Saitama (JP); Koichi Fujishima, Chiba (JP)

(73) Assignee: Sony Corporation, Tokyo (JP)

( * ) Notice: Subject to any disclaimer, the term of this patent is extended or adjusted under 35 U.S.C. 154(b) by 1509 days.

(21) Appl. No.: 09/972,384

(22) Filed: Oct. 5, 2001

(65) Prior Publication Data

US 2003/0101219 A1    May 29, 2003

(30) Foreign Application Priority Data

Oct. 6, 2000    (JP)    ............................. 2000-313125

(51) Int. Cl.
*H04N 7/14*    (2006.01)
(52) U.S. Cl. ............................... 348/14.08; 348/14.11; 348/14.12
(58) Field of Classification Search .. 348/14.01–14.09, 348/14.1, 14.11–14.13, 14.16; 370/260, 370/261; 715/753; 709/204
See application file for complete search history.

(56) References Cited

U.S. PATENT DOCUMENTS 6,606,111 B1 *    8/2003    Kondo et al. ............ 348/14.01

FOREIGN PATENT DOCUMENTS

| JP | 408256316 A | * | 10/1996 |
| JP | 411234640 A | * | 8/1999 |

* cited by examiner

*Primary Examiner*—Melur Ramakrishnaiah
(74) *Attorney, Agent, or Firm*—Frommer Lawrence & Haug LLP; William S. Frommer

(57) ABSTRACT

In a communication system having at least three communication devices communicating with each other, a seating-order determination device for generating seating-order information for information sent from each communication device and for transmitting the seating-order information to each communication device is provided. Each communication device controls the output position of each information according to the seating-order information to output the information sent from the other communication devices in a seating order corresponding to the seating-order information. The seating order is always automatically changed to the most appropriate condition according to the progress of a conference and the state of conversations to provide the user with a comfortable conference environment and a comfortable communication environment.

71 Claims, 49 Drawing Sheets

FIG. 6

| INDIVIDUAL NUMBER | ATTENTION-DESTINATION NUMBER | WHETHER REGISTRATION HAS BEEN MADE TO GROUP TABLE |
|---|---|---|
| H1 | A0 | × |
| H2 | A0 | × |
| H3 | A0 | × |
| H4 | A0 | × |
| H5 | A0 | × |
| ⋮ | ⋮ | ⋮ |
| Hn | A0 | × |

FIG. 7

| GROUP NUMBER | NUMBER OF MEMBERS | MEMBER |
|---|---|---|
| G1 | 0 | |
| G2 | 0 | |
| G3 | 0 | |
| ⋮ | ⋮ | ⋮ |
| Gn | 0 | |

FIG. 9

```
START
  ↓
S41: SET ATTENTION-DISTINATION TABLE ACCORDING TO GROUP-DETERMINATION INFORMATION.
SET "WHETHER REGISTRATION HAS BEEN MADE TO GROUP TABLE" COLUMN TO ALL "X" IN ATTENTION-DESTINATION TABLE
  ↓
S42: SET "NUMBER OF MEMBERS" COLUMN TO ALL 0 AND "MEMBER" COLUMN TO ALL NULL IN GROUP TABLE
  ↓
S43: SET GROUP TABLE ACCORDING TO ATTENTION-DESTINATION TABLE FOR EACH OF H1 TO Hn
  ↓
END
```

FIG. 10

| INDIVIDUAL NUMBER | ATTENTION-DESTINATION NUMBER | WHETHER REGISTRATION HAS BEEN MADE TO GROUP TABLE |
|---|---|---|
| H1 | A3 | × |
| H2 | A0 | × |
| H3 | A5 | × |
| H4 | A2 | × |
| H5 | A3 | × |
| ⋮ | ⋮ | ⋮ |
| Hn | A0 | × |

FIG. 12

| GROUP NUMBER | NUMBER OF MEMBERS | MEMBER |
|---|---|---|
| G1 | 1 | H1 |
| G2 | 0 | |
| G3 | 0 | |
| ⋮ | ⋮ | ⋮ |
| Gn | 0 | |

FIG. 13

| INDIVIDUAL NUMBER | ATTENTION-DESTINATION NUMBER | WHETHER REGISTRATION HAS BEEN MADE TO GROUP TABLE |
|---|---|---|
| H1 | A3 | ○ |
| H2 | A0 | × |
| H3 | A5 | × |
| H4 | A2 | × |
| H5 | A3 | × |
| ⋮ | ⋮ | ⋮ |
| Hn | A0 | × |

FIG. 14

| GROUP NUMBER | NUMBER OF MEMBERS | MEMBER |
|---|---|---|
| G1 | 2 | H1, H3 |
| G2 | 0 | |
| G3 | 0 | |
| ⋮ | ⋮ | ⋮ |
| Gn | 0 | |

FIG. 15

| INDIVIDUAL NUMBER | ATTENTION-DESTINATION NUMBER | WHETHER REGISTRATION HAS BEEN MADE TO GROUP TABLE |
|---|---|---|
| H1 | A3 | ○ |
| H2 | A0 | × |
| H3 | A5 | ○ |
| H4 | A2 | × |
| H5 | A3 | × |
| ⋮ | ⋮ | ⋮ |
| Hn | A0 | × |

FIG. 16

| GROUP NUMBER | NUMBER OF MEMBERS | MEMBER |
|---|---|---|
| G1 | 2 | H1, H3 |
| G2 | 1 | H2 |
| G3 | 0 | |
| ⋮ | ⋮ | ⋮ |
| Gn | 0 | |

FIG. 17

| INDIVIDUAL NUMBER | ATTENTION-DESTINATION NUMBER | WHETHER REGISTRATION HAS BEEN MADE TO GROUP TABLE |
|---|---|---|
| H1 | A3 | ○ |
| H2 | A0 | ○ |
| H3 | A5 | ○ |
| H4 | A2 | × |
| H5 | A3 | × |
| ⋮ | ⋮ | ⋮ |
| Hn | A0 | × |

FIG. 18

| GROUP NUMBER | NUMBER OF MEMBERS | MEMBER |
|---|---|---|
| G1 | 3 | H1, H3, H5 |
| G2 | 1 | H2 |
| G3 | 0 | |
| ⋮ | ⋮ | ⋮ |
| Gn | 0 | |

FIG. 19

| INDIVIDUAL NUMBER | ATTENTION-DESTINATION NUMBER | WHETHER REGISTRATION HAS BEEN MADE TO GROUP TABLE |
|---|---|---|
| H1 | A3 | ○ |
| H2 | A0 | ○ |
| H3 | A5 | ○ |
| H4 | A2 | × |
| H5 | A3 | ○ |
| ⋮ | ⋮ | ⋮ |
| Hn | A0 | × |

FIG. 20

| GROUP NUMBER | NUMBER OF MEMBERS | MEMBER |
|---|---|---|
| G1 | 3 | H1, H3, H5 |
| G2 | 1 | H2 |
| G3 | 1 | H4 |
| ⋮ | ⋮ | ⋮ |
| Gn | 0 | |

FIG. 21

| INDIVIDUAL NUMBER | ATTENTION-DESTINATION NUMBER | WHETHER REGISTRATION HAS BEEN MADE TO GROUP TABLE |
|---|---|---|
| H1 | A3 | ○ |
| H2 | A0 | ○ |
| H3 | A5 | ○ |
| H4 | A2 | ○ |
| H5 | A3 | ○ |
| ⋮ | ⋮ | ⋮ |
| Hn | A0 | × |

FIG. 22

| GROUP NUMBER | NUMBER OF MEMBERS | MEMBER |
|---|---|---|
| G1 | 3 | H1, H3, H5 |
| G2 | 2 | H2, H4 |
| G3 | 0 | |
| ⋮ | ⋮ | ⋮ |
| Gn | 0 | |

FIG. 23

| INDIVIDUAL NUMBER | ATTENTION-DESTINATION NUMBER | WHETHER REGISTRATION HAS BEEN MADE TO GROUP TABLE |
|---|---|---|
| H1 | A3 | ○ |
| H2 | A0 | ○ |
| H3 | A5 | ○ |
| H4 | A2 | ○ |
| H5 | A3 | ○ |
| ⋮ | ⋮ | ⋮ |
| Hn | A0 | × |

FIG. 24

| GROUP NUMBER | NUMBER OF MEMBERS | MEMBER |
|---|---|---|
| G1 | 3 | H1, H3, H5 |
| G2 | 2 | H2, H4 |
| G3 | 0 | |
| ⋮ | ⋮ | ⋮ |
| Gn | 0 | |

FIG. 25

| INDIVIDUAL NUMBER | ATTENTION-DESTINATION NUMBER | WHETHER REGISTRATION HAS BEEN MADE TO GROUP TABLE |
|---|---|---|
| H1 | A3 | ○ |
| H2 | A0 | ○ |
| H3 | A5 | ○ |
| H4 | A2 | ○ |
| H5 | A3 | ○ |
| ⋮ | ⋮ | ⋮ |
| Hn | A0 | × |

● : G1
▨ : G2
○ : G3

FIG. 38
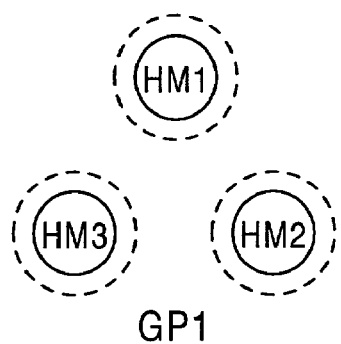
GP1
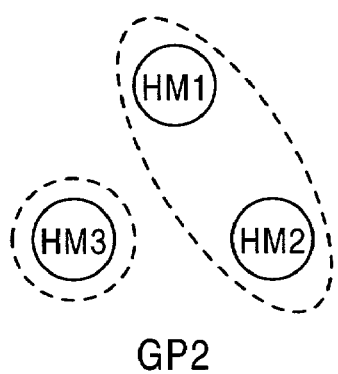   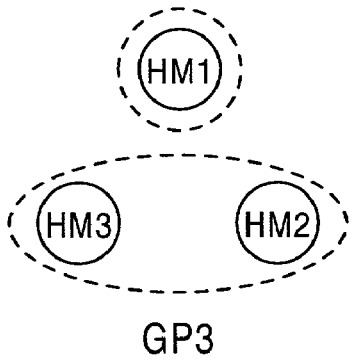   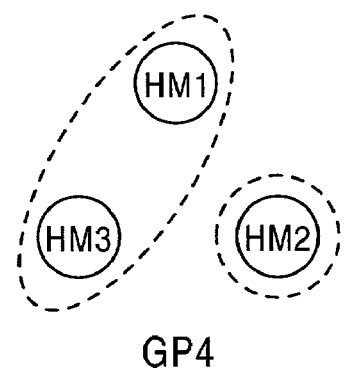
GP2              GP3              GP4
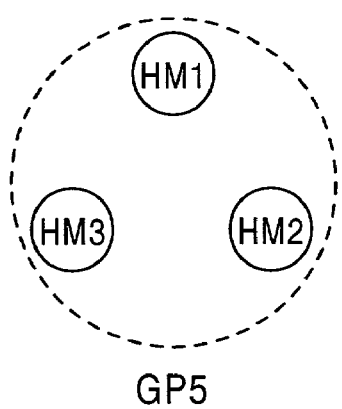
GP5

FIG. 39

| HM1 | HM2 | HM3 | GP1 | GP2 | GP3 | GP4 | GP5 |
|---|---|---|---|---|---|---|---|
| 0 | 0 | 0 | 10034 | 130 | 375 | 213 | 3024 |
| 0 | 0 | 1 | 312 | 118 | 322 | 10383 | 2083 |
| 0 | 0 | 2 | 238 | 233 | 11183 | 112 | 1253 |
| 0 | 1 | 0 | 142 | 15213 | 111 | 337 | 2108 |
| ⋮ | ⋮ | ⋮ | ⋮ | ⋮ | ⋮ | ⋮ | ⋮ |

FIG. 40

| HM1 | HM2 | HM3 | GP |
|---|---|---|---|
| 0 | 0 | 0 | GP1 |
| 0 | 0 | 1 | GP4 |
| 0 | 0 | 2 | GP3 |
| 0 | 1 | 0 | GP2 |
| 0 | 1 | 1 | GP5 |
| 0 | 1 | 2 | GP5 |
| 0 | 3 | 0 | GP3 |
| 0 | 3 | 1 | GP5 |
| 0 | 3 | 2 | GP3 |
| 2 | 0 | 0 | GP2 |
| 2 | 0 | 1 | GP5 |
| 2 | 0 | 2 | GP5 |
| 2 | 1 | 0 | GP2 |
| 2 | 1 | 1 | GP5 |
| 2 | 1 | 2 | GP5 |
| 2 | 3 | 0 | GP5 |
| 2 | 3 | 1 | GP5 |
| 2 | 3 | 2 | GP5 |
| 3 | 0 | 0 | GP4 |
| 3 | 0 | 1 | GP4 |
| 3 | 0 | 2 | GP5 |
| 3 | 1 | 0 | GP5 |
| 3 | 1 | 1 | GP5 |
| 3 | 1 | 2 | GP5 |
| 3 | 3 | 0 | GP5 |
| 3 | 3 | 1 | GP5 |
| 3 | 3 | 2 | GP5 |

FIG. 41

| ATTENTION PATTERN | | | REPRESENTATIVE ATTENTION PATTERN | | | COVERSION METHOD | |
|---|---|---|---|---|---|---|---|
| HM1 | HM2 | HM3 | HM1 | HM2 | HM3 | INVERSON | ROTATION |
| 0 | 0 | 0 | 0 | 0 | 0 | 0 | 0 |
| 0 | 0 | 1 | 0 | 0 | 1 | 0 | 0 |
| 0 | 0 | 2 | 0 | 0 | 1 | 1 | 1 |
| 0 | 1 | 0 | 0 | 0 | 1 | 1 | 0 |
| 0 | 1 | 1 | 0 | 1 | 1 | 0 | 0 |
| 0 | 1 | 2 | 0 | 1 | 2 | 0 | 0 |
| 0 | 3 | 0 | 0 | 0 | 1 | 0 | 1 |
| 0 | 3 | 1 | 0 | 1 | 2 | 1 | 0 |
| 0 | 3 | 2 | 0 | 3 | 2 | 0 | 0 |
| 2 | 0 | 0 | 0 | 0 | 1 | 0 | 2 |
| 2 | 0 | 1 | 0 | 1 | 2 | 1 | 1 |
| 2 | 0 | 2 | 0 | 1 | 1 | 0 | 2 |
| 2 | 1 | 0 | 0 | 3 | 2 | 0 | 1 |
| 2 | 1 | 1 | 2 | 1 | 1 | 0 | 0 |
| 2 | 1 | 2 | 2 | 1 | 1 | 1 | 1 |
| 2 | 3 | 0 | 0 | 1 | 2 | 1 | 2 |
| 2 | 3 | 1 | 2 | 3 | 1 | 0 | 0 |
| 2 | 3 | 2 | 2 | 1 | 1 | 0 | 2 |
| 3 | 0 | 0 | 0 | 0 | 1 | 1 | 2 |
| 3 | 0 | 1 | 0 | 3 | 2 | 0 | 2 |
| 3 | 0 | 2 | 0 | 1 | 2 | 0 | 2 |
| 3 | 1 | 0 | 0 | 1 | 2 | 0 | 1 |
| 3 | 1 | 1 | 2 | 1 | 1 | 1 | 0 |
| 3 | 1 | 2 | 2 | 3 | 1 | 1 | 0 |
| 3 | 3 | 0 | 0 | 1 | 1 | 0 | 1 |
| 3 | 3 | 1 | 2 | 1 | 1 | 0 | 1 |
| 3 | 3 | 2 | 2 | 1 | 1 | 1 | 2 |

FIG. 42

| GP | INVERSION | ROTATION | REPRESEN-TAVIVE GP |
|---|---|---|---|
| GP1 | 0 | 0 | GP1 |
| GP1 | 0 | 1 | GP1 |
| GP1 | 0 | 2 | GP1 |
| GP1 | 1 | 0 | GP1 |
| GP1 | 1 | 1 | GP1 |
| GP1 | 1 | 2 | GP1 |
| GP2 | 0 | 0 | GP2 |
| GP2 | 0 | 1 | GP3 |
| GP2 | 0 | 2 | GP4 |
| GP2 | 1 | 0 | GP4 |
| GP2 | 1 | 1 | GP2 |
| GP2 | 1 | 2 | GP3 |
| GP3 | 0 | 0 | GP3 |
| GP3 | 0 | 1 | GP4 |
| GP3 | 0 | 2 | GP2 |
| GP3 | 1 | 0 | GP3 |
| GP3 | 1 | 1 | GP4 |
| GP3 | 1 | 2 | GP2 |
| GP4 | 0 | 0 | GP4 |
| GP4 | 0 | 1 | GP2 |
| GP4 | 0 | 2 | GP3 |
| GP4 | 1 | 0 | GP2 |
| GP4 | 1 | 1 | GP3 |
| GP4 | 1 | 2 | GP4 |
| GP5 | 0 | 0 | GP5 |
| GP5 | 0 | 1 | GP5 |
| GP5 | 0 | 2 | GP5 |
| GP5 | 1 | 0 | GP5 |
| GP5 | 1 | 1 | GP5 |
| GP5 | 1 | 2 | GP5 |

FIG. 43

| HM1 | HM2 | HM3 | GP1 | GP2 | GP3 | GP4 | GP5 |
|---|---|---|---|---|---|---|---|
| 0 | 0 | 0 | 10034 | 130 | 375 | 213 | 3024 |
| 0 | 0 | 1 | 312 | 118 | 322 | 61383 | 2083 |
| 0 | 1 | 1 | 238 | 233 | 1183 | 112 | 31094 |
| 0 | 1 | 2 | 270 | 1231 | 738 | 337 | 63183 |
| 0 | 3 | 2 | 782 | 733 | 31782 | 1821 | 7108 |
| 2 | 1 | 1 | 374 | 1284 | 937 | 337 | 62198 |
| 2 | 3 | 1 | 144 | 1178 | 753 | 982 | 20837 |

FIG. 44

| HM1 | HM2 | HM3 | GP |
|---|---|---|---|
| 0 | 0 | 0 | GP1 |
| 0 | 0 | 1 | GP4 |
| 0 | 1 | 1 | GP5 |
| 0 | 1 | 2 | GP5 |
| 0 | 3 | 2 | GP3 |
| 2 | 1 | 1 | GP5 |
| 2 | 3 | 1 | GP5 |

FIG. 45

| REPRESEN-TAVIVE GP | INVERSION | ROTATION | GP |
|---|---|---|---|
| GP1 | 0 | 0 | GP1 |
| GP1 | 0 | 1 | GP1 |
| GP1 | 0 | 2 | GP1 |
| GP1 | 1 | 0 | GP1 |
| GP1 | 1 | 1 | GP1 |
| GP1 | 1 | 2 | GP1 |
| GP2 | 0 | 0 | GP2 |
| GP2 | 0 | 1 | GP4 |
| GP2 | 0 | 2 | GP3 |
| GP2 | 1 | 0 | GP4 |
| GP2 | 1 | 1 | GP2 |
| GP2 | 1 | 2 | GP3 |
| GP3 | 0 | 0 | GP3 |
| GP3 | 0 | 1 | GP2 |
| GP3 | 0 | 2 | GP4 |
| GP3 | 1 | 0 | GP3 |
| GP3 | 1 | 1 | GP4 |
| GP3 | 1 | 2 | GP2 |
| GP4 | 0 | 0 | GP4 |
| GP4 | 0 | 1 | GP3 |
| GP4 | 0 | 2 | GP2 |
| GP4 | 1 | 0 | GP2 |
| GP4 | 1 | 1 | GP3 |
| GP4 | 1 | 2 | GP4 |
| GP5 | 0 | 0 | GP5 |
| GP5 | 0 | 1 | GP5 |
| GP5 | 0 | 2 | GP5 |
| GP5 | 1 | 0 | GP5 |
| GP5 | 1 | 1 | GP5 |
| GP5 | 1 | 2 | GP5 |

| SEATING-ORDER NUMBER | A | B | C | D | E | F | SATISFACTION-DEGREE WEIGHT |
|---|---|---|---|---|---|---|---|
| 1 | 1 | 2 | 3 | 4 | 5 | 6 | W112, W113, ...., W165 |
| 2 | 1 | 2 | 3 | 4 | 6 | 5 | W212, W213, ...., W265 |
| . . . | | | | | | | |
| m | | | | | | | Wm12, Wm13, ...., Wm65 |
| . . . | | | | | | | |

COMMUNICATION SYSTEM, COMMUNICATION DEVICE, SEATING-ORDER DETERMINATION DEVICE, COMMUNICATION METHOD, RECORDING MEDIUM, GROUP-DETERMINATION-TABLE GENERATING METHOD, AND GROUP-DETERMINATION-TABLE GENERATING DEVICE

BACKGROUND OF THE INVENTION

1. Field of the Invention

The present invention relates to communication systems in which communications are performed among three or more communication devices, the communication devices which constitute the communication systems, and seating-order determination devices. The present invention further relates to group-determination-table generation devices for generating a group determination table used in the seating-order determination devices and the communication methods.

2. Description of the Related Art

In conventional teleconference systems, images and sound generated at a plurality of conference rooms distant from each other are transferred among the conference rooms through a network, and the images and sound sent from the other conference rooms are reproduced at each conference room. This allows a conference to be held as if all participants sat around one table.

In these conventional teleconference systems, conference participants are allowed to talk at the same time in each conference room.

In an actual conference, in some cases, some conversation groups are made among participants according to the situation of a progress in the conference, and topics are different in the groups. Each group is made tentatively by a part of conference participants for a certain topic, and the group is flexible. More specifically, a conversation group may be made according to a progress in the conference; persons constituting a group may be changed; and one group may be further divided into a plurality of groups. The structures of groups are always being changed.

In the conventional teleconference systems, each participant sees the other participants on monitor devices. Each monitor device corresponds to one participant, and their relationship is fixed. In a conference having six participants, for example, each participant sees the other five participants on five monitor devices. Each monitor device displays an assigned participant. In other words, in a teleconference terminal used by one participant, five monitor devices MDa, MDb, MDc, MDd, and MDe display the other participants HMa, HMb, HMc, HMd, and HMe in an always fixed manner.

Assuming that each monitor device is handled as the seat of the participant corresponding to the monitor device, it can be considered that the order of seats (seating order) can be made changeable to some extent.

In other words, the five monitor devices MDa, MDb, MDc, MDd, and MDe arranged in this order do not display the participants HMa, HMb, HMc, HMd, and HMe in a fixed manner, and the relationship between the monitor devices and the participants is made changeable.

With this feature, when a group is formed among participants, the seating order can be changed according to the formed group. When the user of the terminal and the participants HMb and HMd form a group, for example, if the seating order is changed such that the monitor device MDa displays the participants HMb and the monitor device MDb displays the participants HMd, the group is made to have a convenient condition for their conversation.

The seating order is changed, for example, by the seating-order-changing operations of the user. It is not realistic that the user performs a seating-order changing operation according to a group formed or released during a conference. This means that the user needs to perform a very troublesome operation. In addition, especially during a conference, the user wants to concentrate on the conference without performing any operations. Furthermore, a terminal user is not necessarily familiar with operations.

It can be considered that a system operator is assigned to seating-order-changing operations. It is also unrealistic, however, because extra man-power is required, and an operator usually cannot correctly understand conversation groups which always change their participants.

With the above-described reasons, even in a system which allows a seating order to be changed, the feature is usually not utilized.

SUMMARY OF THE INVENTION

The present invention has been made in consideration of the foregoing points. It is an object of the present invention to provide a communication system, such as a teleconference system, a communication device, a seating-order determination device, a communication method, a recording medium, a group-determination-table generating method, and a group-determination-table generating device, in which a seating order can be appropriately changed according to conversations which flexibly progress among participants to provide a more suitable communication-conversation environment.

The foregoing object is achieved in one aspect of the present invention through the provision of a communication system including at least three communication devices, and a seating-order determination device for generating seating-order information at each point of time for information sent from each communication device and for transmitting the seating-order information to each communication device.

Each communication device may control the output position of the information sent from other communication devices, according to the seating-order information to output the information sent from the other communication devices in a seating order corresponding to the seating-order information.

In this case, the seating order is always automatically changed to the most appropriate condition according to the progress of a conference and the state of conversations to provide the user with a suitable conference environment and a suitable communication environment.

The seating-order determination device may generate the seating-order information for the information sent from each communication device according to the degree of attention which the user of each communication device pays to the information sent from each communication device. In this case, the most appropriate seating order is implemented.

The seating-order determination device may group the information sent from each communication device according to the degree of attention which each user pays to the information sent from each communication device, and generate the seating-order information according to the result of grouping. In this case, the seating order is automatically changed with conversation groups being taken into account and a suitable teleconference system is implemented.

The seating-order information may be generated such that information belonging to the same group is arranged. In this case, the seating order is changed so as to collect the members of groups.

The seating-order information may also be generated such that information belonging to the same group is dispersed almost uniformly. In this case, the user is provided with an easy-to-converse environment.

When the seating order is changed according to the seating-order information, each communication device may output indication information indicating a change in the seating order to the user, for example, by image information or audio information. In this case, the user can understand that the seating order is to be changed, and the user is prevented from confusing with a change in the seating order.

When the seating order is changed according to grouping, each communication device may output indication information indicating the state of grouping to the user. In this case, the user successfully understands the states of conversation groups. This indication information also helps the user understand the current condition. As the indication information, a background image color may be used, which is one of the most easy-to-understand indications.

The degree of attention may be determined according to user-behavior detection information or information specified by the user. In this case, the degree of attention is suited as a reference for a change in the seating order. More specifically, when the user-behavior detection information includes the lines of sight or a face direction of the user, most suitable control is implemented by the use of a natural operation of the user.

The grouping may be performed according to the statistical relationship between a group structure and the degree of attention which the user of each communication device pays to the information sent from the other communication devices. In this case, the grouping is suited to generate the seating-order information.

Therefore, when a group-determination-table generating method and a group-determination-table generating device according to the present invention hold the statistical relationship, a suitable operation is implemented for changing the seating order.

The foregoing object is achieved in another aspect of the present invention through the provision of a seating-order determination device provided for a communication system having at least three communication devices, including seating-order-information generating means for generating seating-order information at each point of time for information sent from each communication device; and transmitting means for sequentially transmitting the seating-order information generated by the seating-order-information generating means to each communication device.

The foregoing object is achieved in still another aspect of the present invention through the provision of a communication device in a communication system including at least three communication devices communicating with each other, including receiving means for receiving information and seating-order information sent from other communication devices; attention-degree-information generating means for detecting the degree of attention which the user pays to the information sent from the other communication devices to generate attention-degree information; transmitting means for transmitting the attention-degree information generated by the attention-degree-information generating means; presenting means for presenting the information sent from the other communication devices; and information manipulation and distribution means for controlling the output positions of the information sent from the other communication devices according to the seating-order information received by the receiving means to output the information sent from the other communication devices in a seating order corresponding to the seating-order information.

The foregoing object is achieved in yet another aspect of the present invention through the provision of a group-determination-table generating device for generating a group determination table used for grouping information sent from each communication device according to the degree of attention of the user of each communication device in a communication system having at least three communication devices, including statistics means for reading attention-degree patterns indicating the degree of attention which the user of each communication device pays to information sent from other communication devices and group structure patterns indicating the group state of each user, and for collecting statistics on the attention-degree patterns and the group structure patterns; determination means for determining the correspondence between each attention-degree pattern and one of the group structure patterns from the statistics obtained by the statistics means; and determination-table generating means for generating a group determination table indicating attention-degree patterns and group structure patterns for which the correspondence is determined by the determination means.

The foregoing object is achieved in yet still another aspect of the present invention through the provision of a communication method for a communication system having at least three communication devices, including a seating-order generating step of generating seating-order information at each point of time for information sent from each communication device; and a transmitting step of sequentially transmitting the seating-order information generated in the seating-order generating step to each communication device.

The foregoing object is achieved in a further aspect of the present invention through the provision of a seating-order determination method for a seating-order determination device provided for a communication system having at least three communication devices, including a seating-order-information generating step of generating seating-order information at each point of time for information sent from each communication device; and a transmitting step of sequentially transmitting the seating-order information generated in the seating-order-information generating step to each communication device.

The foregoing object is achieved in a still further aspect of the present invention through the provision of a communication method for a communication device in a communication system including at least three communication devices communicating with each other, including a receiving step of receiving information and seating-order information sent from other communication devices; an attention-degree-information generating step of detecting the degree of attention which the user pays to the information sent from the other communication devices to generate attention-degree information; a transmitting step of transmitting the attention-degree information generated in the attention-degree-information generating step; a presenting step of presenting the information sent from the other communication devices; and an information manipulation and distribution step of controlling the output positions of the information sent from the other communication devices according to the seating-order information received in the receiving step to output the information sent from the other communication devices in a seating order corresponding to the seating-order information.

The foregoing object is achieved in a yet further aspect of the present invention through the provision of a group-determination-table generating method for a group-determination-table generating device for generating a group determination table used for grouping information sent from each communication device according to the degree of attention of the user of each communication device in a communication system having at least three communication devices, including a statistics step of reading attention-degree patterns indicating the degree of attention which the user of each communication device pays to information sent from other communication devices and group structure patterns indicating the group state of each user, and of collecting statistics on the attention-degree patterns and the group structure patterns; a determination step of determining the correspondence between each attention-degree pattern and one of the group structure patterns from the statistics obtained in the statistics step; and a determination-table generating step of generating a group determination table indicating attention-degree patterns and group structure patterns for which the correspondence is determined in the determination step.

The foregoing object is achieved in a yet still further aspect of the present invention through the provision of a recording medium for storing a processing program related to seating information for information sent from each communication device in a communication system having at least three communication devices, the processing program including a seating-order generating step of generating seating-order information at each point of time for information sent from each communication device; and a transmitting step of sequentially transmitting the seating-order information generated in the seating-order generating step to each communication device.

The foregoing object is achieved in an additional aspect of the present invention through the provision of a recording medium for storing a processing program related to seating-order determination in a seating-order determination device provided for a communication system having at least three communication devices, the processing program including a seating-order-information generating step of generating seating-order information at each point of time for information sent from each communication device; and a transmitting step of sequentially transmitting the seating-order information generated in the seating-order-information generating step to each communication device.

The foregoing object is achieved in a still additional aspect of the present invention through the provision of a recording medium for storing a processing program related to communication in a communication device of a communication system including at least three communication devices communicating with each other, the processing program including a receiving step of receiving information and seating-order information sent from other communication devices; an attention-degree-information generating step of detecting the degree of attention which the user pays to the information sent from the other communication devices to generate attention-degree information; a transmitting step of transmitting the attention-degree information generated in the attention-degree-information generating step; a presenting step of presenting the information sent from the other communication devices; and an information manipulation and distribution step of controlling the output positions of the information sent from the other communication devices according to the seating-order information received in the receiving step to output the information sent from the other communication devices in a seating order corresponding to the seating-order information.

The foregoing object is achieved in a yet additional aspect of the present invention through the provision of a recording medium for storing a processing program related to group-determination-table generation in a group-determination-table generating device for generating a group determination table used for grouping information sent from each communication device according to the degree of attention of the user of each communication device in a communication system having at least three communication devices, the processing program including a statistics step of reading attention-degree patterns indicating the degree of attention which the user of each communication device pays to information sent from other communication devices and group structure patterns indicating the group state of each user, and of collecting statistics on the attention-degree patterns and the group structure patterns; a determination step of determining the correspondence between each attention-degree pattern and one of the group structure patterns from the statistics obtained in the statistics step; and a determination-table generating step of generating a group determination table indicating attention-degree patterns and group structure patterns for which the correspondence is determined in the determination step.

BRIEF DESCRIPTION OF THE DRAWINGS

FIG. 6 is a view showing the initial state of an attention-destination table according to the embodiment.

FIG. 7 is a view showing the initial state of a group table according to the embodiment.

FIG. 9 is a flowchart of processing to be performed when attention-degree information is generated according to the embodiment.

FIG. 10 is a view showing an attention-destination table to which attention-degree information has been input according to the embodiment.

FIG. 12 is a view showing a group table obtained during the processing according to the embodiment.

FIG. 13 is a view showing an attention-destination table obtained during the processing according to the embodiment.

FIG. 14 is a view showing a group table obtained during the processing according to the embodiment.

FIG. 15 is a view showing an attention-destination table obtained during the processing according to the embodiment.

FIG. 16 is a view showing a group table obtained during the processing according to the embodiment.

FIG. 17 is a view showing an attention-destination table obtained during the processing according to the embodiment.

FIG. 18 is a view showing a group table obtained during the processing according to the embodiment.

FIG. 19 is a view showing an attention-destination table obtained during the processing according to the embodiment.

FIG. 20 is a view showing a group table obtained during the processing according to the embodiment.

FIG. 21 is a view showing an attention-destination table obtained during the processing according to the embodiment.

FIG. 22 is a view showing a group table obtained during the processing according to the embodiment.

FIG. 23 is a view showing an attention-destination table obtained during the processing according to the embodiment.

FIG. 24 is a view showing a group table obtained during the processing according to the embodiment.

FIG. 25 is a view showing an attention-destination table obtained during the processing according to the embodiment.

FIG. 38 is a view showing group patterns according to the embodiment.

FIG. 39 is a view showing the frequency table of group patterns for attention patterns according to the embodiment.

FIG. 40 is a view showing a group determination table according to the embodiment.

FIG. 41 is a view showing an attention-pattern conversion table according to the embodiment.

FIG. 42 is a view showing a group conversion table according to the embodiment.

FIG. 43 is a view showing a representative frequency table according to the embodiment.

FIG. 44 is a view showing a representative-group determination table according to the embodiment.

FIG. 45 is a view showing a group inverted-conversion table according to the embodiment.

DESCRIPTION OF THE PREFERRED EMBODIMENT

Figure 1:
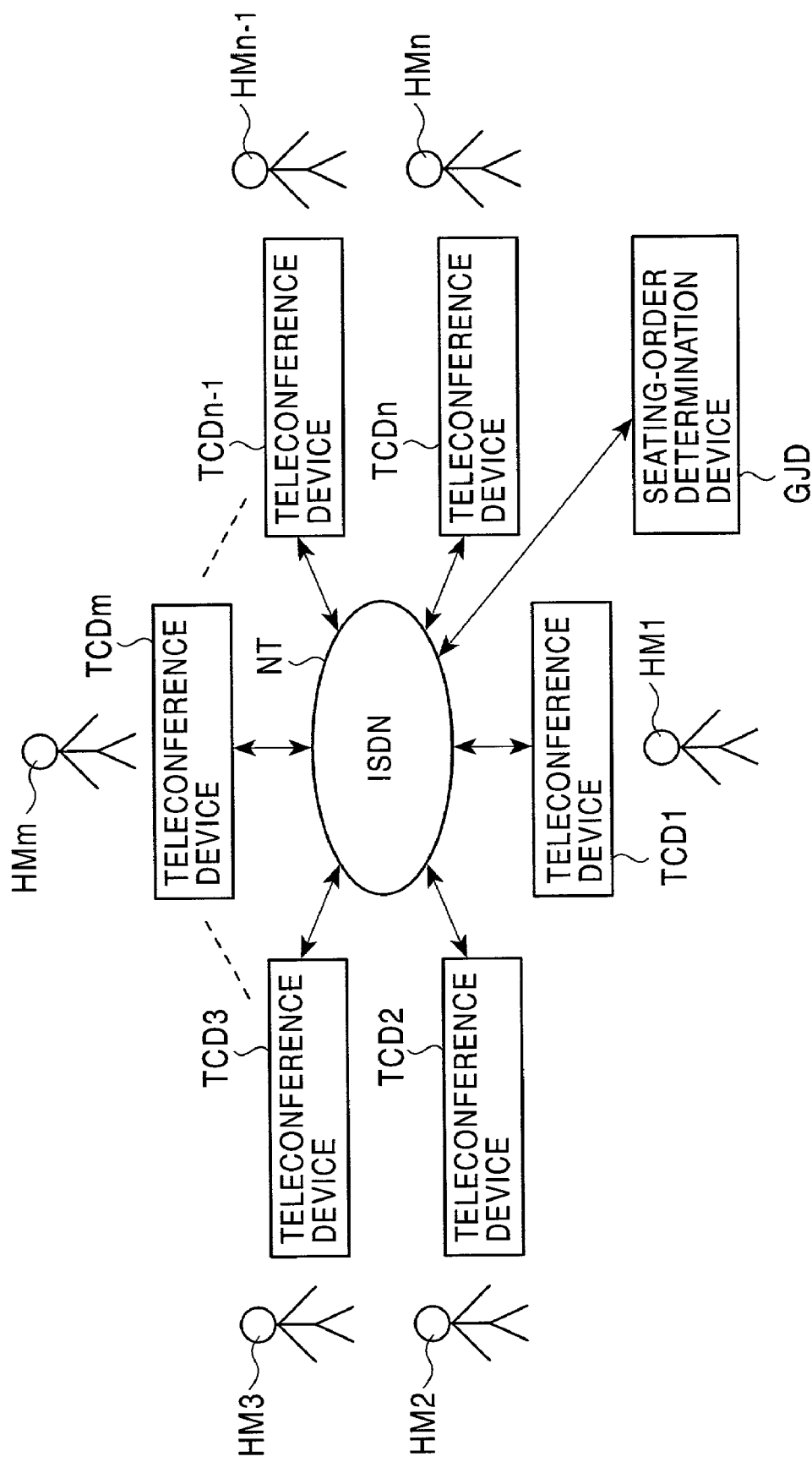
FIG. 1 is a block diagram of a teleconference system according to an embodiment of the present invention.

A teleconference system according to an embodiment of the present invention will be described below in the following order.

1. Structure of communication system
2. Structure of teleconference device
3. Structure of seating-order determination device
4. Grouping processing in the seating-order determination device
5. Seating-order determination operation through grouping in the seating-order determination device
6. Seating-order changing processing performed according to seating-order information in a teleconference device
7. First example of grouping processing which uses a statistical relationship in the seating-order determination device
8. Second example of grouping process which uses a statistical relationship in the seating-order determination device
9. Seating-order determination operation not through grouping in the seating-order determination device
10. Attention-degree-information generating operation in a teleconference device
11. Structure of monitor device
12. Example structure of each device

1. Structure of Communication System

FIG. 1 shows an outlined structure of a teleconference system according to an embodiment of the present invention. In the present specification, a system refers to the whole structure formed of a plurality of devices and sections.

In the teleconference system shown in FIG. 1, teleconference devices TCD1 to TCDn are assigned to conference participants HM1 to HMn located at a plurality of (one to n) positions. The teleconference devices TCD1 to TCDn are connected through a communication network NT formed, for example, of an integrated services digital network (ISDN).

When the conference participants HM1 to HMn do not need to be distinguished from each other, they are hereinafter collectively called conference participants HM. In the same way, when the teleconference devices TCD1 to TCDn do not need to be distinguished from each other, they are hereinafter collectively called teleconference devices TCD. In FIG. 1, an IDSN is taken as an example of the communication network NT. Instead of an ISDN, other transfer media, such as cable television networks, the Internet, and digital satellite communication, can be used.

Each teleconference device TCD captures the image data and audio data of the corresponding conference participant HM; performs mutual communication with other teleconference devices TCD through the communication network NT; and can reproduce the image data and audio data (can monitor the images and sound) of the other conference participants HM sent from the other teleconference devices TCD.

2. Structure of Teleconference Device

Figure 2:
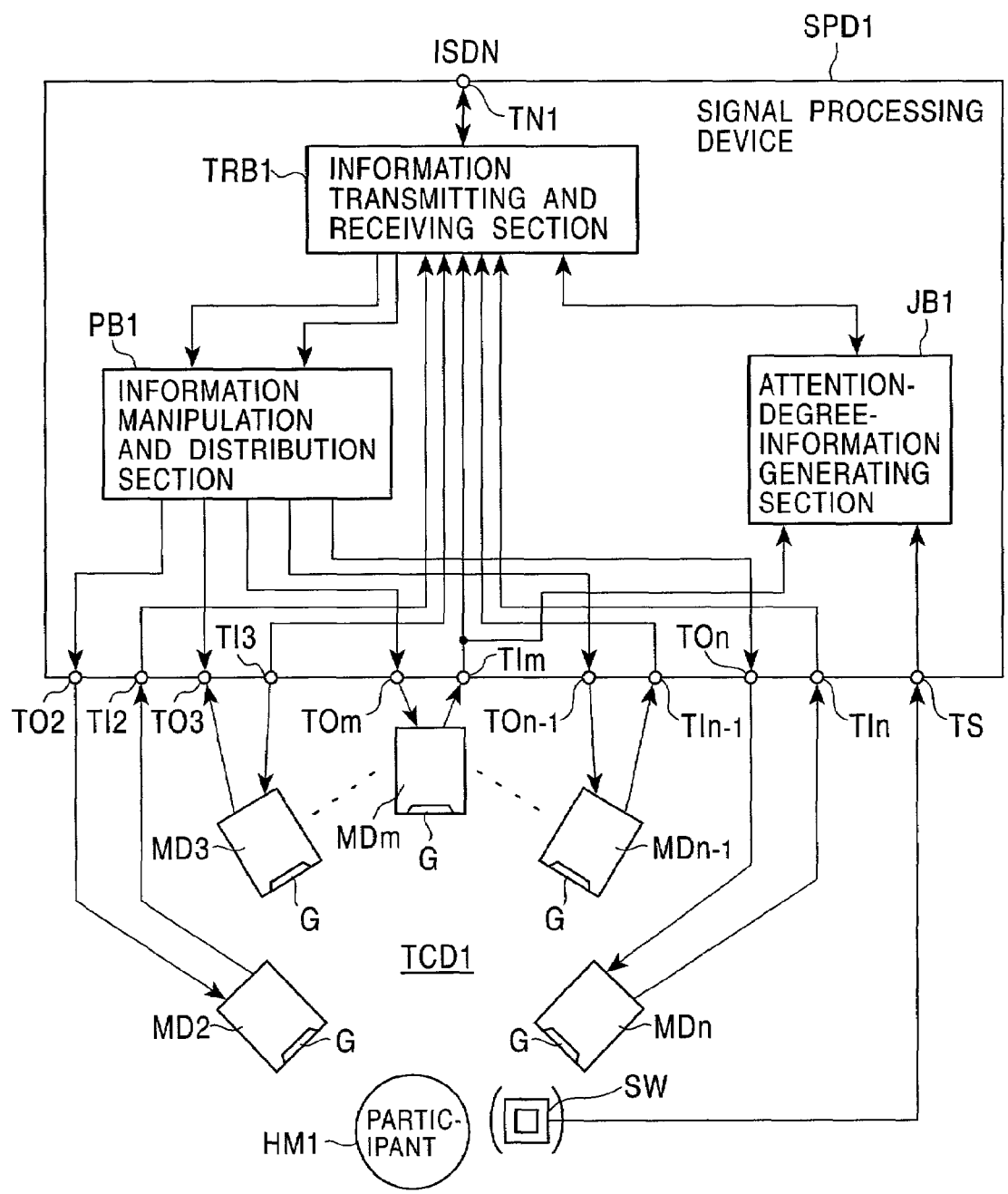
FIG. 2 is a block diagram of a teleconference device according to the embodiment.

Each teleconference device TCD constituting the teleconference system has a structure shown in FIG. 2.

The teleconference devices TCD1 to TCDn have the same structure. FIG. 2 shows a detailed example structure of the teleconference device TCD1 as a representative of the plurality of teleconference devices TCD1 to TCDn.

The teleconference device TCD1 includes at least a signal processing device SPD1 connected to the communication network NT, for transmitting and receiving signals to and from the other teleconference devices TCD2 to TCDn which constitute the teleconference system and for applying signal processing described later to signals transmitted and received; and monitor devices MD2 to MDn in which the image data and audio data of the conference participants HM2 to HMn transmitted from the other teleconference devices TCD2 to TCDn constituting the teleconference system can be monitored correspondingly to the teleconference devices TCD2 to TCDn.

When the monitor devices MD2 to MDn do not need to be distinguished from each other, they are hereinafter collectively called monitor devices MD.

The users of the teleconference devices TCD1 to TCDn are fixed to the conference participants HM1 to HMn. The relationships between the monitor devices MD in the teleconference devices and the information of conference participants HM displayed thereon are not fixed but dynamically changed according to seating-order information described later.

For simplicity, until a change of a seating order is described, a description will be given under the assumption that the monitor devices MD1 to MDn correspond to the conference participants HM1 to HMn located in the teleconference devices TCD1 to TCDn, respectively.

The signal processing device SPD1 of the teleconference device TCD1 includes a network connection terminal TN1 for connecting to the communication network NT; an information transmitting and receiving section TRB1 for transmitting and receiving information to and from the communication network NT; an information manipulation and distribution section PB1 for applying information manipulation and distribution processing described later to signals to be sent to monitor device MD2 to MDn; an attention-degree-information generating section JB1 for generating attention-degree-information used for dynamically changing a seating order during a conference, as described later; output terminals TO2 to TOn for outputting signals separately to the monitor devices MD2 to MDn; input terminals TI2 to TIn for receiving signals separately from the monitor devices MD2 to MDn; and an input terminal TS for receiving a signal from a switch SW, which generates switch-pressing information described later, used for generating the attention-degree information.

A detailed structure of each of the monitor devices MD2 to MDn will be described later. Each monitor device MD includes, as main components, at least a speaker provided at the front side of the body of the monitor device, and a display section disposed such that its screen G is directed in a predetermined direction (such as a direction towards the participant HM1).

At least one monitor device MD among the monitor devices MD2 to MDn is provided with a microphone for capturing sound around the teleconference device TCD1 and the sound of what the conference participant HM1 says, and a camera (such as a video camera) for capturing an image of the conference participant HM1.

It is preferable that a monitor device provided with a microphone and a camera be disposed at the position of a monitor device (monitor device MDm in the case shown in FIG. 2) which directly faces the conference participant HM1. It is also possible that all the monitor devices MD2 to MDn are provided with microphones and cameras.

Image data captured by the camera and audio data captured by the microphone in the monitor device MD are transmitted to the other teleconference devices TCD2 to TCDn through the signal processing device SPD1 and the communication network NT.

Images based on image data sent from the teleconference devices TCD2 to TCDn are displayed on the display sections of the monitor devices MD2 to MDn, and sound based on audio data sent from the teleconference devices TCD2 to TCDn is output from the speakers of the monitor devices.

In other words, the monitor devices MD2 to MDn correspond to the teleconference devices TCD2 to TCDn with one-to-one correspondence. For example, images based on image data (image data of the conference participant HM2 and the surrounding thereof) captured by the camera of the teleconference device TCD2 and sent through the communication network NT are displayed on the screen G of the display section of the monitor device MD2, and sound based on audio data (audio data of what the conference participant HM2 says) captured by the microphone of the teleconference device TCD2 and sent through the communication network NT is output from the speaker of the monitor device MD2.

In the same way, images based on image data captured by the camera of the teleconference device TCD3 and transmitted are displayed on the screen of the display section of the monitor device MD3, and sound based on audio data captured by the microphone of the teleconference device TCD3 and transmitted is output from the speaker of the monitor device. The other monitor devices MD work in the same way. Images sent from teleconference devices TCD are displayed and sound is output.

As described above, however, the relationships between the monitor devices MD2 to MDn and the teleconference devices TCD2 to TCDn are not fixed but is dynamically changed as a so-called seating-order change. Therefore, the above-described one-to-one correspondence relationship is a tentative correspondence relationship such as that used in a system initial condition.

It can be considered that image data transmitted and received through the communication network NT among the teleconference devices TCD1 to TCDn includes still-picture data as well as motion-picture data.

The monitor devices MD2 to MDn are disposed as shown in FIG. 2 as if the conference participant HM1, who is in a conference room having the teleconference device TCD1, and the other conference participants HM2 to HMn (those displayed on the display sections of the monitor devices MD2 to MDn) were around one table to have a conference. Assuming that six teleconference devices TCD are used in the teleconference system and each teleconference device TCD is provided with five monitor devices, the five monitor devices can be disposed as shown in the figure such that a conference participant HM and the five monitor devices MD form, for example, a regular hexagon.

The attention-degree-information generating section JB of the signal processing device SPD in each teleconference device TCD generates attention-degree information used when a seating order is dynamically changed during a conference, as described below.

The attention-degree-information generating section JB1 of the signal processing device SPD1 in the teleconference device TCD1 is taken as an example among the attention-degree-information generating sections JB1 to JBn corresponding to the teleconference devices TCD1 to TCDn, and its operation will be described below.

The attention-degree-information generating section JB1 detects the degrees of attention which the conference participant HM1 pays to the other conference participants according to image data sent from the camera, for example, of the monitor device MDm disposed in the front of the conference participant HM1, and generates attention-degree information used for dynamically changing the seating order, as described later, according to the result of detection.

The degrees of attention which the conference participant HM1 pays to the other conference participants include how much (more specifically, analog values or stepped values indicating the state in which) the conference participant HM1 pays attention to each of the monitor devices MD2 to MDn as well as whether (more specifically, digital "0" or "1" indicating whether) the conference participant HM1 pays attention in a direction toward each of the monitor devices MD2 to MDn or in another direction.

The attention-degree-information generating section JB1 analyzes the image data of the conference participant HM1, sent from the camera of the monitor device MDm to detect the direction in which the conference participant HM1 faces, every unit periods. Details thereof will be described later.

More specifically, the attention-degree-information generating section JB1 detects a period Ij as shown in FIG. 3(a) as information indicating the direction in which the conference participant HM1 faces and a period for which the conference participant HM1 continues to face in the direction. In this case, Ij is one of values 2 to n, which correspond to the other conference participants HM2 to HMn, or 0, which indicates none of the conference participants HM2 to HMn. The attention-degree-information generating section JB1 detects a period I2 in which the conference participant HM1 faces the monitor device MD2 on which an image of the conference participant HM2 is displayed, a period I3 in which the conference participant HM1 faces the monitor device MD3 on which an image of the conference participant HM3 is displayed, a period Im in which the conference participant HM1 faces the monitor device MDm on which an image of the conference participant HMm is displayed, a period In-1 in which the conference participant HM1 faces the monitor device MDn-1 on which an image of the conference participant HMn-1 is displayed, a period In in which the conference participant HM1 faces the monitor device MDn on which an image of the conference participant HMn is displayed, or a period I0 in which the conference participant HM1 faces none of the monitor devices MD2 to MDn.

Then, the attention-degree-information generating section JB1 detects a period longer than a time Tcont among detected periods, some of I2 to In and I0. When the attention-degree-information generating section JB1 detects a period longer than the time Tcont, it generates information (Hi:Aj) indicating that the conference participant HM1 pays attention to the conference participant corresponding to the detected period, such as those shown in FIG. 3(b).

In the information (Hi:Aj), "i" corresponds to a conference participant HMi (for example, "1" for HM1), and "j" corresponds to one of the other conference participants HMj (i≠j) (2 to n corresponding to the other conference participants HM2 to HMn when "i" is 1) or 0, which corresponds to none of the conference participants.

Figure 3:
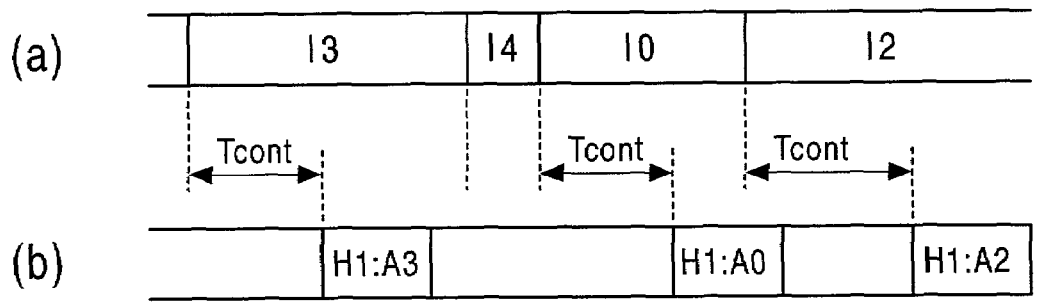
FIG. 3 is a view showing a method for generating attention-degree information according to the embodiment.

More specifically, a description is made in the case shown in FIG. 3. When the attention-degree-information generating section JB1 detects periods I3, I0, and I2 as periods longer than the time Tcont among detected periods, some of I2 to In and I0, shown in FIG. 3(a), the attention-degree-information generating section JB1 generates, as attention-degree information, information (H1:A3) indicating that the conference participant HM1 pays attention to the conference participant HM3 corresponding to the detected period I3; information (H1:A0) indicating that the conference participant HM1 pays attention to none of the monitor devices MD or pay attention to something other than the monitor devices MD, corresponding to the detected period I0; and information (H1:A2) indicating that the conference participant HM1 pays attention to the conference participant HM2 corresponding to the detected period I2, as shown in FIG. 3(b).

Figure 4:
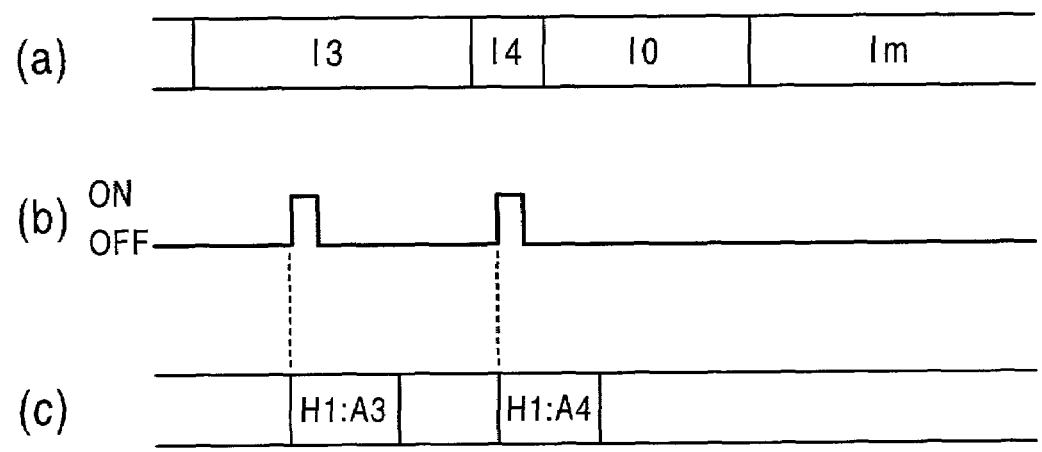
FIG. 4 is a view showing another method for generating attention-degree information according to the embodiment.

The attention-degree-information generating section JB1 may generate attention-degree information according to the detection of a period Ij and switch-pressing information sent from the switch SW. More specifically, when the attention-degree-information generating section JB1 detects periods Ij serving as information indicating the direction in which the conference participant HM1 faces and a period in which the conference participant HM1 faces in the direction, as shown in FIG. 4(a), and receives switch-pressing ON signals, such as those shown in FIG. 4(b), obtained when the conference participant HM1 presses the switch SW during the detected periods, some of I2 to In and I0, the attention-degree-information generating section JB1 generates information (H1:Aj), such as those shown in FIG. 4(c), indicating that, during a period when the switch-pressing signal is ON, the conference participant HM1 pays attention to the conference participant corresponding to the signal. In the case shown in FIG. 4, when the attention-degree-information generating section JB1 detects I3 and I4 as periods when the switch-pressing signal is ON, among the detected periods, some of I2 to In and I0, the attention-degree-information generating section JB1 generates, as attention-degree information, information (H1:A3) indicating that the conference participant HM1 pays attention to the conference participant HM3 corresponding to the detected period I3, and information (H1:A4) indicating that the conference participant HM1 pays attention to the conference participant HM4 corresponding to the detected period I4, as shown in FIG. 4(c).

In addition to the above cases, it is also possible that the conference participant HM1 explicitly specifies the direction in which the conference participant HM1 pays attention. For example, pushbuttons corresponding to the other conference participants HM2 to HMn and a pushbutton corresponding to a case in which the conference participant HM1 pays attention to none of those participants are prepared, and the conference participant HM1 specifies the direction in which the conference participant HM1 pays attention by pressing the corresponding pushbutton. In this case, pushbutton-pressing information serves as the attention-degree information.

3. Structure of Seating-order Determination Device

Attention-degree information generated by the attention-degree-information generating section JB1 by determining whom the conference participant HM1 pays attention among the conference participants HM2 to HMn according to a behavior or a designation of the conference participant HM1 as described above is transmitted to the information transmitting and receiving section TRB1 in the signal processing device SPD1, and then to a seating-order determination device GJD via the network connection terminal TN1 through the communication network NT.

Figure 5:
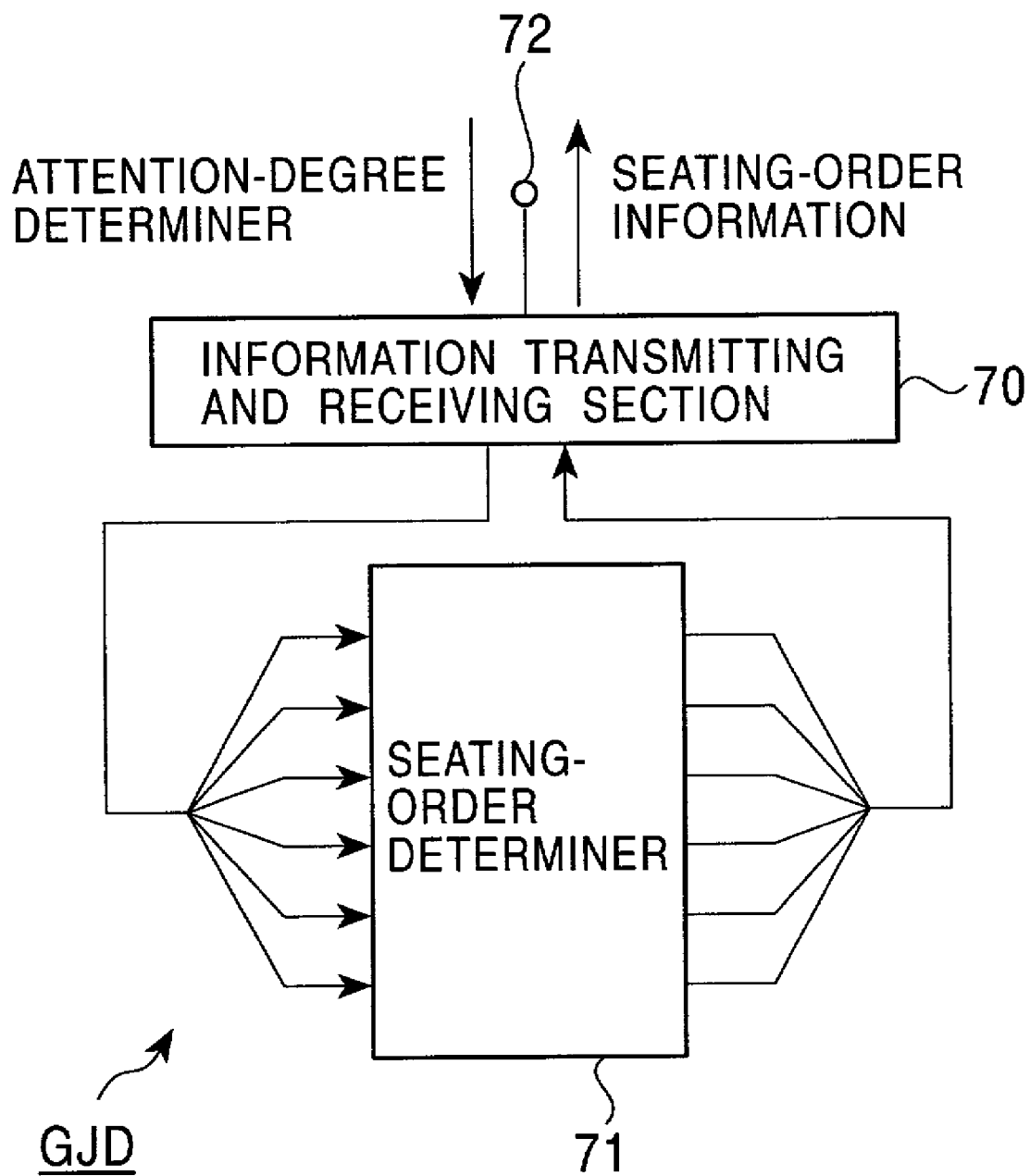
FIG. 5 is a block diagram of a seating-order determination device according to the embodiment.

The seating-order determination device GJD is structured as shown in FIG. 5.

In FIG. 5, the seating-order determination device GJD is provided with a network connection terminal 72 for connecting to the communication network NT; an information transmitting and receiving section 70 for transmitting and receiving information to and from the communication network NT; and a seating-order determiner 71 for determining a seating order according to attention-degree information sent from the teleconference devices TCD1 to TCDn, for generating seating-order information indicating the seating order, and for sending the seating-order information to the information manipulation and distribution sections PB of the teleconference devices TCD1 to TCDn.

More specifically, in the seating-order determination device GJD, the information transmitting and receiving section 70 picks up the attention-degree information sent from the teleconference devices TCD1 to TCDn among signals passing through the communication network NT, and sends the attention-degree information to the seating-order determiner 71. The seating-order determiner 71 determines the seating order of the conference participants HM1 to HMn attending the conference through the teleconference devices TCD1 to TCDn, and generates seating-order information indicating the determined seating order.

The information transmitting and receiving section 70 transmits the generated seating-order information to the communication network NT to send it to the teleconference devices TCD1 to TCDn.

Although details will be described later, the teleconference devices TCD1 to TCDn receive the seating-order information sent from the seating-order determination device GJD at the information manipulation and distribution sections PB; and the information manipulation and distribution sections PB determine the correspondences between conference participants HM and monitor devices MD according to the seating-order information as described later, applies video and audio manipulation such that, for example, a change in seating order is easy to understand, and sends images and sound related to the conference participants HM corresponding to the monitor devices MD2 to MDn to implement the determined seating order.

4. Grouping Processing in the Seating-order Determination Device

Various methods for determining a seating order can be considered for the seating-order determination device GJD. A method can be considered as an example, in which a conversation group to which conference participants HM1 to HMn belong is determined and then a seating order is determined according to the result of group determination such that participants belonging to the same group are set close to each other.

A process for determining a conversation group in the seating-order determination device GJD will be described below before seating-order determination processing performed according to a group is described.

Various group-determination rules used in the seating-order determination device GJD can be considered. In the following description, a rule in which a link is made between a person who pays attention to another person and the another person, who attracts attention, and one group is formed of persons who are coupled directly or indirectly by links is used as an example. Details of a group determination and update process performed by the rule according to attention-degree information in the seating-order determiner 71 of the seating-order determination device GJD will be described below. In this rule, one group is formed of persons who directly or indirectly pay attention to others, and the others, who attract attention directly or indirectly.

A condition in which a person directly or indirectly pays attention to another person, and the another person attracts attention directly or indirectly will be described with the following example. It is assumed, as an example, that a person A pays attention to a person B, and the person B pays attention to a person C. In this example, it is considered that the person A pays attention to the person B "directly" (the person B also pays attention to the person C "directly") and the person B attracts attention "directly;" and the person A pays attention to the person C "indirectly (through the person B)" and the person C attracts the attention of the person A "indirectly (through the person B)." In this example, there is only one person, the person B, between the person A and the person C. But, there may be a plurality of persons between the person A and the person C.

The seating-order determiner 71 holds an attention-destination table formed of an "individual number" column indicating numbers assigning to conference participants attending a conference held with this teleconference system; an "attention-destination number" column indicating the numbers of conference participants whom the conference participants HM1 to HMn using the teleconference devices TCD1 to TCDn pay attention; and a "whether registration has been made to group table" column indicating whether registration has been made to a group table, as shown in FIG. 6.

The seating-order determiner 71 also holds a group table formed of a "group number" column indicating numbers assigned to groups formed in the teleconference system; a "number of members" column indicating the number of members belonging to each group among the conference participants; and a "member" column indicating conference participants belonging to the groups, as shown in FIG. 7.

Figure 8:
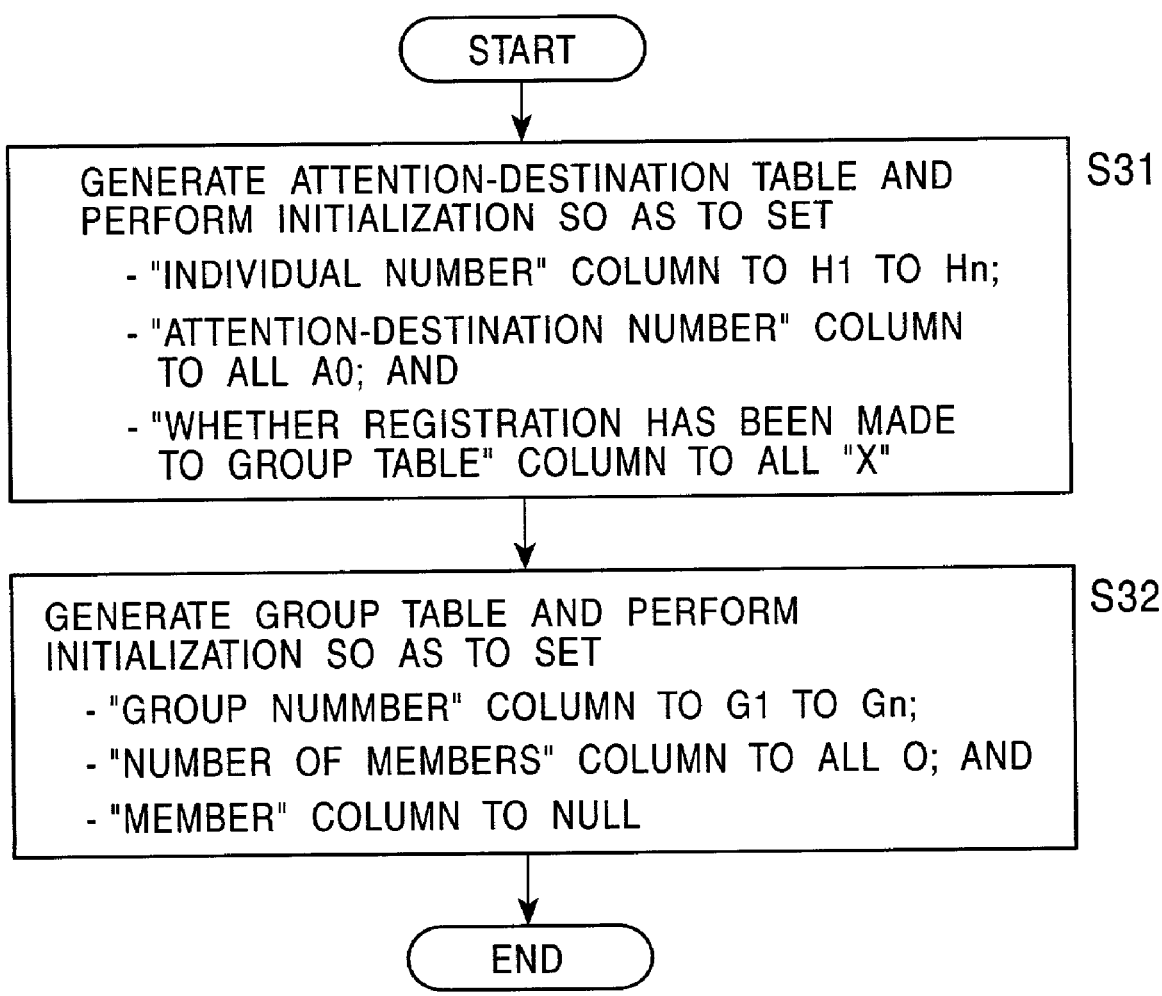
FIG. 8 is a flowchart of initialization processing applied to the attention-destination table and the group table according to the embodiment.

The seating-order determiner 71 performs initialization at the start of communication prior to receiving attention-degree information, as shown in FIG. 8.

More specifically, the seating-order determiner 71 generates the attention-destination table shown in FIG. 6 and performs initialization in the process of step S31 shown in FIG. 8.

In the initialization, the seating-order determiner 71 sets the "individual number" column to the numbers (H1 to Hn in a case shown in FIG. 6) corresponding to conference participants attending a conference held with the teleconference system in the attention-destination table shown in FIG. 6; sets the "attention-destination number" column all to a number A0 which indicates that the conference participants HM1 to HMn who use the teleconference devices TCD1 to TCDn pay attention to none of them; and sets the "whether registration has been made to group table" column to all "x" which indicates that registration has not yet been made to any group.

The seating-order determiner 71 generates a group table and performs initialization in the process of step S32 as shown in FIG. 7.

In the initialization, the seating-order determiner 71 sets the "group number" column to G1 to Gn which indicate that each of the teleconference devices TCD1 to TCDn forms one group, in the group table shown in FIG. 7; sets the "number of members" column to all 0, which indicates that none attends any group; and sets the "member" column to all null, which indicates that any group has no member.

When the seating-order determiner 71 receives attention-degree information, it starts a process to be performed when attention-degree information is generated, as shown in FIG. 9.

In FIG. 9, when the seating-order determiner 71 receives attention-degree information, it sets the attention-destination table according to the attention-degree information in the process of step S41 as shown in FIG. 10.

Actually, the seating-order determiner 71 specifies the "attention-destination number" column such that, when information (Hi:Aj) is received, which indicates that the conference participant HMi indicated by Hi pays attention to the conference participant HMj corresponding to Aj, the "attention-destination number" cell corresponding to an individual number of Hi is set to Aj.

The "whether registration has been made to group table" column is all initialized to "x."

In a case shown in FIG. 10, the "attention-destination number" cell corresponding to an "individual number" of H1 is set to A3 corresponding to the conference participant HM3 as the attention destination of the conference participant HM1 indicated by an "individual number" of H1; the "attention-destination number" cell corresponding to an "individual number" of H2 is set to A0, which indicates that none attracts attention, as the attention destination of the conference participant HM2 indicated by an "individual number" of H2; the "attention-destination number" cell corresponding to an "individual number" of H3 is set to A5 corresponding to the conference participant HM3 as the attention destination of the conference participant HM3 indicated by an "individual number" of H3; and the "attention-destination number" cell corresponding to an "individual number" of H4 is set to A2 corresponding to the conference participant HM2 as the attention destination of the conference participant HM4 indicated by an "individual number" of H4. A description for conference participants HM5 to HMn will be omitted. The "attention-destination numbers" column is specified for HMi in this way.

The seating-order determiner 71 sets the "numbers of members" column all to 0 and the "member" column all to null as shown in FIG. 7 in the group table in the process of step S42.

After steps S42 and S43, the seating-order determiner 71 sets the group table according to the contents of the attention-destination table for each of "individual numbers" H1 to Hn in the process of step S43.

Figure 11:
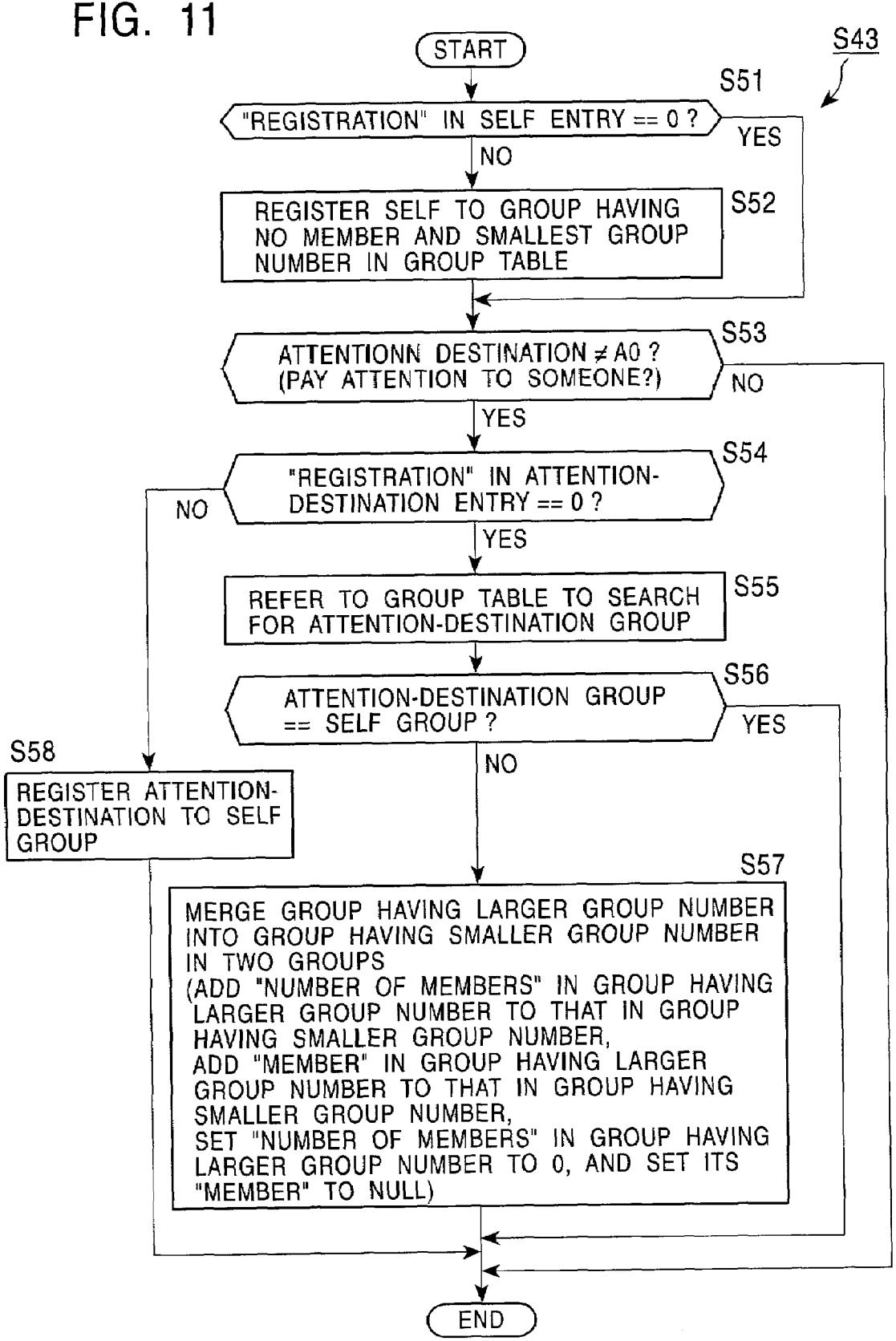
FIG. 11 is a flowchart of processing for inputting the contents of the attention-destination table to the group table according to the embodiment.

FIG. 11 is a detailed flowchart of processing for setting the group table according to the contents of the attention-destination table in step S43 of the flowchart of FIG. 9. In FIG. 11, "registration" means registration to the group table; a "self entry" means a self entry in the attention-destination table; an "attention destination" means an attention destination in a self entry; an "attention-destination entry" means the entry of an attention destination in the attention-destination table; a "self group" means a group to which the self belongs as a member; and an "attention-destination group" means a group to which an attention destination belongs as a member. An actual registration operation means that the number of members is incremented by one in a group table; a corresponding number is added as a member in the group table; and the corresponding "whether registration has been made to group table" cell in the attention-destination table is changed to "o."

A requirement concerning the setting of the entry of a conference participant HMi in the attention-destination table will be first described. A requirement (hereinafter called a first requirement in each teleconference device) concerning the setting of the entry of the conference participant HMi having an individual number of Hi in the attention-destination table includes the registration of the individual number Hi to the group table, and a change of the "whether registration has been made to group table" cell in the entry of the individual number Hi in the attention-destination table to "o." When the attention-destination number corresponding to the individual number Hi is A0 (which means the conference participant pays attention to none of the other conference participants), only this requirement applies.

When the attention-destination number corresponding to the individual number Hi is not A0, a requirement (hereinafter called a second requirement in each teleconference device) includes the registration of the attention-destination number to the group table, a change of the "whether registration has been made to group table" cell in the entry of the attention destination in the attention-destination table to "○," and the registration of the individual number Hi and the attention destination to the same group in the group table.

By following the flowchart shown in FIG. 11, whether these requirements are satisfied is checked.

In the process of step S51, the seating-order determiner 71 determines whether the "whether registration has been made to group table" cell in the self entry of the individual number Hi in the attention-destination table is "○." When the "registration" in the self entry has already been set to "○" in step S51, since it is ensured that registration to the group table has already been performed, the first requirement is already satisfied. Therefore, when it is determined in step S51 that YES is obtained, the seating-order determiner 71 does not perform work related to registration of the individual number Hi to the group table, and the processing proceeds to step S53. When it is determined in step S51 that NO is obtained, since the "registration" is "x" in the self entry, the processing proceeds to step S52.

In the process of step S52, the seating-order determiner 71 registers the self (individual number) to a group having no member and the smallest number in the group table, and the processing proceeds to step S53.

As the results of steps S51 and S52, the first requirement is satisfied before the process of the next step S53.

In the process of step S53, the seating-order determiner 71 determines whether the attention-destination number is not A0. When the attention-destination number is A0, in other words, it is determined in step S53 that NO is obtained, since all requirements have already been satisfied, the seating-order determiner 71 finished the processing. When the attention-destination number is not A0, in other words, when it is determined in step S53 that YES is obtained, the processing proceeds to step S54 to satisfy the second requirement.

In the process of step S54, the seating-order determiner 71 determines whether the "whether registration has been made to group table" cell in the attention-destination entry is "○."

When the "registration" is "x" in the attention-destination entry, in other words, it is determined in step S54 that NO is obtained, since it is sure that the attention-destination entry has not been registered to the group table, the processing proceeds to step S58, and the seating-order determiner 71 registers the attention destination to the group (self group) to which the self belongs, and sets the "whether registration has been made to group table" cell in the attention-destination entry in the attention-destination table to "○." Since the second requirement is surely satisfied with the process of step S58, the seating-order determiner 71 finishes the processing.

When it is determined in step S54 that the "registration" is "○" in the attention-destination entry, which means that the attention destination has already been registered, only the last item of the second requirement needs to be satisfied, which indicates that the individual number Hi and the attention destination belong to the same group. When it is determined in step S54 that YES is obtained, the seating-order determiner 71 refers to the group table in the next step S55 and checks whether the individual number Hi and the attention destination belong to the same group in step S56.

When it is confirmed in step S56 that they belong to the same group, in other words, when it is determined in step S56 that YES is obtained, since the second requirement has already been satisfied, the seating-order determiner 71 finishes the processing.

When it is determined in step S56 that NO is obtained, since the individual number Hi and the attention destination need to belong to the same group, the seating-order determiner 71 merges the two groups to which the individual number Hi and the attention destination belong in the process of step S57. More specifically, the seating-order determiner 71 merges (adds the number of members in the group having a larger number to that in the group having a smaller number, adds the members of the group having the larger number to those of the group having the smaller number, sets the number of members in the group having the larger number to zero, and sets the members of the group having the larger number to null) the group having a larger number into the group having a smaller number among the two groups. As a result, the second requirement is satisfied. Since all the requirements have been satisfied, the seating-order determiner 71 finishes the processing.

The confirmation of the requirements related to the settings of the entry of the conference participant HMi in the attention-destination table has been finished.

When the entry corresponding to the individual number Hi has been set in the attention-destination table, it is necessary that both the entry corresponding to the individual number Hi and those corresponding to the individual numbers up to Hi-1 be set in the attention-destination table. As for the setting of the entry corresponding to the individual number H1, since the other entries have not yet set so far, it is required that only the entry corresponding to the individual number H1 be set.

Operations which may be performed when the entry corresponding to the individual number Hi is input include a new registration to the group table, the merger of two groups in the group table, and a change in the "whether registration has been made to group table" cell in the attention-destination table to "○." With these operations, neither numbers registered according to the entries corresponding to individual numbers up to Hi-1, followed by Hi, are deleted, nor the "whether registration has been made to group table" cells are set to "x." In addition, two numbers belonging to the same group are not separated, either. Therefore, the process for setting the entry corresponding to the individual number Hi into the tables does not break the requirements satisfied by the processes for the individual numbers up to Hi-1, followed by Hi,. Consequently, it is inductively understood that, when the processes related to the entries of all individual numbers Hi, shown in FIG. 11, have been finished, the requirements for the entries of all individual numbers H1 to Hi are satisfied.

Changes in the attention-destination table and in the group table, made in the processing shown by the flowchart of FIG. 11 will be described below by examples. It is assumed here that the group table has a state shown in FIG. 7 as initial states, and the attention-destination table has a state shown in FIG. 10 when group-determination information has been input. Changes in the attention-destination table and the group table will be explained.

The setting of the entry of the conference participant HM1 (having an individual number of H1) will be described first.

Since the "whether registration has been made to group table" cell is "x," it is determined in step S51 of FIG. 11 that NO is obtained, and the entry corresponding to the individual number H1 is input to the group table in the next step S52. As a result of the process of step S52, the "number of members" for a group number G1 having the smallest number is set to one, and the individual number Hi is input to the "member" column, as shown in FIG. 12. The "whether registration has been made to group table" cell for the individual number H1 is changed to "○" in the attention-destination table as shown in FIG. 13.

Then, it is determined in step S53 that YES is obtained. Since the attention destination is A3 indicating the conference participant HM3, and the "whether registration has been made to group table" cell for the entry of the individual number H3 is "x," as shown in FIG. 13, it is determined in step S54 that NO is obtained. As a result, in step S58, the individual number H3 of the attention destination is input to the group G1, which is the "self group." In the group table, the "number of members" in the group G1 is set to two and its members are H1 and H3 in the group table as shown in FIG. 14. In the attention-destination table, the "whether registration has been made to group table" cells for the individual numbers H1 and H3 are set to "○" as shown in FIG. 15.

The setting of the entry of the conference participant HM1 (having an individual number of H1) has been finished.

The setting of the entry of the conference participant HM2 (having an individual number of H2) will be described next.

Since the "whether registration has been made to group table" cell is "x" when the entry corresponding to the individual number H2 is input to the tables, it is determined in step S51 of FIG. 11 that NO is obtained, and the entry corresponding to the individual number H2 is input to the group table in the next step S52. As a result of the process of step S52, the number of members for a group number G2 having the next smallest number is set to one, and the individual number H2 is input to the member column, as shown in FIG. 16. The "whether registration has been made to group table" cell for the individual number H2 is changed to "○" in the attention-destination table as shown in FIG. 17. Since the attention-destination number of the individual number H2 is A0 as shown in the case of FIG. 17, the setting of the entry of the conference participant HM2 has been finished at this point.

The setting of the entry of the conference participant HM3 (having an individual number of H3) will be described next.

Since the "whether registration has been made to group table" cell is "○" as shown in FIG. 15 when the entry corresponding to the individual number H3 is input to the tables, because the entry corresponding to the individual number H1 has been set. Therefore, it is determined in step S51 of FIG. 11 that YES is obtained. Since the conference participant HM3 having the individual number H3 pays attention to the conference participant HM5, it is determined in step S53 that YES is obtained. Since the "whether registration has been made to group table" cell for the individual number H5, indicating the attention destination, is "x," as shown in FIG. 17, it is determined in step S54 of FIG. 11 that NO is obtained.

As a result, in step S58, the individual number H5 of the attention destination is input to the group G1, which is the "self group" of the individual number H3. In the group table, the number of members in the group G1 is updated to three and its members are updated to H1, H3, and H5 in the group table as shown in FIG. 18. In the attention-destination table, the "whether registration has been made to group table" cell for the individual number H5 is set to "○" as shown in FIG. 19.

The setting of the entry of the conference participant HM3 (having an individual number of H3) has been finished.

The setting of the entry of the conference participant HM4 (having an individual number of H4) will be described next.

Since the "whether registration has been made to group table" cell is "x" when the entry corresponding to the individual number H4 is input to the tables, it is determined in step S51 of FIG. 11 that NO is obtained, and the entry corresponding to the individual number H4 is input to the group table in the next step S52. As a result of the process of step S52, the number of members for a group number G3 which is the group following the groups G1 and G2 is set to one, and the individual number H4 is input to the member column, as shown in FIG. 20. The "whether registration has been made to group table" cell for the individual number H4 is changed to "○" in the attention-destination table as shown in FIG. 21.

Then, it is determined in step S53 that YES is obtained. Since the attention destination is A2 indicating the conference participant HM2, and the "whether registration has been made to group table" cell for the entry of the individual number H2 is "○," as shown in FIG. 21, it is determined in step S54 that YES is obtained.

In step S55, a group number is searched for for the individual number H2 of the attention destination to obtain the group number G2 to which the individual number H2 serving as the attention destination belongs. In the next step S56, it is determined that NO is obtained because the group number to which the individual number H4 belongs is G3 and the group number to which the individual number H2 serving as the attention destination belongs is G2. In the next step S57, the group number G3 to which the individual number H4 belongs is merged into the group G2, which has a smaller number, to which the individual number H2 belongs.

Therefore, in the group table, the number of members in the group G2 is updated to two, and its members are updated to H2 and H4, as shown in FIG. 22. The attention-destination table is updated (the same as that shown in FIG. 21) as shown in FIG. 23.

The setting of the entry of the conference participant HM4 (having an individual number of H4) has been finished.

The setting of the entry of the conference participant HM5 (having an individual number of H5) will be described last.

Since the "whether registration has been made to group table" cell is "○" as shown in FIG. 23 when the entry corresponding to the individual number H5 is input to the tables. Therefore, it is determined in step S51 of FIG. 11 that YES is obtained. Since the conference participant HM5 having the individual number H5 pays attention to the conference participant HM3, it is determined in step S53 that YES is obtained. Since the "whether registration has been made to group table" cell for the individual number H3, indicating the attention destination, is "○," as shown in FIG. 23, it is determined in step S54 of FIG. 11 that YES is obtained.

In step S55, a group number is searched for for the individual number H3 of the attention destination to obtain the group number G1 to which the individual number H3 serving as the attention destination belongs. In the next step S56, it is determined that YES is obtained because the group number to which the individual number H3 serving as the attention destination belongs is G1, and the individual number H5 has already been registered to the group G1. The processing is finished.

The group table is updated (is the same as that shown in FIG. 22) as shown in FIG. 24, and the attention-destination table is updated (is the same as that shown in FIG. 23) as shown in FIG. 25.

With the processing described above, when information related to all individual numbers are input to the attention-destination table, the "registration to group table" column is set to all "○" in the attention-destination table. All individual numbers have already been registered to any one of groups as members in the group table.

5. Seating-order Determination Operation Through Grouping in the Seating-order Determination Device When group determination is finished in the processing described above, the seating-order determination device GJD determines a seating order such that persons belonging to the same group are collectively arranged.

To this end, the seating-order determination device GJD holds seating-order information as well as group information.

Figure 26:
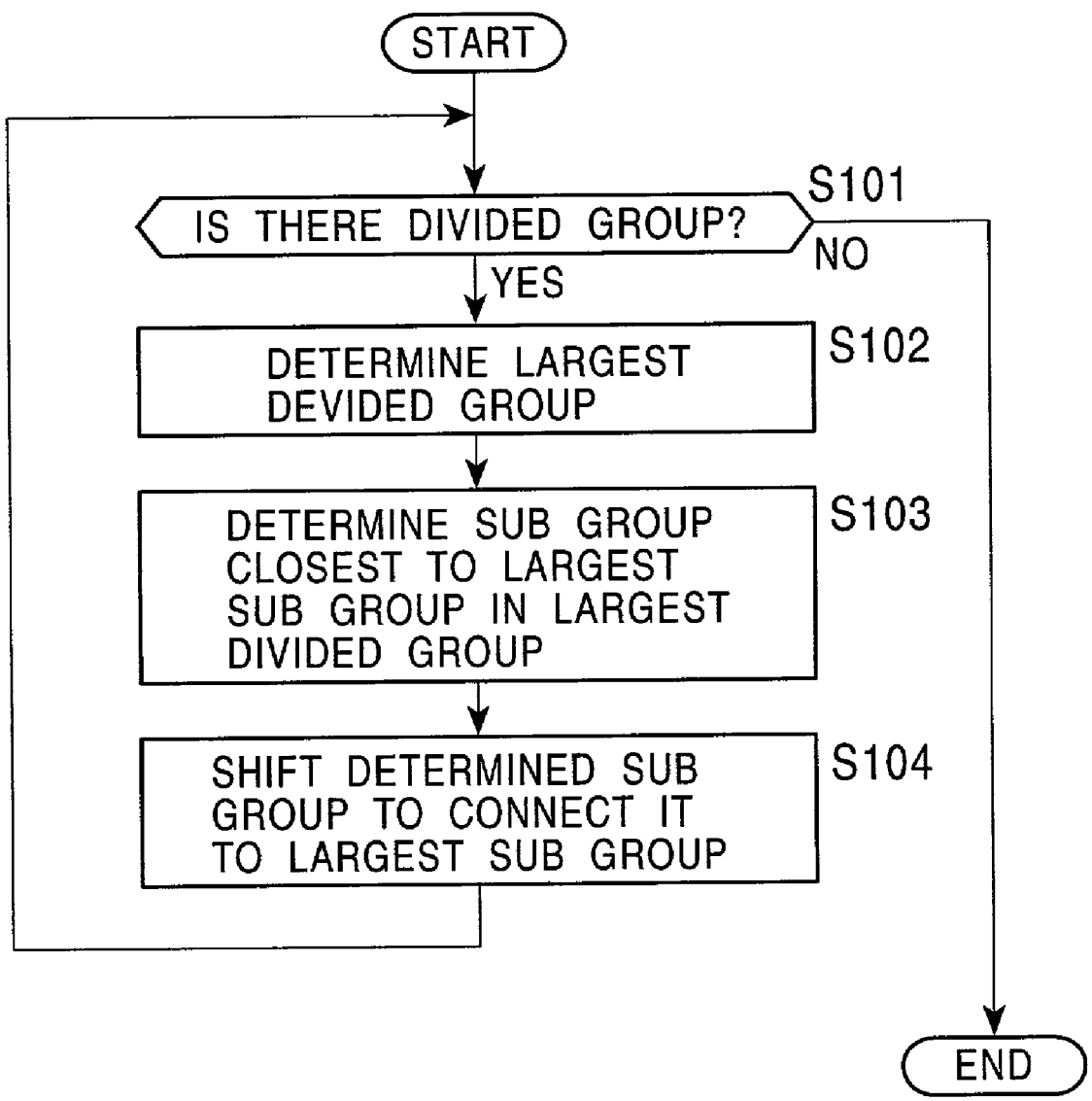
FIG. 26 is a flowchart of seating-order determination processing according to the embodiment.

When a group is changed, the seating-order determination device GJD refers to the held seating-order information and changes it by processing shown in a flowchart of FIG. 26 to determine a new seating order. This processing will be described below.

In step S101, it is determined whether there is a group (hereinafter called a divided group) in which its members are separated.

When no group is divided at the seating order used before a change, in other words, when members are collectively arranged in all groups, since the target condition is satisfied, the seating order used before a change is used as is. The processing shown in FIG. 26 is finished.

When it is determined in step S101 that there is a divided group, a group having the largest number of members is determined among divided groups in step S102. When there are a plurality of divided groups, a group having the minimum group number is regarded as the largest group. Since the largest group is divided, if a set of one person or more collectively arranged is called a sub group, the largest group is formed of a plurality of sub groups.

When the largest divided group is determined, the largest sub group is determined in the largest divided group and a sub group located closest to the largest sub group is determined in step S103. When there are a plurality of groups having the largest number of members among sub groups, a group to which a person having the minimum individual number belongs is regarded, for example, as the largest sub group. When separate sub groups are located at the same distance from the largest sub group clockwise and counterclockwise, the sub group located at the distance counterclockwise is regarded, for example, as the sub group closest to the largest group.

When the sub group closest to the largest sub group is determined, the determined sub group is connected to the largest sub group in step S104. This connection process will be described below.

The determined sub group closest to the largest sub group counterclockwise from the largest sub group is shifted clockwise to connect to the largest sub group. The determined sub group closest to the largest sub group clockwise from the largest sub group is shifted counterclockwise to connect to the largest sub group. When the determined sub group is located at the same distance from the largest sub group clockwise and counterclockwise, the determined sub group is, for example, shifted clockwise to connect to the largest sub group. Persons located between the largest sub group and the sub group closest thereto are shifted by the number of members belonging to the sub group closest to the largest sub group in the direction opposite that in which the sub group closest to the largest sub group is shifted.

Details of the connection process have been described.

Since the number of sub groups in the largest divided group is reduced by one by the above-described connection process, the largest divided group is collectively arranged by the repetition of the process shown in the flowchart of FIG. 26.

When the process for one divided group is finished, the same process can be applied to the next largest group by the repetition of the process shown in the flowchart. Therefore, each of all groups is collectively arranged by the repetitions of the process shown in the flowchart, and the seating-order determination processing is finished with the target condition being obtained.

Two example seating-order changes in the seating-order determination processing will be described below.

Figure 27A:
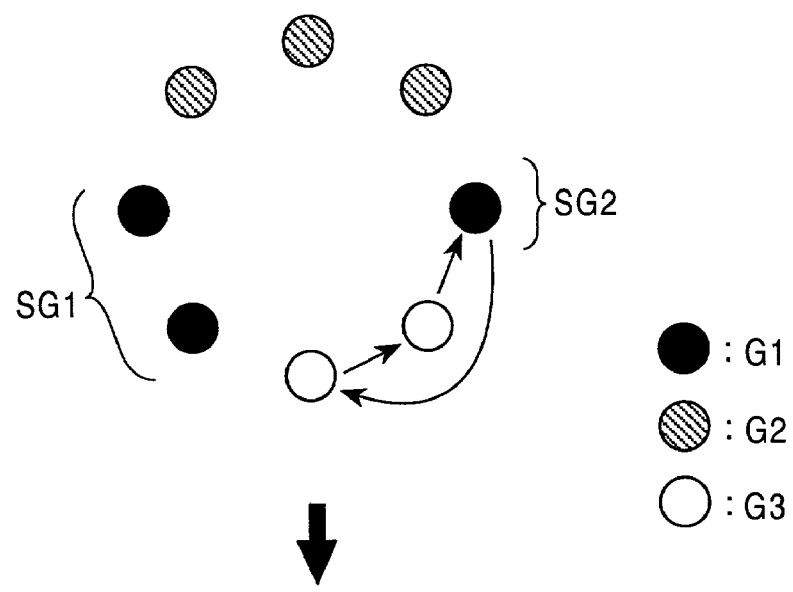
FIG. 27A and FIG. 27B are views showing example seating-order determination according to the embodiment.
Figure 27B:
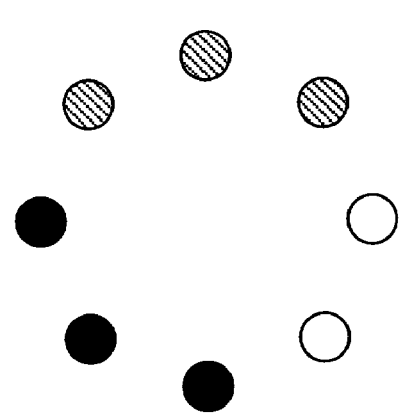

FIG. 27 shows a first example. In a state shown in FIG. 27(*a*), only a group G1 indicated by black circles is divided into sub groups SG1 and SG2. The sub group SG2 closest to the largest sub group SG1 is located in the counterclockwise direction.

In this case, the connection process performs shifting indicated by arrows in FIG. 27(*a*) to change a seating order to that shown in FIG. 27(*b*), and the seating-order determination processing is completed.

Figure 28A:
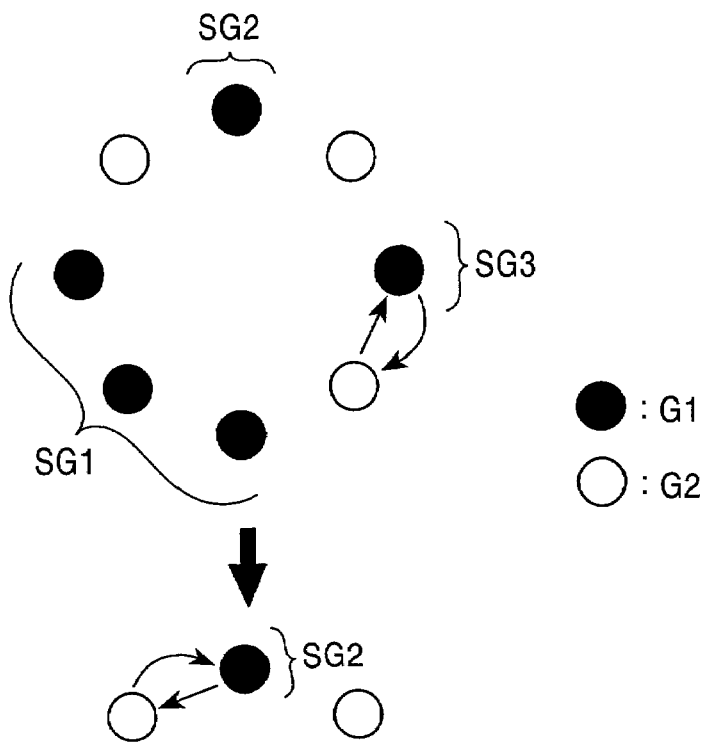
FIG. 28A, FIG. 28B, and FIG. 28C are views showing another example seating-order determination according to the embodiment.
Figure 28B:
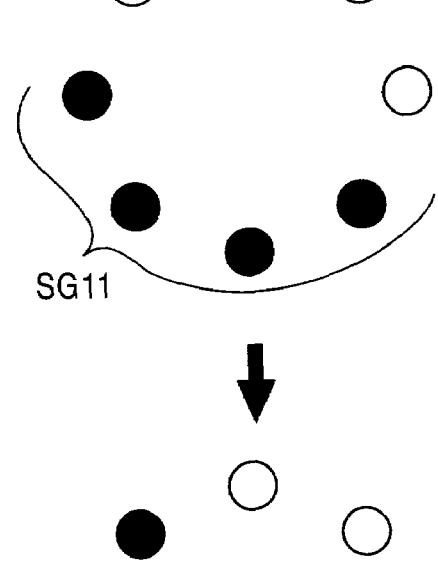
Figure 28C:
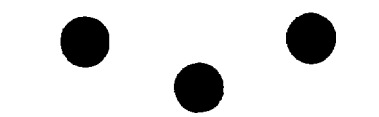

FIG. 28 shows a second example. In a state shown in FIG. 28(*a*), two groups, a group G1 indicated by black circles and a group G2 indicated by white circles, are divided. The largest divided group is the group G1. The group G1 is divided into three sub groups SG1, SG2, and SG3. The sub groups SG2 and SG3 are located at the same distance from the largest sub group SG1 clockwise and counterclockwise. In this case, according to the above-described rule, shifting is performed first so as to connect the sub group SG3, located in the counterclockwise direction from the largest sub group.

Then, as shown in FIG. 28(*b*), two sub groups SG11 and SG2 are disposed. The sub group closest to the largest sub group SG11 is SG2, and located in the clockwise direction from the largest sub group SG11.

The connection process is applied to the sub group SG2 to obtain a state shown in FIG. 28(*c*), in which the group G1 is collectively arranged.

As a result of the process, another divided group G2 is collectively arranged. A total to two repetitions of the connection process completes the seating-order determination processing.

When the seating-order determination processing is completed as described above, for example, the seating-order determiner 71 generates seating-order information showing the determined seating order and sends it to each teleconference device TCD. Together with the seating-order information, the seating-order determiner 71 sends group information indicating the state of grouping.

In the above-described case, the seating-order determiner 71 determines the seating order according to the result of group determination such that conference participants belonging to the same groups are collectively arranged. To make a viewing range small when watching members belonging to the same group, members belonging to the same groups may be arranged so as to be uniformly dispersed.

Figure 29:
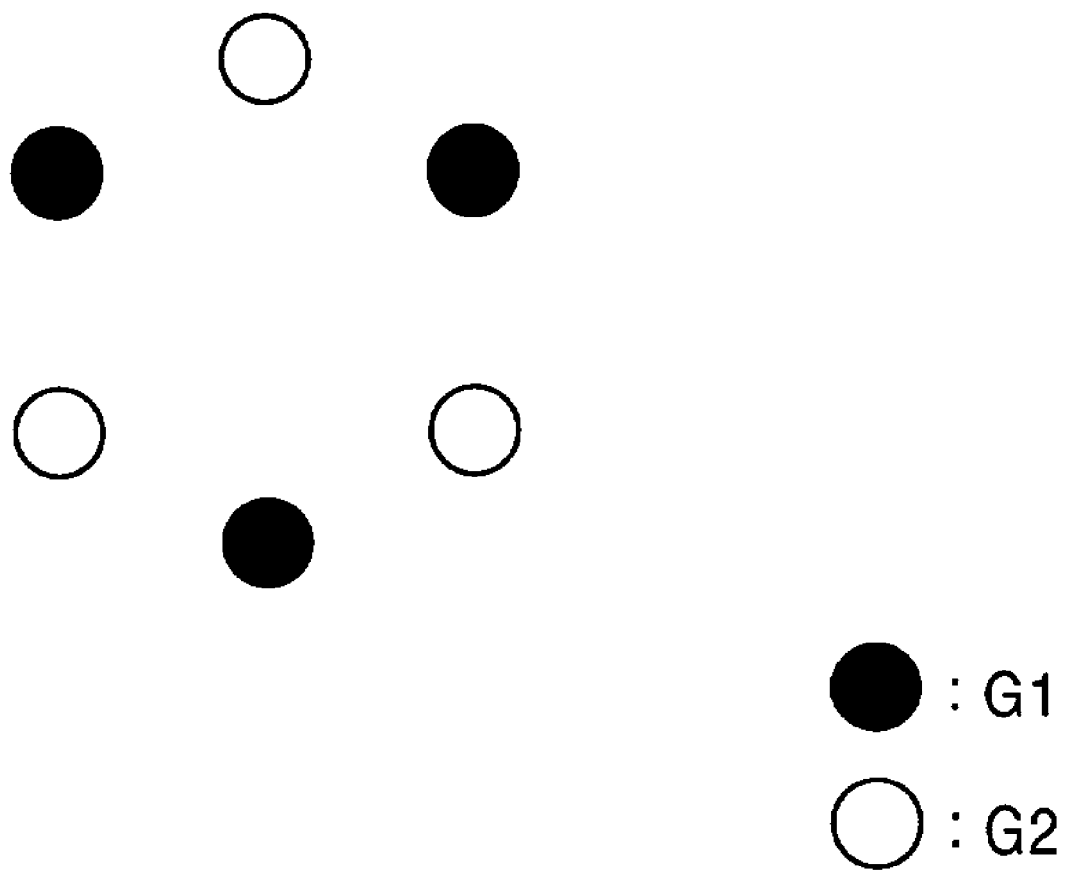
FIG. 29 is a view showing example distributed-seating-order determination according to the embodiment.

As shown in FIG. 29, for example, a seating order may be determined such that conference participants belonging to groups G1 and G2 are uniformly dispersed.

6. Seating-order Changing Processing Performed According to Seating-order Information in a Teleconference Device Operations of a teleconference device TCD, performed when image data and audio data sent from each teleconference device TCD, and the above-described seating-order information sent from the seating-order determination device GJD are received in the teleconference system according to the present embodiment will be described below. The teleconference device TCD1 will be taken as an example among the teleconference devices TCD1 to TCDn and its operations will be described.

When the information transmitting and receiving section TRB1 of the teleconference device TCD1 receives a signal sent through the communication network NT, the information transmitting and receiving section TRB1 separates the image data and the audio data corresponding to the teleconference devices TCD2 to TCDn from the signal; picks up the above-described seating-order information (including the group information); and sends the picked-up seating-order information as well as the separated image data and audio data to the information manipulation and distribution section PB1.

The information manipulation and distribution section PB1 distributes input images and/or sound to the corresponding monitor devices MD according to the seating-order information. The information manipulation and distribution section PB1 may manipulate images and/or sound to be distributed, so that, for example, a seating-order change is made easy to understand intuitively.

A specific process to be performed in the information manipulation and distribution section PB1 will be described below by taking a case as an example, in which manipulation is applied to images and sound so as to make a seating-order change easy to understand intuitively, and images and sound are sent to the corresponding monitor devices MD according to the seating-order information.

Figure 30:
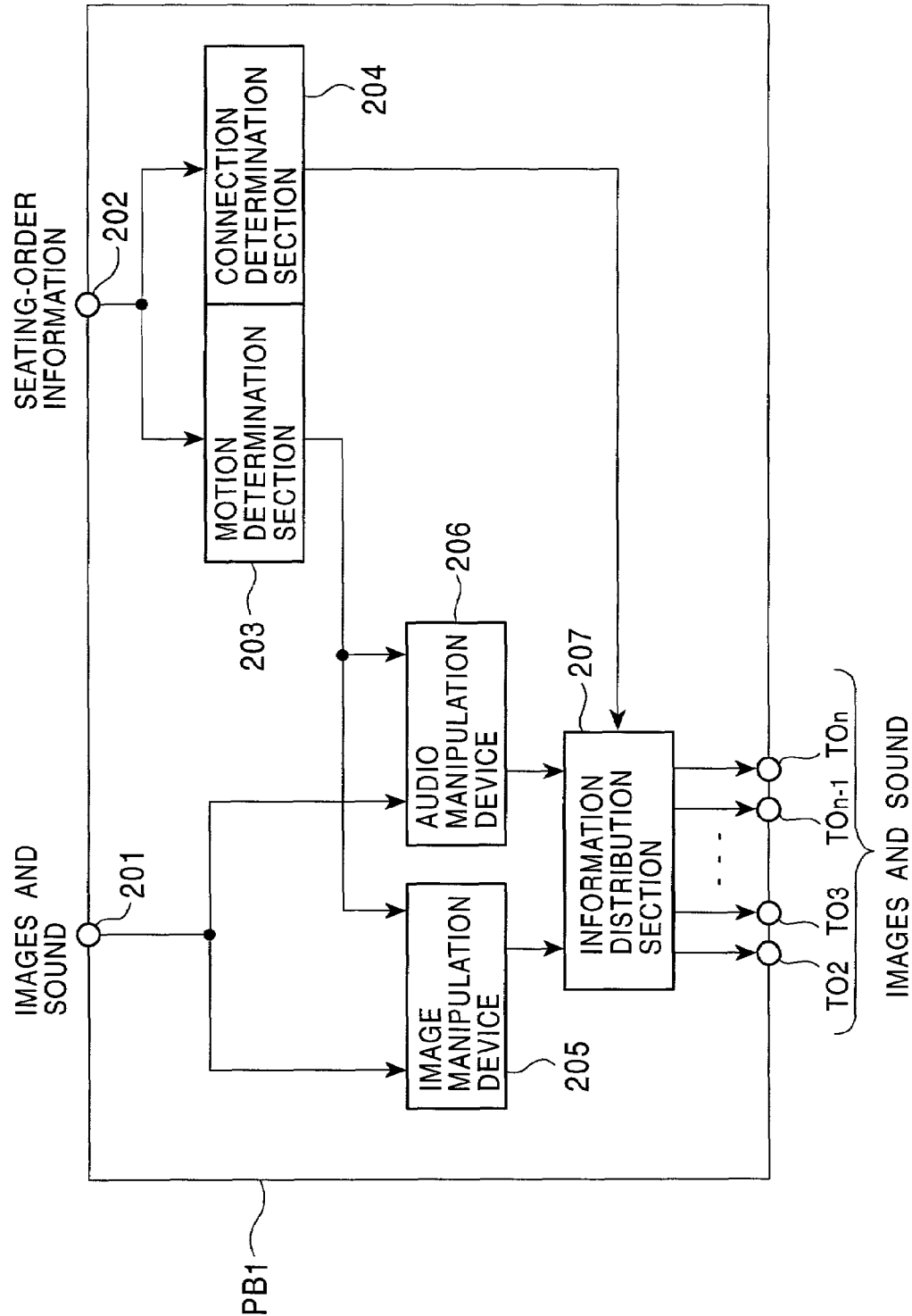
FIG. 30 is a block diagram of an information manipulation and distribution section according to the embodiment.

FIG. 30 shows the structure of the information manipulation and distribution section PB1. It includes an input terminal 201 for receiving images and sound received by the information transmitting and receiving section TRB1 shown in FIG. 2; an input terminal 202 for receiving seating-order information received by the information transmitting and receiving section TRB1; a motion determination section 203 for performing motion determination related to the seating-order information; a connection determination section 204 for determining a connection state according to the seating-order information; an image manipulation device 205 and an audio manipulation device 206 for manipulating input images and sound; and an information distribution section 207 for distributing manipulated images and sound to each monitor device MD.

The output terminals TO2 to TOn connected to the information distribution section 207 are those used for sending images and sound to the monitor devices MD2 to MDn as shown in FIG. 2.

The motion determination section 203 determines the directions and amounts of the relative motions of conference participants HM located at remote places against the conference participant HM1 located on site according to the input seating-order information, namely, determines the directions and amounts of motions related to changes in a seating order, and sends the results as motion information to the image manipulation section 205 and to the audio manipulation section 206.

Figure 31:
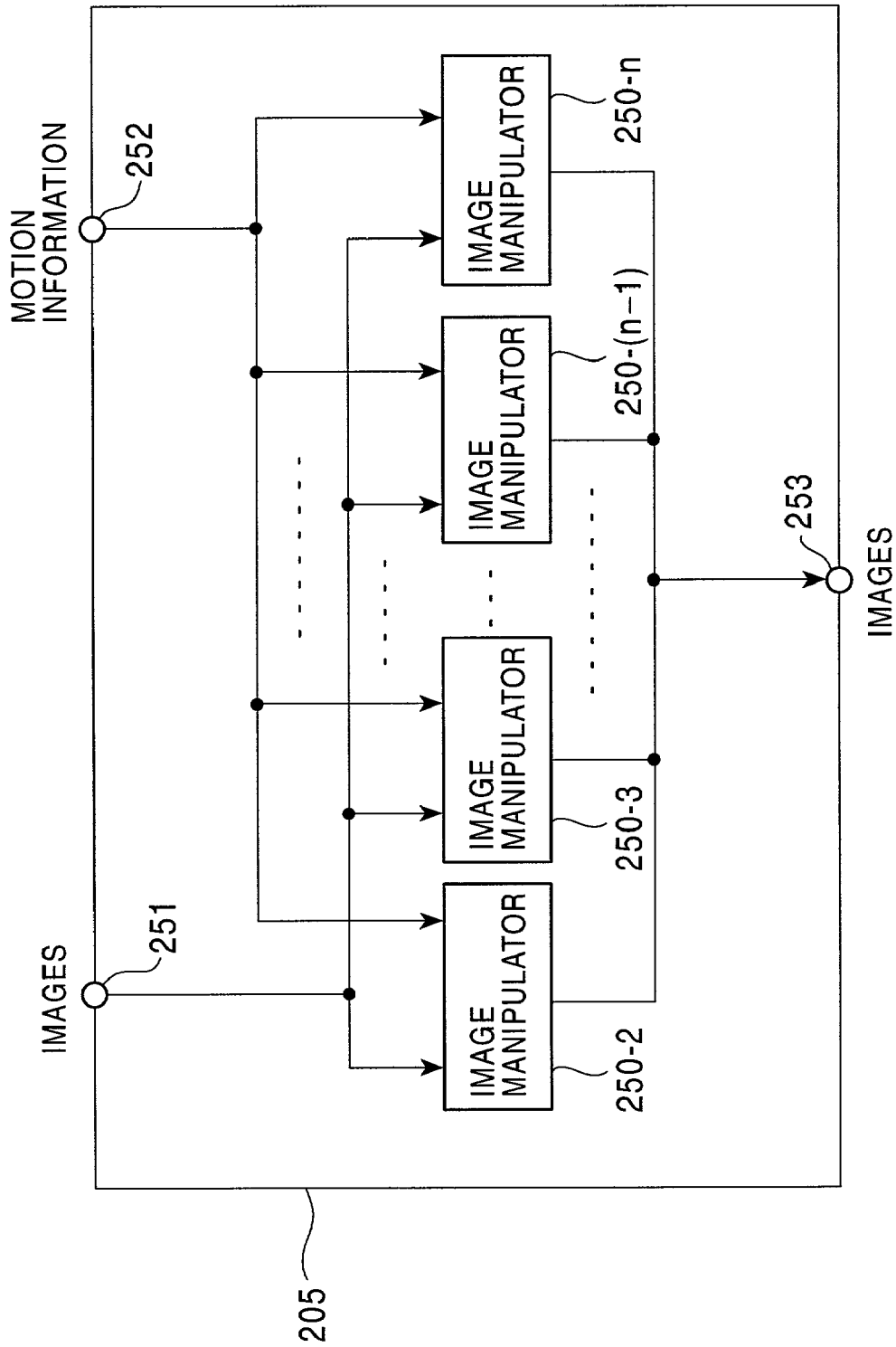
FIG. 31 is a block diagram of an image manipulation section according to the embodiment.

FIG. 31 shows the structure of the image manipulation device 205. The image manipulation device 205 includes image manipulators 250-2, 250-3, . . . , and 250-n for manipulating the input images corresponding to conference participants HM.

The images of conference participants HM are sent from an input terminal 251 to the image manipulators 250-2, 250-3, . . . , and 250-n, and the motion information is sent from the motion determination section 203 through an input terminal 252 to the image manipulators 250-2, 250-3, . . . , and 250-n.

Each of the image manipulators 250-2, 250-3, . . . , and 250-n extracts a motion related to the corresponding conference participant HM from the motion information, and manipulates the input image of the corresponding conference participant HM that the movement of the conference participant HM is intuitively easy to understand, as required, according to the extracted motion.

The manipulated images are output from an output terminal 253 to the information distribution section 207.

In an example manipulation performed in each of the image manipulators 250-2, 250-3, . . . , and 250-n, arrows indicating the directions of the relative motions of conference participants HM located at remote places against the conference participant HM1 located on site are superposed on input images.

Figure 34A:
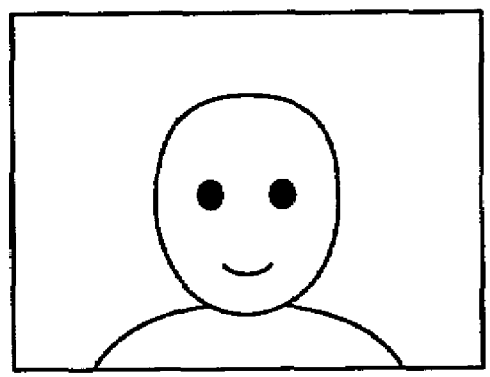
FIG. 34A and FIG. 34B are views showing example image processing applied when the seating order is changed according to the embodiment.
Figure 34B:
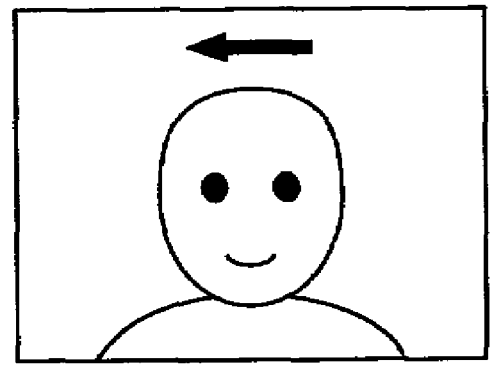

FIG. 34(a) shows an input image, and FIG. 34(b) shows a manipulated image obtained when a motion direction is left.

When a relative motion is not found, a method in which an arrow is not superposed may be used. An arrow is superposed until the time immediately before a connection is changed by the information distribution section 207, described later.

In another example manipulation performed in each of the image manipulators 250-2, 250-3, . . . , and 250-n, input images are moved on screens in the directions of the relative motions of conference participants HM located at remote places against the conference participant HM1 located on site.

Figure 35A:
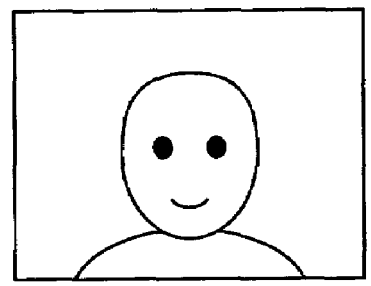
FIG. 35A, FIG. 35B, FIG. 35C, and FIG. 35D are views showing another example image processing applied when the seating order is changed according to the embodiment.
Figure 35B:
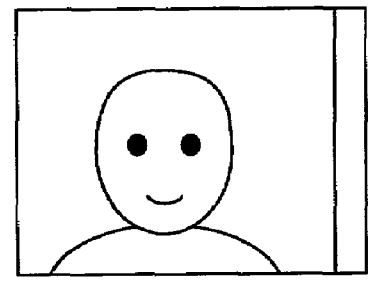
Figure 35C:
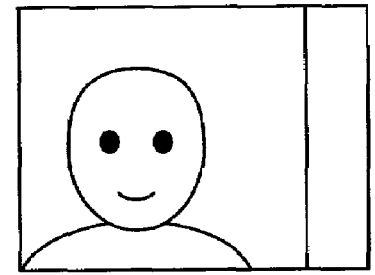
Figure 35D:
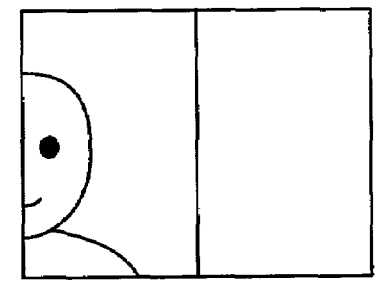

FIG. 35(a) shows an input image, and FIG. 35(b), (c), and (d) shows manipulated images obtained every time when a predetermined time elapses, if the motion direction is left. Input images are moved until the time immediately before a connection is changed by the information distribution section 207.

In still another example manipulation performed in each of the image manipulators 250-2, 250-3, . . . , and 250-n, input images are moved on screens as described above with the background being fixed and only the portion of the conference participants HM in the input images being moved.

To implement the above-described manipulation, there is a method in which backgrounds viewed from the cameras corresponding to conference participants HM located at remote places are set to blue backgrounds (BB); portions other than the blue backgrounds are extracted as conference participants from input images by the image manipulators 250-2, 250-3, . . . , and 250-n; the portions are shifted according to the corresponding motions and then attached back to the images; and a fixed background is attached to the parts other than the portions attached in the images.

Figure 36A:
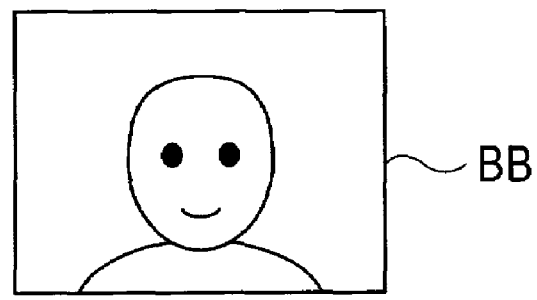
FIG. 36A, FIG. 36B, and FIG. 36C are views showing still another example image processing applied when the seating order is changed according to the embodiment.
Figure 36B:
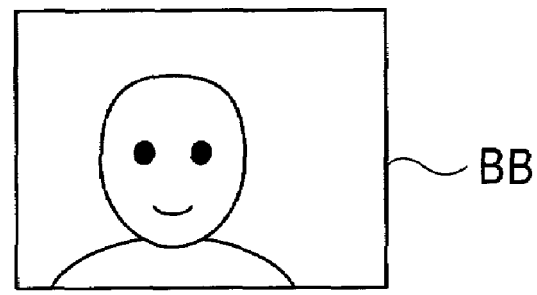
Figure 36C:
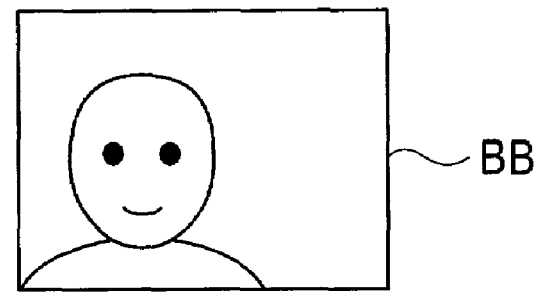

FIG. 36(a) shows an example input image, obtained before movement, FIG. 36(b) shows a manipulated image obtained when a predetermined time elapses, and FIG. 36(c) shows a manipulated image obtained when a predetermined time further elapses, if a motion direction is left. As shown in the figure, the image of the conference participant is shifted, for example, in the left direction according to the direction in which a seating order is changed with a blue background (BB) being used as a background. The image is shifted according to the corresponding motion, for example, until the time immediately before a connection is changed by the information distribution section 207, described later.

When the seating order of conference participants displayed on the monitor devices MD2 to MDn is changed, these image manipulation processes make the change and a direction in which the change is performed easy to understand for the conference participant HM1.

Figure 32:
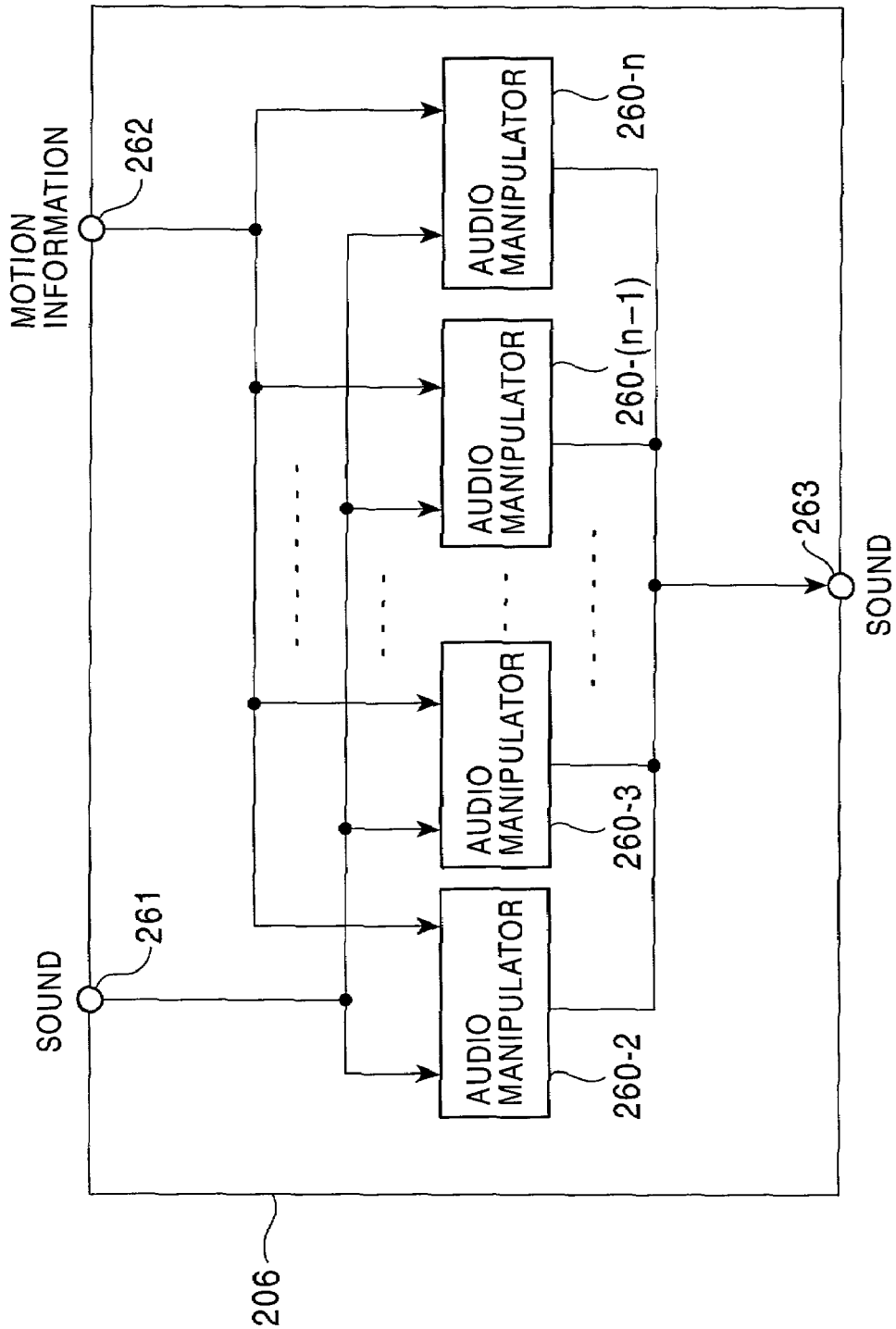
FIG. 32 is a block diagram of an audio manipulation section according to the embodiment.

FIG. 32 shows the structure of the audio manipulation device 206. The audio manipulation device 206 includes audio manipulators 260-2, 260-3, . . . , and 260-n for manipulating the input sound corresponding to conference participants HM.

The sound of conference participants HM are sent from an input terminal 261 to the audio manipulators 260-2, 260-3, . . . , and 260-n, and the motion information is sent from the motion determination section 203 through an input terminal 262 to the image manipulators 260-2, 260-3, . . . , and 260-n.

Each of the audio manipulators 260-2, 260-3, . . . , and 260-n extracts a motion related to the corresponding conference participant HM from the motion information, and manipulates the input sound of the corresponding conference participant HM so that the movement of the conference participant HM is intuitively easy to understand, as required, according to the extracted motion.

The manipulated sound is output from an output terminal 263 to the information distribution section 207.

In an example manipulation performed in each of the audio manipulators 260-2, 260-3, . . . , and 260-n, a message such as "the seating order is being changed" and/or sound indicating a change of the seating order is superposed on sound when a conference participant HM located at a remote place relatively moves against the conference participant HM1 located on site. The message and/or sound is superposed, for example, until the time immediately before or immediately after a connection is changed by the information distribution section 207, described later.

In another example manipulation, a message such as "the seating order is being changed" and/or sound indicating a change of the seating order is superposed on sound irrespective of the motion of a conference participant HM located at a remote place. The message and/or sound is superposed, for example, until the time immediately before or immediately after a connection is changed by the information distribution section 207, described later.

The connection determination section 204, shown in FIG. 30, determines a method for connecting images and sound to each monitor device MD according to the seating order information input from the input terminal 202, and sends it to the information distribution section 207 as connection information.

Figure 33:
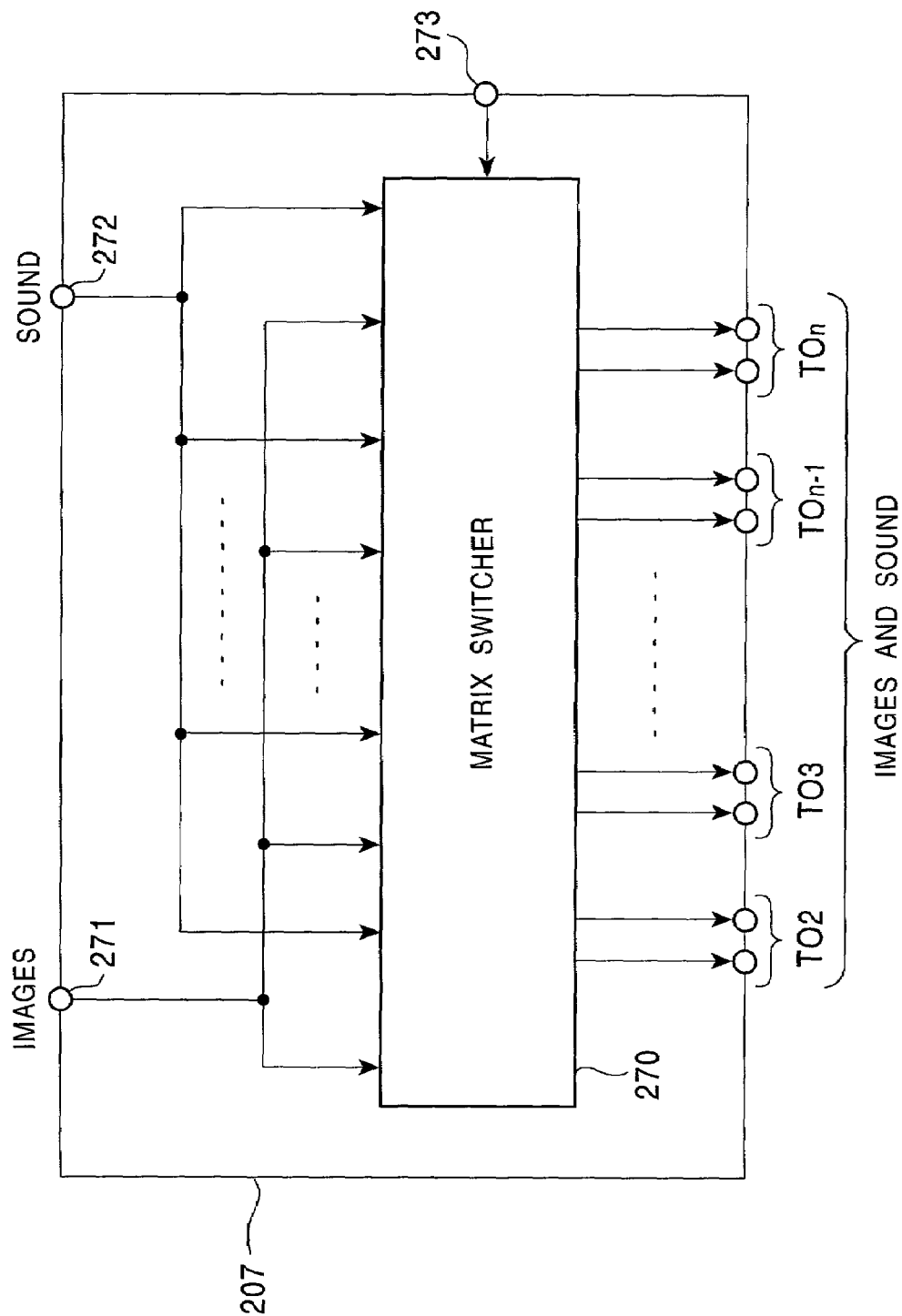
FIG. 33 is a block diagram of an information distribution section according to the embodiment.

FIG. 33 shows the structure of the information distribution section 207. Images sent from the image manipulation device 205 through an input terminal 271, and sound input from the sound manipulation device 206 through an input terminal 272 are sent to a matrix switcher 270. The images and sound are sent to each monitor device MD so as to conform to the seating-order information, according to the connection information sent from the connection determination section 204 through an input terminal 273 to the matrix switcher 270. In other words, the matrix switcher 270 switches the images and sound to the output terminals TO2 to TOn according to the connection information.

Since the information manipulation and distribution section PB has the above-described structure in the signal processing device SPD of each teleconference device TCD, a dynamic seating-order change is performed in the monitor devices MD2 to MDn according to the seating-order information generated by the seating-order determination device GJD.

The relationships (seating order) between the monitor devices MD2 to MDn and conference participants HM2 to HMn shown thereon are flexibly changed according to conversation groups made and released during a conference such that a suitable condition is made for the conference participant HM1 to do conversation.

In the foregoing description, both images and sound are handled as information related to conference participants HM located at remote places. One of them may be handled as the information.

In the foregoing description, images and sound are manipulated. Input images and/or sound may be directly sent to the information distribution section 207 without being manipulated.

When a seating-order is frequently changed, a confusion may occur as to which conversation each conference participant is doing.

To avoid such a condition, when the seating-order determination device GJD determines a seating order according to group determination as described above, a process for making the background of each conference participant HM in the corresponding image have similarity in units of groups can be applied in image processing performed by the information manipulation and distribution section PB.

More specifically, for example, backgrounds viewed from the cameras corresponding to conference participants HM located at remote places are set to blue backgrounds; the information manipulation and distribution section PB extracts these blue backgrounds as backgrounds; and changes them to backgrounds having the same colors in units of groups. The information manipulation and distribution section PB sets the background color of each image and performs image processing according to the group information. A method for setting the backgrounds of conference participants who belong to the same group as the self (conference participant HM1) to, for example, a fixed color (such as blue) can be considered so as to understand the conference participants belonging to the same group as the conference participant HM1.

Figure 37A:
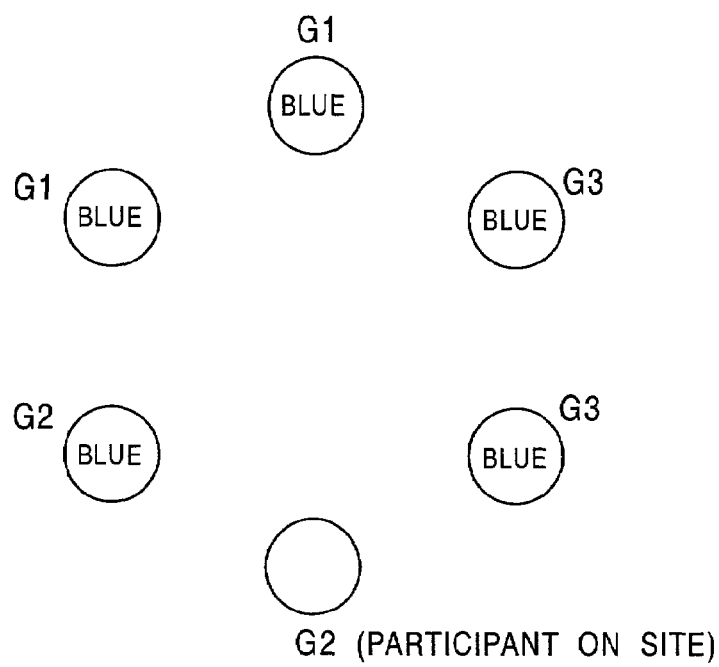
FIG. 37A and FIG. 37B are views showing example image processing for indicating groups according to the embodiment.
Figure 37B:
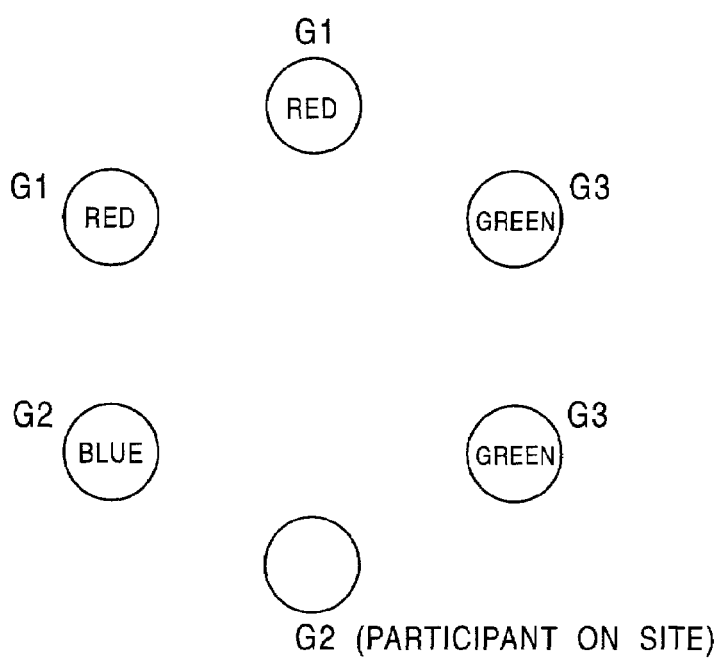

FIG. 37A and FIG. 37B show example background colors used before and after conversion. In the figure, G1 to G3 indicate the numbers of groups to which conference participants belong. In this case, in a state obtained after the conversion shown in FIG. 37B, the conference participants belonging to the group G2 understand that the conference participant having the blue background belongs to the same group, and easily understands that the group G1 having a red background and the group G3 having a green background are formed.

7. First Example of Grouping Processing which Uses a Statistical Relationship, in the Seating-order Determination Device In the foregoing case, the seating-order determination device GJD uses a group determination method based on the rule in which a link is made between a person who pays attention to another person and the another person, who attracts attention, and one group is formed of persons who are coupled directly or indirectly by links. In another case, a group can be determined by statistical relationships between attention patterns which indicate combinations of the attention destinations of conference participants, and group patterns.

In such a case, a process can be used in which the seating-order determination device GJD prepares a group determination table like that shown in FIG. 40, and converts an attention pattern to a group pattern according to the table.

A method for preparing such a group determination table in advance according to statistics will be described below. A case in which the number of conference participants is three will be taken as an example.

To make a group determination table, an experiment is performed to have actual conversation states, and time-sequential samples formed of combinations of attention patterns and group patterns are prepared, for example, at a predetermined interval.

It is possible, for example, that attention patterns are automatically obtained and group patterns are determined by a person.

Two methods for generating a group determination table according to the samples can be considered. A first method will be described first.

In this method, the most frequently generated group pattern is found for each attention pattern, and the group pattern is registered as the group pattern corresponding to the attention pattern.

An experiment is first performed in this method to record a pattern of the attention destinations of conference participants and a group pattern formed at that time at a predetermined interval to generate a frequency table between attention patterns and group patterns, like that shown in FIG. 39.

In FIG. 39, numbers (zero indicates that a conference participant pays attention to nobody) indicated below conference participants HM1 to HM3 are those of the attention destinations of the conference participants, and GP1 to GP5 indicate the numbers of group patterns.

FIG. 38 shows example definitions of group patterns.

Various group forms are defined as group patterns GP1 to GP5 as shown in FIG. 38, in which a group pattern GP1 indicates that three conference participants HM1 to HM3 have no group, a group pattern GP2 indicates a state in which conference participants HM1 and HM2 form a group, . . . .

The frequency table shown in FIG. 39 indicates that, as a result of the experiment, when the attention destinations of the conference participants HM1 to HM3 are all zero, the group pattern GP1 is formed 10034 times, the group pattern GP2 is formed 130 times, . . . , and the group pattern GP5 is formed 3024 times.

A group pattern is determined in the experiment, for example, by a person who sees the state.

According to such a frequency table, the group pattern corresponding to an attention pattern of the conference participants HM1 to HM3 is selected so as to have the highest probability, and the group determination table shown in FIG. 40 is made from the selected correspondences.

In the frequency table shown in FIG. 39, when the attention destinations of the conference participants HM1 to HM3 are all zero, the group pattern GP1 has the highest frequency. Therefore, when the conference participants HM1 to HM3 have an attention destination of 0, which is shown by (0, 0, 0), the group pattern is set to GP1.

When the conference participant HM3 has an attention destination of 1 and the other conference participants HM1 and HM2 have an attention destination of 0, which is shown by (0, 0, 1), the group pattern is set to GP4 according to the frequency table shown in FIG. 39.

A group pattern having the highest frequency is determined for each of all attention-destination patterns to make the relationships between attention-destination patterns and group patterns shown in FIG. 40.

The seating-order determination device GJD holds a group determination table generated in advance, like that described above, to determine the group corresponding to an attention pattern of the conference participants HM1 to HM3 by referring to the group determination table when it receives attention-degree information from the teleconference devices TCD, and generates seating-order information according to the group determination.

8. Second Example of Grouping Processing which Uses a Statistical Relationship, in the Seating-order Determination Device In the foregoing case, all attention patterns are independently handled when the frequency table between attention patterns and group patters is generated. In a second case, attention patterns similar to each other are collectively handled to generate a frequency table, and a group determination table is formed according the frequency table.

When attention-destination patterns of the conference participants HM1 to HM3 are (0, 0, 2), (0, 1, 0), (0, 3, 0), (2, 0, 0), and (3, 0, 0), for example, their mutual attention-destination relationships are substantially the same as attention destinations obtained by rotating and/or inverting those of (0, 0, 1). Therefore, for example, the group patterns GP1, GP2, GP3, GP4, and GP5 corresponding to an attention pattern of (0, 0, 2) are regarded as the same as the group patterns GP1, GP2, GP3, GP4, and GP5 corresponding to an attention pattern of (0, 0, 1), obtained by inverting (applying inversion for a segment drawn from the conference participant HM3 to the middle of the conference participants HM1 and HM2 to) the group patterns of the attention pattern of (0, 0, 2), similar attention patterns are collectively handled as an attention pattern of (0, 0, 1), and then statistics is obtained.

In this case, when an attention pattern of (0, 0, 1) corresponds to determination group patterns GP1, GP2, GP3, GP4, and GP5 in a group determination table, an attention pattern of (0, 0, 2) corresponds to the determination group patterns GP1 GP2, GP3, GP4, and GP5.

In other words, in the second case, each set of attention patterns which are made the same by rotation or inversion is represented by a representative attention pattern, statistics is obtained for representative attention patterns, a group-pattern determination table is generated from the statistics for the representative attention patterns, and finally, a group determination table is generated for all attention patterns.

With the use of such a method, it is expected that individuality is avoided and highly reliable determination is made with a relatively small number of samples.

A detailed procedure for generating a group determination table in the second case will be described below.

Prior to the generation of a group determination table based on statistics, a conversion table for converting actual attention patterns and actual group patterns to representative attention patterns and representative group patterns is generated in advance.

In the same way as in the first case, a condition in which the number of conference participants is three is taken as an example. An attention-pattern conversion table shown in FIG. 41, a group conversion table shown in FIG. 42, and a group inverted-conversion table shown in FIG. 45 need to be prepared in advance.

The attention-pattern conversion table shown in FIG. 41 shows which representative pattern serves as a representative of an attention pattern, and which conversion method is used for converting an attention pattern to a representative attention pattern.

As a representative attention pattern, an attention pattern having the smallest number is selected when the attention-destination numbers of the conference participants HM1, HM2, and HM3 are regarded as a third digit, a second digit, and a first digit, respectively, to form a decimal number.

Figure 46A:
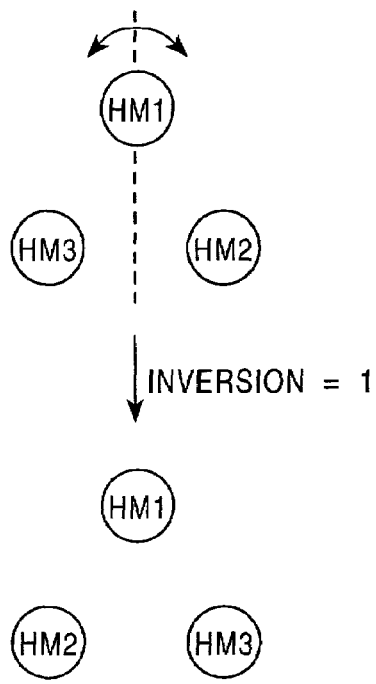
FIG. 46A and FIG. 46B are views showing group conversion methods according to the embodiment.
Figure 46B:
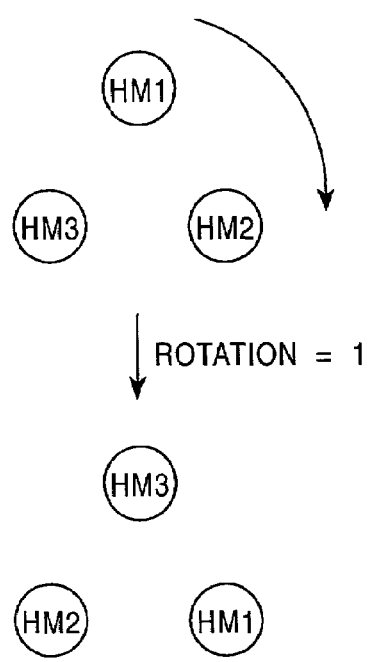

Conversions are expressed by whether inversion is performed and the number of rotations under a rule in which inversion is performed first and then rotation is performed. FIG. 46A and FIG. 46B show the axis of inversion and the direction of rotation. Examples of inversion and rotation are shown in FIG. 46A and FIG. 46B.

In the attention-pattern conversion table shown in FIG. 41, whether inversion is performed is indicated by "0," which shows no inversion, and "1," which shows that inversion is performed.

The number of rotations means the number of rotations performed in the direction shown in FIG. 46B.

The group conversion table shown in FIG. 42 indicates that each group pattern is converted to which group pattern when the above-described inversion and rotation are performed.

More specifically, group patterns obtained when neither inversion nor rotation is applied to each group pattern, when rotation is applied once, when rotation is applied twice, when only inversion is applied, when inversion is applied and then rotation is applied once, and when inversion is applied and then rotation is applied twice are shown in the table.

When attention patterns in samples are converted to representative attention patterns, this table is used for obtaining group patterns corresponding to group patterns in samples which match the conversion. Details will be described later.

The group-pattern inverted-conversion table shown in FIG. 45 indicates a group pattern obtained when the inverted conversion of a specified conversion is applied to each group pattern, and is used for generating the group determination table shown in FIG. 40 from a representative-group determination table shown in FIG. 44, described later.

A device structure and a generation procedure for generating the group determination table shown in FIG. 40 from these tables will be described next.

Figure 47:
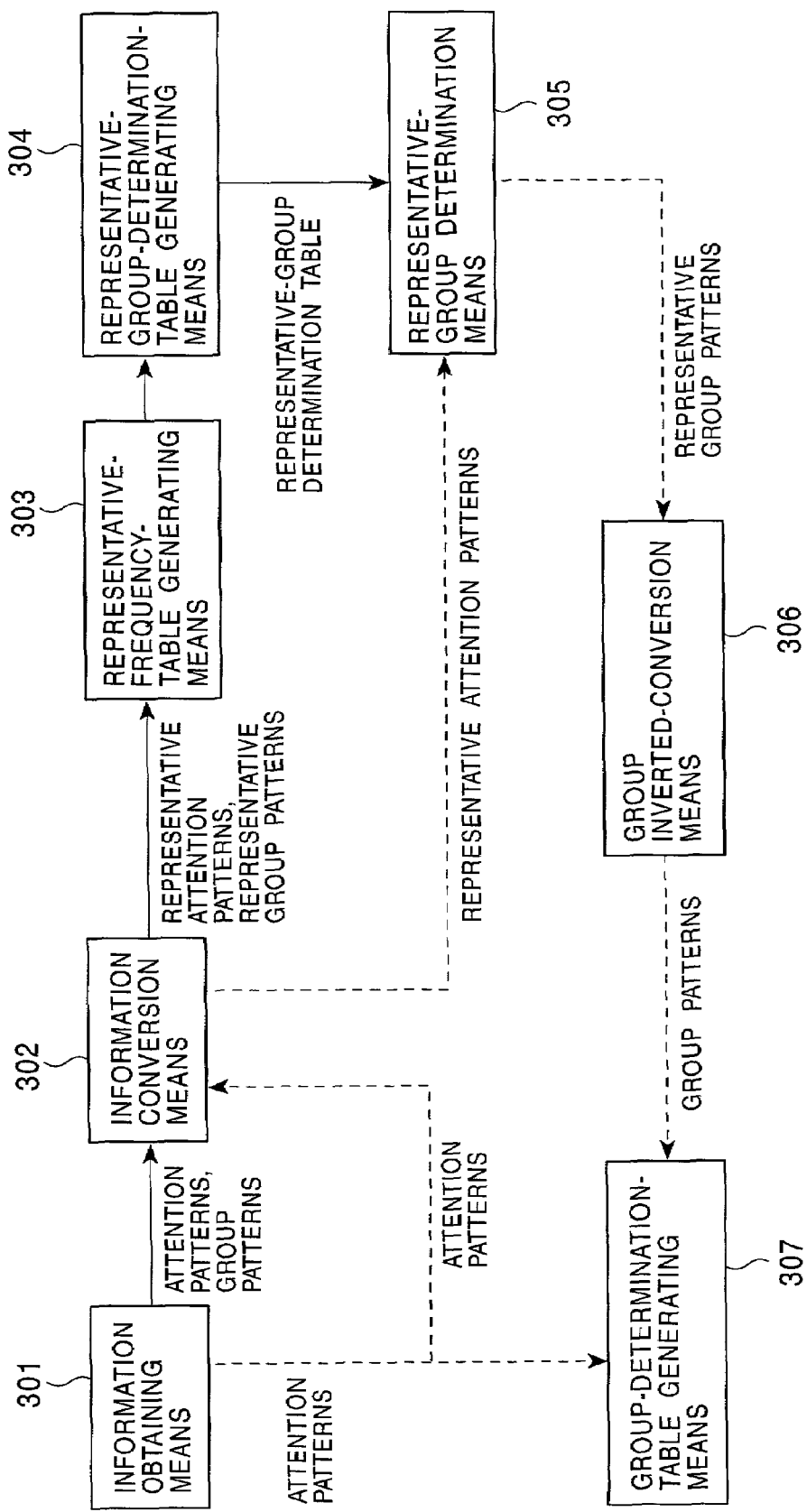
FIG. 47 is a functional block diagram of a group-determination-table generating device according to the embodiment.

FIG. 47 shows functional blocks of a device for generating the group determination table shown in FIG. 40.

Each block can be implemented by either software or hardware. A group-determination-table generating device having the functional blocks shown in FIG. 47 may be built, for example, in the seating-order determination device GJD, or may be implemented, for example, by a personal computer which is a separate device from the seating-order determination device GJD. In either case, when the seating-order determination device GJD is finally made to hold a generated group determination table, if it receives attention-degree information from the teleconference devices TCD, it determines the group corresponding to an attention pattern of the conference participants HM1 to HM3 by referring to the group determination table and generates seating-order information according to the group determination.

The group-determination-table generating device includes, as shown in FIG. 47, information obtaining means 301, information conversion means 302, representative-frequency-table generating means 303, representative-group-determination-table generating means 304, representative-group determination means 305, group inverted-conversion means 306, and group-determination-table generating means 307.

The information obtaining means 301 obtains attention patterns and group patterns as samples obtained in an experiment.

The information conversion means 302 uses the pattern conversion table shown in FIG. 41 and the group conversion table shown in FIG. 42 to convert the attention patterns and the group patterns obtained by the information obtaining means 301.

The representative-frequency-table generating means 303 generates a representative frequency table like that shown in FIG. 43 according to representative attention patterns and representative group patterns.

The representative-group-determination-table generating means 304 generates a representative group determination table like that shown in FIG. 44 according to the representative frequency table.

The representative-group determination means 305 searches the representative-group determination table shown in FIG. 44 to determine the representative group pattern corresponding to a representative attention pattern.

The group inverted-conversion means 306 inverted-converts representative group patterns to group patterns.

The group-determination-table generating means 307 generates the group determination table shown in FIG. 40 from group patterns and attention patterns.

In FIG. 47, solid lines with arrows indicate a flow of generating the representative-group determination table shown in FIG. 44, and dotted lines with arrows indicate a flow of generating the group determination table shown in FIG. 40 from the representative-group determination table.

The group-determination-table generating device having such a structure first generates a representative frequency table such as that shown in FIG. 43.

All attention patterns and group patterns in samples are first converted to representative attention patterns and to group patterns (hereinafter, for convenience, called representative group patterns) to which conversion matching the conversion from the attention patterns to the representative attention patterns is applied, and the frequencies of the representative group patterns for each representative attention pattern are indicated in a representative frequency table.

Figure 48:
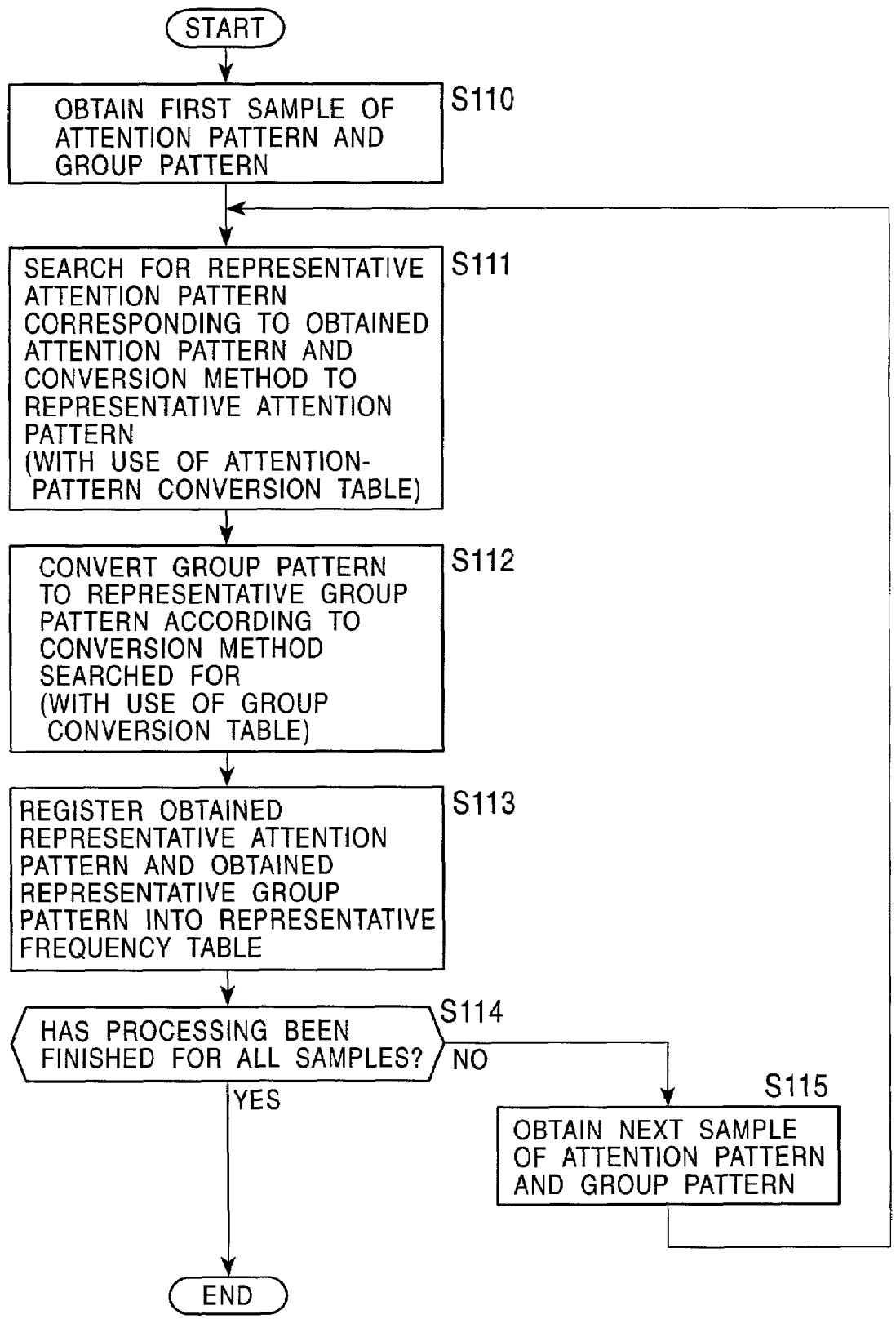
FIG. 48 is a flowchart of processing for generating the representative frequency table according to the embodiment.

FIG. 48 shows processing for generating the representative frequency table.

In FIG. 48, "registration to representative frequency table" means that the frequency of a representative attention pattern and a corresponding representative group pattern is incremented by one.

In step S110, the information obtaining means 301 obtains a first sample of an attention pattern and a group pattern. Then, in the next step S111, the information conversion means 302 uses the attention-pattern conversion table to search for the representative attention pattern corresponding to the attention pattern obtained as the sample and a conversion method to the representative attention pattern.

In the next step S112, the information conversion means 302 uses the group conversion table shown in FIG. 42 to convert the group pattern to a representative group pattern according to the conversion method searched for in step S111.

With these steps S111 and S112, the representative attention pattern and the representative group pattern are obtained for the one obtained sample.

In the next step S113, the representative-frequency-table generating means 303 registers the obtained representative attention pattern and the obtained representative group pattern into the representative frequency table shown in FIG. 43. In other words, the cell corresponding to the current sample is incremented by one.

In step S114, it is determined whether the processing has been finished for all samples. When the processing has not yet been finished, the information obtaining means 301 obtains the next sample of an attention pattern and a group pattern in step S115, the processing returns to step S111, and the same processes as described above are performed.

Therefore, when the processes of steps S111, S112, and S113 have been finished for all samples, the representative frequency table shown in FIG. 43 has been completed.

Next, the representative-group determination table shown in FIG. 44 is generated from the representative frequency table generated as described above.

The representative-group determination table indicates the representative group pattern corresponding to each representative attention pattern. A representative attention pattern in each entry (row) is the same as that shown in the representative frequency table.

Figure 49:
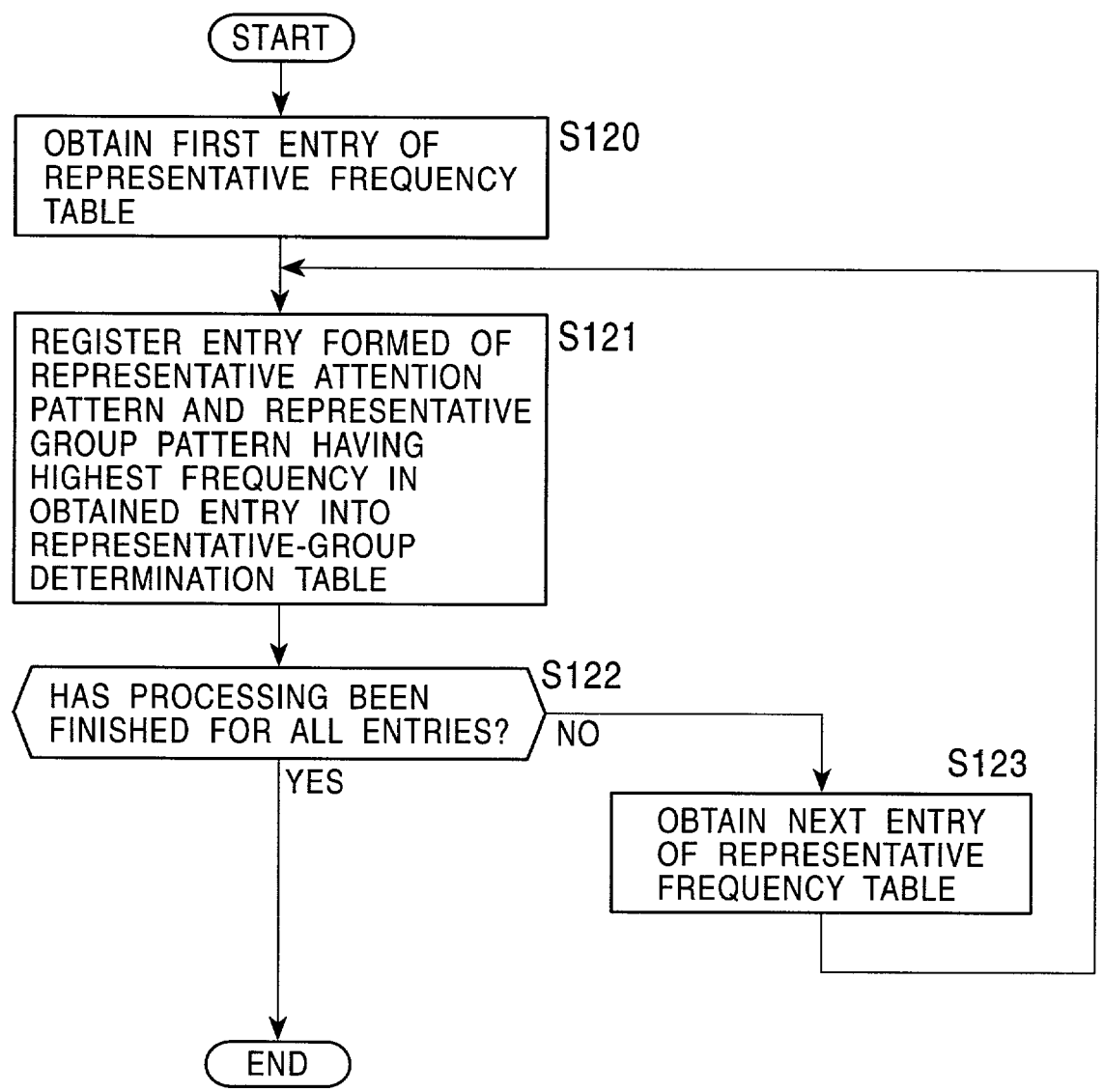
FIG. 49 is a flowchart of processing for generating the representative-group determination table according to the embodiment.

The representative-group determination table is generated by registering, as the representative group pattern corresponding to each representative attention pattern, the representative group pattern having the highest frequency for each representative attention pattern among representative group patterns. FIG. 49 shows the specific procedure of generating the table.

The representative-group-determination-table generating means 304 obtains a first entry of the representative frequency table generated by the representative-frequency-table generating means 303 in step S120. In step S121, the representative-group-determination-table generating means 304 determines the representative-group pattern having the highest frequency for the representative attention group in the obtained entry, and registers it to the representative-group determination table.

In the representative frequency table shown in FIG. 43, for example, the frequencies of representative group patterns are indicated for a representative attention pattern of (0, 0, 0) in a first entry. The representative group pattern GP1 has the highest frequency. Therefore, as shown in a first row of the representative-group determination table shown in FIG. 44, the representative group pattern GP1 is registered correspondingly to a representative attention pattern of (0, 0, 0).

In step S122, it is determined whether the processing has been finished for all entries in the representative frequency table. When the processing has not yet been finished, the next entry is obtained in step S123 and the processing returns to step S121.

When the process of step S121 is finished for all entries, the processing is finished at step S122.

With the above-described processing, the representative-group determination table shown in FIG. 44 is generated from the representative frequency table shown in FIG. 43. The processing performed so far corresponds to the flow indicated by the solid lines in FIG. 47.

The group determination table shown in FIG. 40 is finally generated from the representative frequency table.

The group determination table includes all attention patterns. To generate the group determination table, the group pattern having the "relationship between the representative attention pattern and the representative group pattern registered therefor" corresponding to each attention pattern in the representative-group determination table, which relationship matches the "relationship between the attention pattern and the group pattern registered therefore" is registered.

Figure 50:
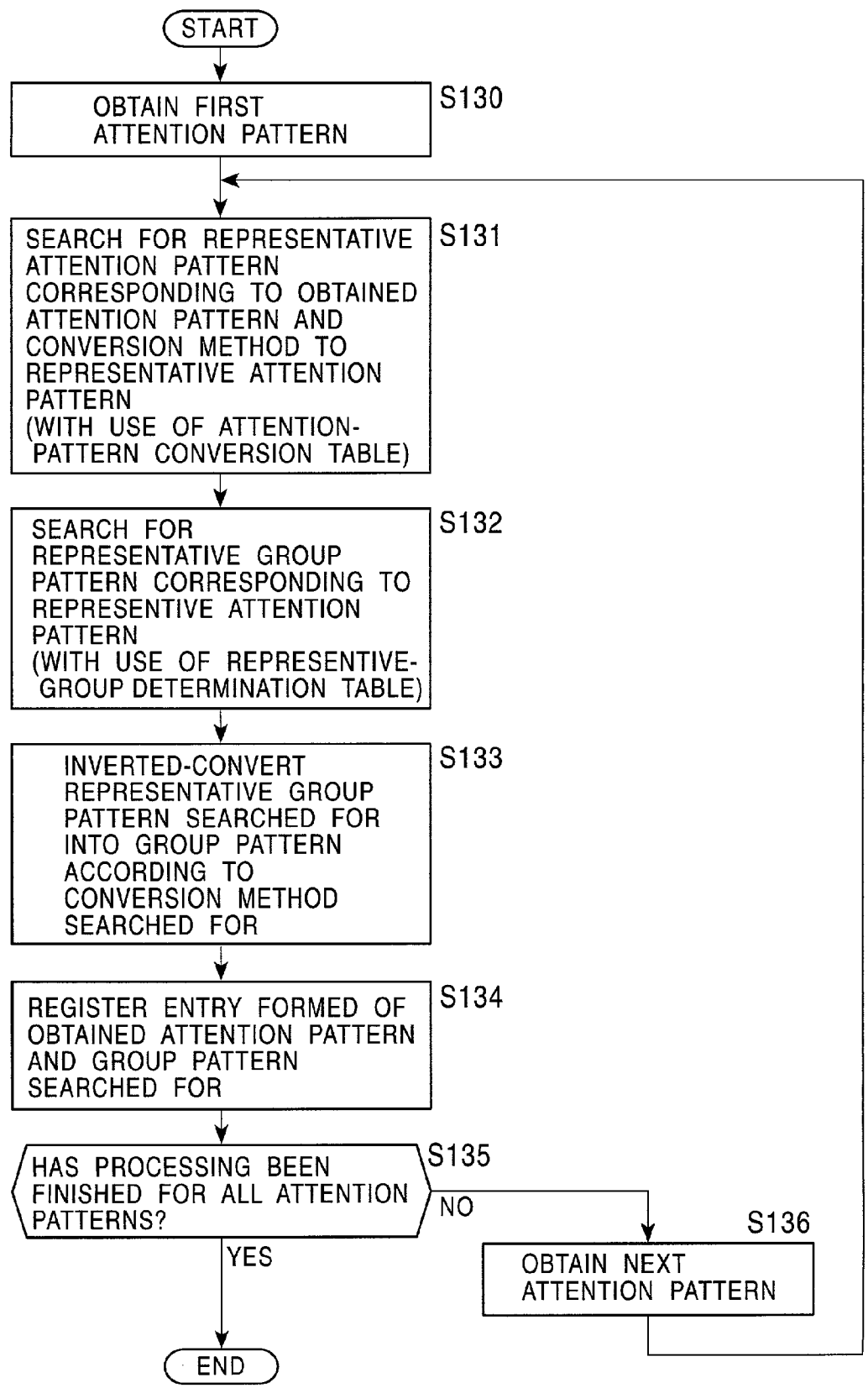
FIG. 50 is a flowchart of processing for generating the group determination table according to the embodiment.

FIG. 50 shows a specific procedure for generating the group determination table. (The procedure corresponds to the flow indicated by the dotted lines in FIG. 47).

After the representative-group determination table is generated as described above, in step S130 shown in FIG. 50, the information obtaining means 301 obtains a first attention pattern. In step S131, the information conversion means 302 uses the attention-pattern conversion table to search for a representative attention group and a conversion method to the representative attention pattern for the obtained attention pattern. The result of searching is passed to the representative-pattern determination means 305.

In the next step S132, the representative-group determination means 305 uses the representative-group determination table to search for the representative group pattern corresponding to the representative attention pattern passed from the information conversion means 302. The result of searching is passed to the group inverted-conversion means 306 as the representative group pattern.

In step S133, the group inverted-conversion means 306 uses the group inverted-conversion table shown in FIG. 43 to inverted-converts the representative group pattern passed from the representative-group determination means 305 to a group pattern.

In step S134, the group-determination-table generating means 307 registers an entry formed of the attention pattern obtained by the information obtaining means 301 as described above, and the group pattern sent from the group inverted-conversion means 306 into the group determination table.

In step S135, it is determined whether the processing has been finished for all attention patterns. When the processing has not yet been finished, the next attention pattern is obtained in step S136, and the processing returns to step S131.

When registration has been made to the group determination table for all attention patterns, the processing is finished at step S135.

With the above-described processing, the group determination table shown in FIG. 40 is generated.

A group determination table used for group determination is generated as described above. The seating-order determination device GJD performs grouping with the use of a group determination table to generate seating-order information.

9. Seating-order Determination Operation Not Through Grouping in the Seating-order Determination Device So far, a case has been described in which the seating-order determination device GJD first performs group determination and then determines a seating order according to the result of group determination. A seating order can be determined without performing group determination. An example case will be described below.

The seating-order determination device GJD holds an information request degree $R_{ij}$ indicating a degree at which each conference participant $HM_i$ wants the information of another conference participant $HM_j$. It is considered, for example, that the information request degree is high for an attention destination at a point of time close to the current time. When a conference participant $HM_i$ paid attention to conference participants HM2 and HM5 in the past and currently pays attention a conference participant HM3, for example, the information request degrees of the conference participant $HM_i$ for these conference participants are set to areas $R_{i2}$, $R_{i5}$, and $R_{i3}$ located under a curve shown in FIG. 52. The curve shown in the figure is based on an exponential function for a constant K larger than zero and smaller than one.

More specifically, the seating-order determination device GJD checks whether each conference participant $HM_i$ pays attention to another conference participant $HM_j$ at a constant interval, and sets a variable $A_{ij}$ indicating whether attention is paid to "1" when the conference participant $HM_i$ pays attention to the conference participant HMj, and sets it to "0" when the conference participant HMi does not pay attention to the conference participant HMj.

When attention checking is finished, the seating-order determination device GJD calculates the information request degree of the conference participant HMi for the conference participant HMj at a time "t" by the following expression (1).

$$Rij(t)=KRij(t-1)+Aij(t) \quad (1)$$

where, K is an attenuating coefficient.

Figures 51, 52:
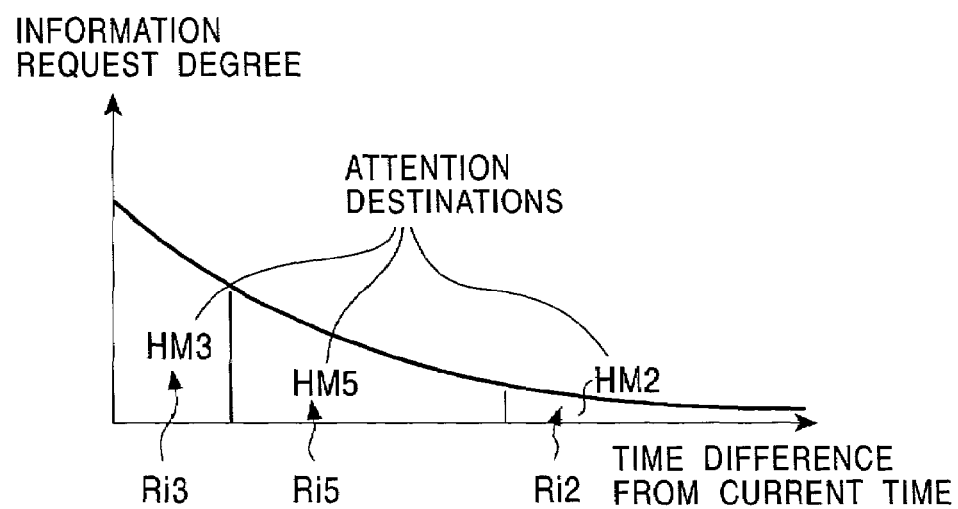
FIG. 51 is a view showing a satisfaction-degree weight table according to the embodiment.
FIG. 52 is a view showing example degrees of attentions paid to participants according to the embodiment.

Then, the seating-order determination device GJD calculates an overall satisfaction degree Sm of the entire conference participants for each of all possible seating-order candidates (seating-order number m). The following expression (2) is used.

$$S_m = \sum_i \sum_j Wmij \cdot Rij \quad (2)$$

where, Wmij is a satisfaction-degree weighting coefficient determined in advance for each information request degree in each seating order, and held, for example, in a satisfaction-degree weighting table shown in FIG. 51.

The table shown in FIG. 51 shows a case in which the number of conference participants is six. Characters A to F correspond to seat numbers, and numerals 1 to 6 shown therebelow correspond to conference participants HM1 to HM6.

Since the relative positional relationships among conference participants are meaningful in a seating order, when it is specified, for example, that a conference participant HM1 is always assigned to a seat A, the number of seating orders is equal to the number of the permutations of five things, which is 120, and a seating-order number ranges from 1 to 120.

Figure 53:
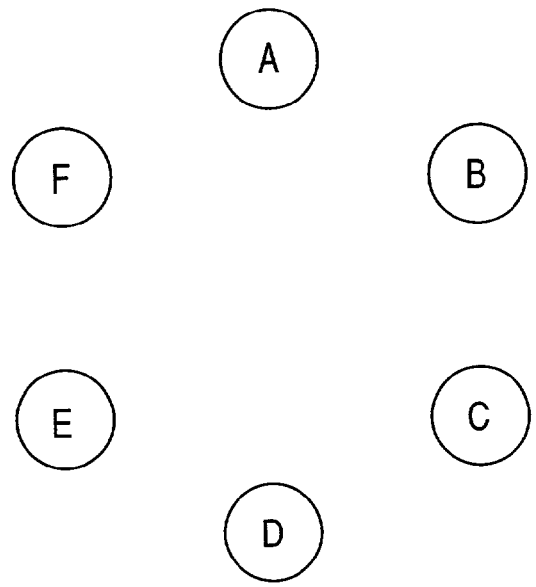
FIG. 53 is a view showing the names of seats according to the embodiment.

FIG. 53 shows an example arrangement of seats A to F.

The satisfaction-degree weight Wmij shown in FIG. 51 is set, for example, larger when the distance between HMi and HMj is closer in a seating order "m." More specifically, for example, the reciprocal 1/Dij_1 of the number Dij_1 indicating that HMj is located at the Dij_1-th position from HMi, or the reciprocal 1/Dij_2 of a number Dij_2 indicating the distance between HMi and HMj when the distance between adjacent seats is set to "1" can be used as the satisfaction-degree weight.

Figure 54:
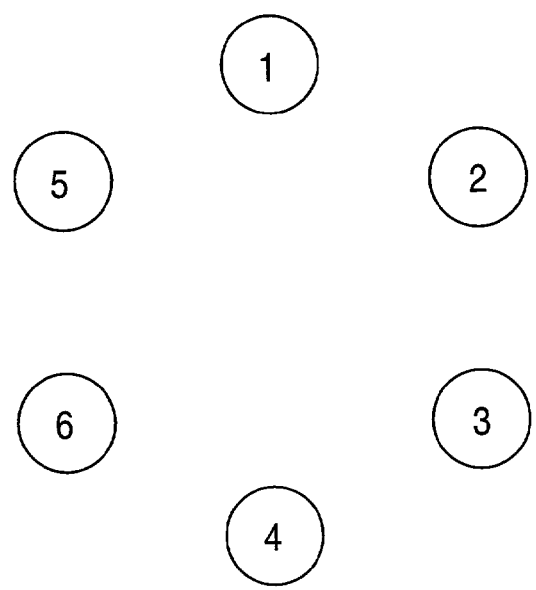
FIG. 54 is a view showing an example seating order according to the embodiment.

In a seating order shown in FIG. 54, D16_1 is 2, and D16_2 is √3.

The seating-order determination device GJD determines the seating order corresponding to the maximum satisfaction degree Sm as a result of calculation. When there is a plurality of the maximum satisfaction degrees Sm, the seating order which makes the sum of the distances of movements required for the other conference participants, viewed from each conference participant smallest, or the seating order which has the smallest seating-order number can be selected.

10. Attention-degree-information Generating Operation in a Teleconference Device Various operations for dynamically changing a seating order according to the attention degrees of conference participants have been described. A specific processing for detecting a direction (direction toward any of the monitor devices MD2 to MDn or another direction) in which a conference participant HM1 pays attention, according to image data sent, for example, from the camera of the monitor device MDm disposed at the front of the conference participant HM1 in the attention-degree-information generating section JB1 shown in FIG. 2 will be described.

As a first example of the processing for detecting a direction in which the conference participant HM1 pays attention, to be performed in the attention-degree-information generating section JB1 of the teleconference device TCD1 according to the present embodiment, the detection (sight-line detection) of the lines of sight of the conference participant HM1 can be taken.

Figure 55:
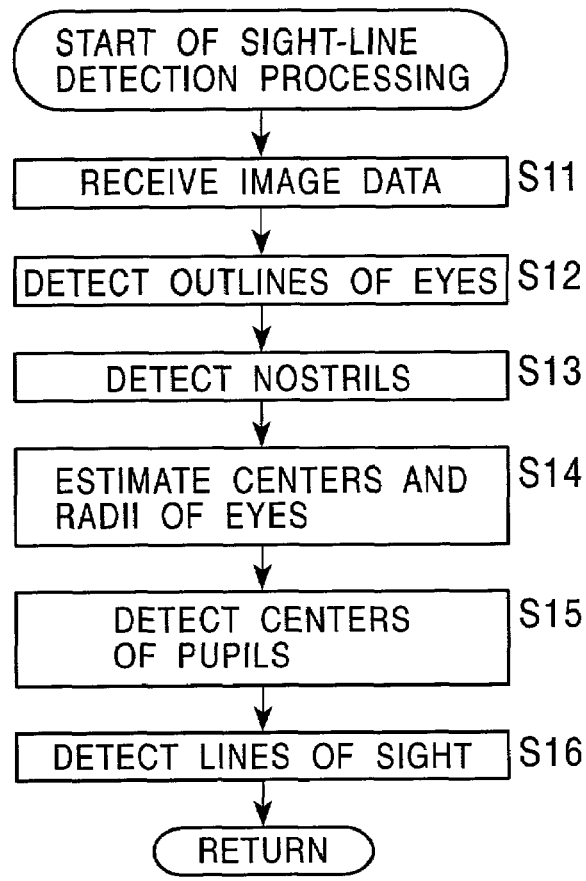
FIG. 55 is a flowchart of sight-line detection processing according to the embodiment.

FIG. 55 is a flowchart of sight-line detection processing in the attention-degree-information generating section JB1.

Figure 56:
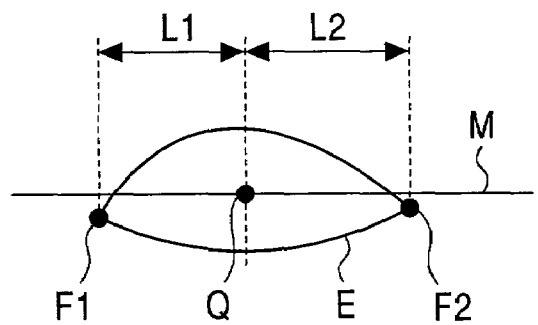
FIG. 56 is a view showing detection of both-end positions of an eye according to the embodiment.

In FIG. 55, the attention-degree-information generating section JB1 receives image data captured by the camera provided, for example, for the monitor device MDm disposed at the front of the conference participant HM1 in step S111. In the next step S12, the attention-degree-information generating section JB1 uses the color information of the sent image to detect the outlines of both eyes of the conference participant HM1 in a facial image. More specifically, the attention-degree-information generating section JB1 extracts color areas, such as skin, whites, and irises, by using the color information of the sent image, and obtains, for example, the boundaries of the extracted color areas to detect the outline E of the right eye and that of the left eye as shown in FIG. 56. FIG. 56 indicates only one eye.

Figure 57:
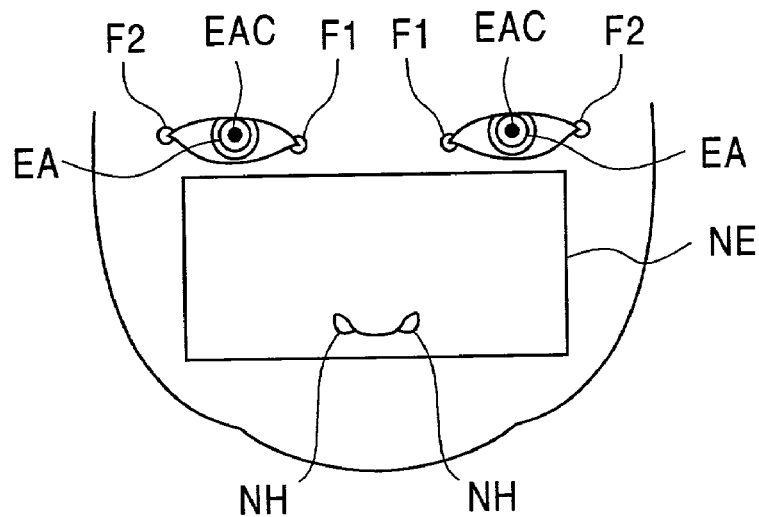
FIG. 57 is a view showing a nostril-position detection area according to the embodiment.

Then, in step S13, the attention-degree-information generating section JB1 obtains the positions of the leftmost point F1 and the rightmost point F2 of the right eye and those of the left eye according to the outlines E of both eyes obtained in step S12, determines a search area NE for searching for the nostrils, as shown in FIG. 57, with the positions of the rightmost and leftmost points F2 and F1 of the right and left eyes being used as references, and detects the positions of the nostrils NH in the search area NE. More specifically, the attention-degree-information generating section JB1 obtains a line M which makes the center Q of gravity of the sets of pixels constituting the outlines E of the right and left eyes and the secondary moment (inertia for the line) of the sets of pixels constituting the outlines E smallest; obtains pixels one each in the right and left directions, located at the largest distances L1 and L2 from the center Q of gravity in the directions of line M; and obtains the pixels as the rightmost and leftmost points F2 and F1, as shown in FIG. 56.

Next, the attention-degree-information generating section JB1 uses the positions of the rightmost and leftmost points F2 and F1 of the right and left eyes, obtained as described above, as references and determines the search area NE for searching for the nostrils in the lower direction from the rightmost and leftmost points F2 and F1, as shown in FIG. 57. Since the images of the nostrils NH are darker than that of the other parts, the attention-degree-information generating section JB1 detects low-luminance image areas as the positions of the nostrils NH in the search area NE.

Figure 58:
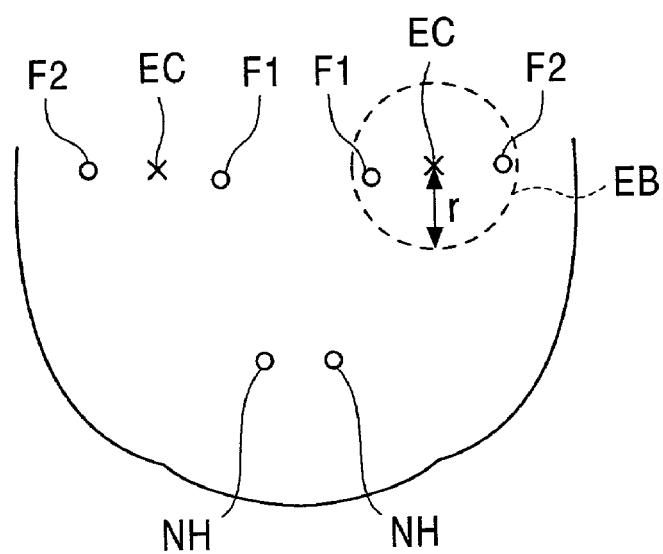
FIG. 58 is a view showing the both-end positions of eyes, nostril positions, and eyeball-center positions according to the embodiment.
Figure 59:
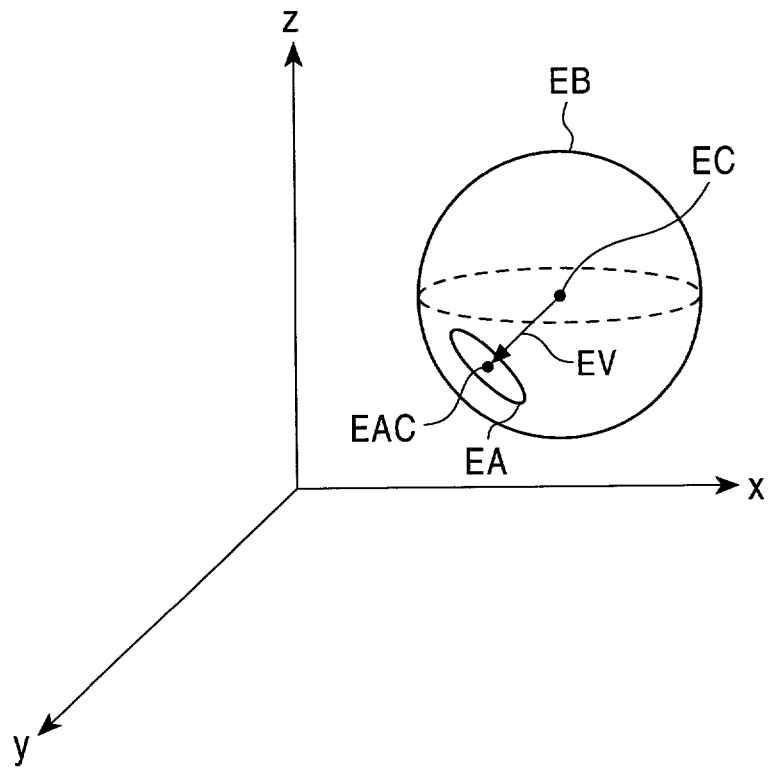
FIG. 59 is a view showing detection of a sight-line direction according to the embodiment.

Then, in step S14, the attention-degree-information generating section JB1 assumes the central positions ECs of the eyeballs EBs and the radius "r" of the eyeballs EBs according to the geometrical positional relationships among the positions of the rightmost and leftmost points F2 and F1 of the right eye, those of the rightmost and leftmost points F2 and F1 of the left eye, and those of the nostrils NH, as shown in FIG. 58.

In step S15, the attention-degree-information generating section JB1 uses the luminance information of the image in the outline E of the right eye and that in the outline E of the left eye to detect the central positions EAC of the pupils EA.

In step S16, the attention-degree-information generating section JB1 calculate vectors EV connecting between the central positions EC of the eyeballs EB detected in step S14 and the central positions EAC of the pupils EA detected in step S15, regards the obtained vectors EVs as the lines of sight, and determines the directions in which the vectors EVs are directed, namely, determines the monitor to which the vectors EVs are directed among the monitor devices MD2 to MDn.

With the foregoing flow, the attention-degree-information generating section JB1 detects the lines of sight of the conference participant HM1.

A line M which makes the secondary moment of the set of pixels, such as that of pixels constituting the outline E can be obtained, for example, by the following calculation.

Figure 60:
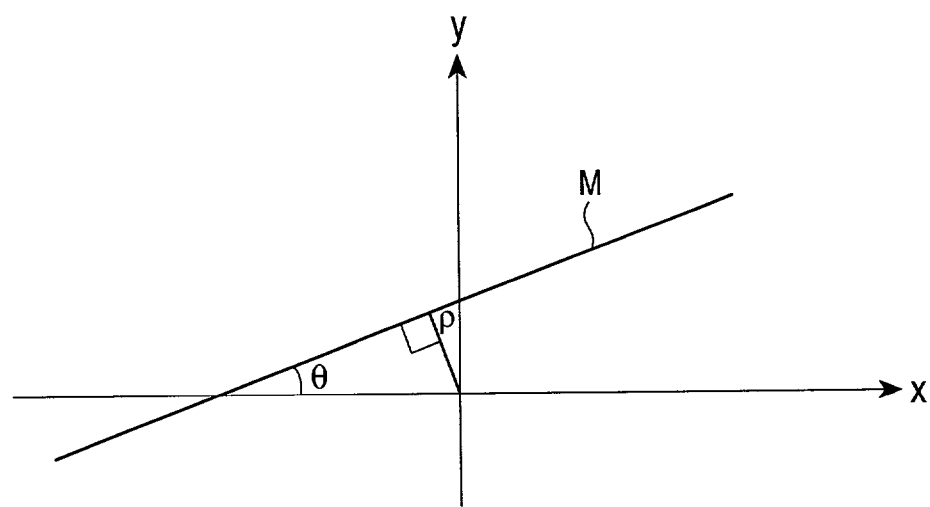
FIG. 60 is a view showing a method for obtaining a line which makes the secondary moment of a predetermined set of pixels minimum, according to the embodiment.

A straight line M indicated by an expression (3), as shown in FIG. 60, will be taken as an example.

$$x \sin \theta - y \cos \theta + \rho = 0 \quad (3)$$

The secondary moment for the straight line M can be indicated by an expression (4) where Ri indicates the distance between the straight line M and each point (xi, yi) of the set of pixels constituting the outline E.

$$m = \sum_i R_i^2 = \sum_i (x_i \sin\theta - y_i \cos\theta + \rho)^2 \quad (4)$$

The straight line M which makes the secondary moment smallest is the straight line M which makes "m" in the expression (4) minimum. To make "m" in the expression (4) minimum, θ and ρ satisfying the following conditions (5) and (6) are used as those in the expression (4).

$$\theta: \sin 2\theta = b \big/ (b^2 + (a-c)^2)^{1/2},$$
$$\cos 2\theta = (a-c) \big/ (b^2 + (a-c)^2)^{1/2} \quad (5)$$

$$\rho: \rho = -x_0 \sin\theta + y_0 \cos\theta \quad (6)$$

The expression (6) ($x_0 \sin \theta + y_0 \cos \theta + \rho = 0$) indicates that the line passes through the center of gravity of the set of pixels.

In the expressions (5) and (6), "a," "b," and "c", are indicated by expressions (7), (8), and (9), respectively. ($x_0$, $y_0$) indicates the coordinates of the center of gravity of the set of pixels.

$$a = \sum_i (x_i - x_0)^2 \quad (7)$$

$$b = 2 \sum_i (x_i - x_0)(y_i - y_0) \quad (8)$$

$$c = \sum_i (y_i - y_0)^2 \quad (9)$$

As a second example of the processing for detecting a direction in which the conference participant HM1 pays attention, to be performed in the attention-degree-information generating section JB1 of the teleconference device TCD1 according to the present embodiment, the detection of the face direction of the conference participant HM1 can be taken, which will be described below.

Figure 61:
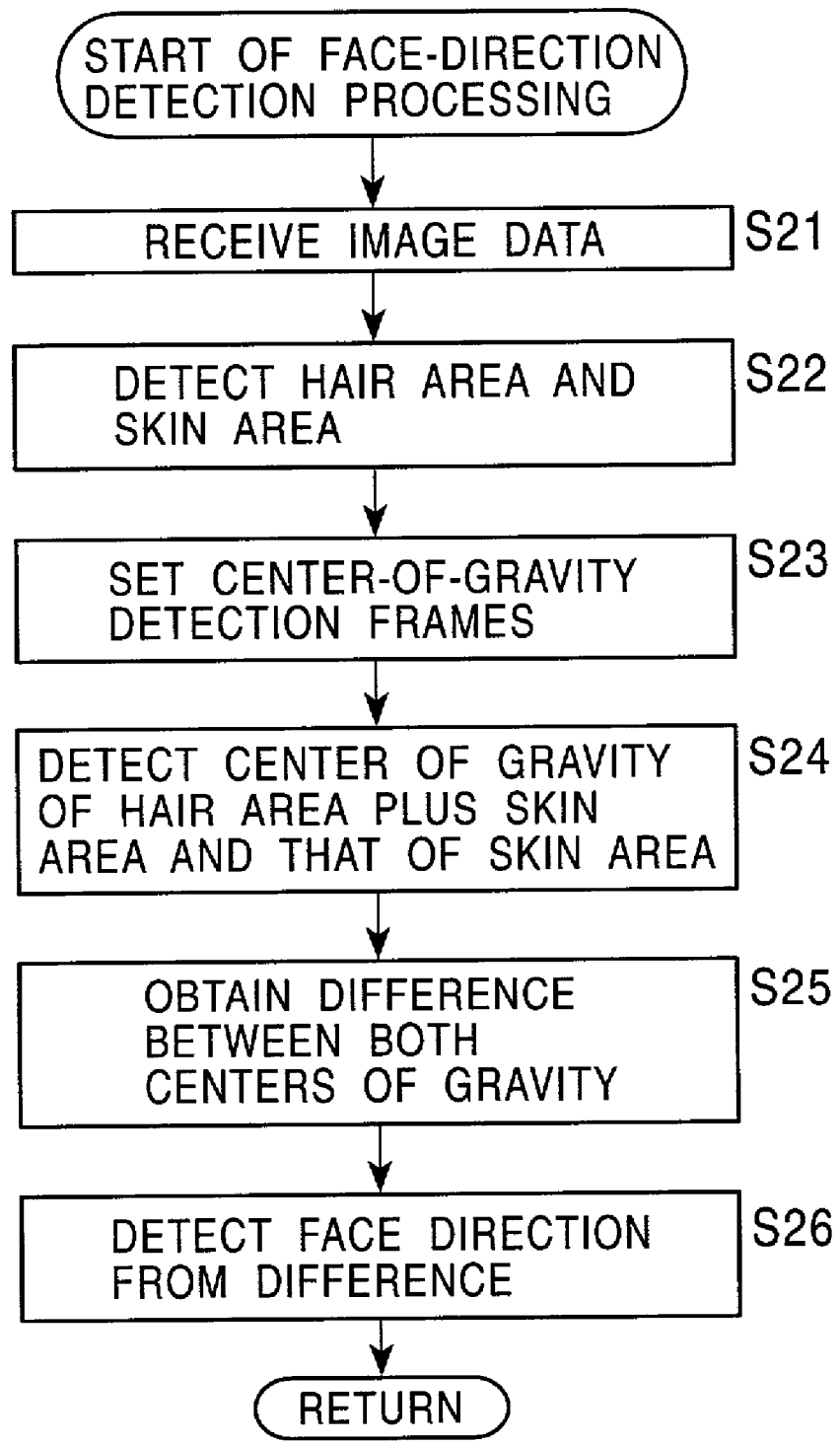
FIG. 61 is a flowchart of processing for detecting a face direction according to the embodiment.

FIG. 61 shows a flowchart of processing for detecting a face direction in the attention-degree-information generating section JB1.

Figure 62A:
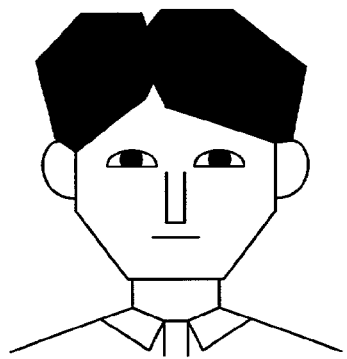
FIG. 62A and FIG. 62B are views showing original images used for detecting a face direction according to the embodiment.
Figure 62B:
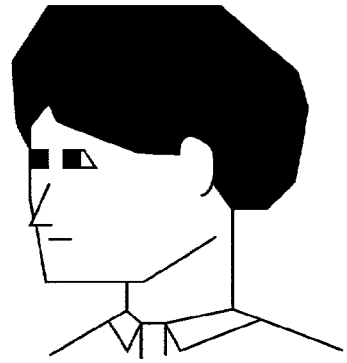
Figure 63A:
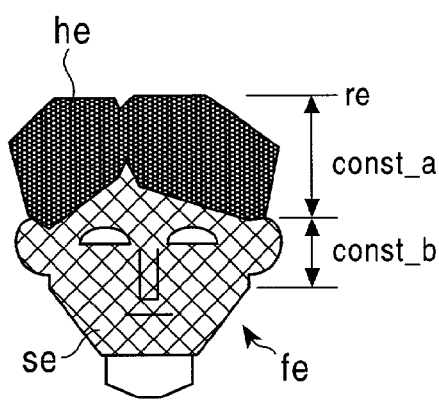
FIG. 63A and FIG. 63B are views showing hair areas and skin areas used for detecting a face direction according to the embodiment.
Figure 63B:
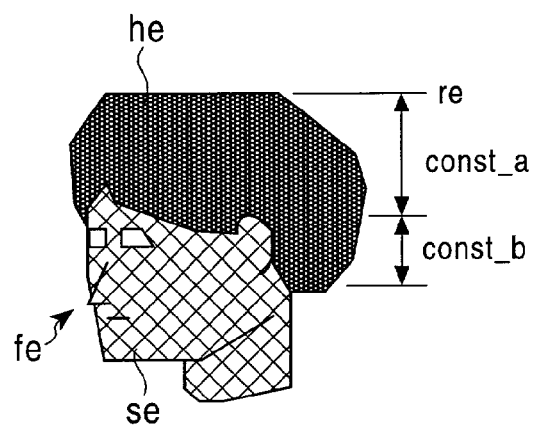

In FIG. 61, the attention-degree-information generating section JB1 receives original image data, such as that shown in FIG. 62A and FIG. 62B, of the face of the conference participant HM1 from the monitor device MDm disposed at the front of the conference participant HM1 in step S21. In the next step S22, the attention-degree-information generating section JB1 uses the color information of the received face images to detect a skin area and a hair area. More specifically, the attention-degree-information generating section JB1 extracts skin-color and hair-color areas by using the color information of the received face images, and detects a skin area "se" and a hair area "he" by the extracted color areas, as shown in FIG. 63A and FIG. 63B.

Figure 64A:
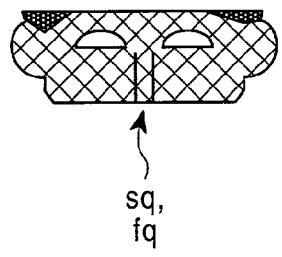
FIG. 64A and FIG. 64B are views showing the centers of gravity of the hair areas and of the skin areas according to the embodiment.
Figure 64B:
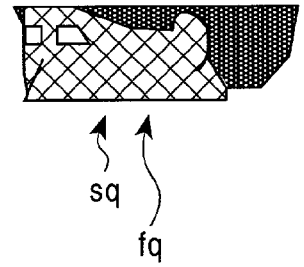

In the next step S23, the attention-degree-information generating section JB1 specifies frames for detecting the center "fg" of gravity of the total area "fe (="se"+"he")" of the skin area "se" and the hair area "he" and the center "sq" of gravity of the skin area "se," as shown in FIG. 64A and FIG. 64B. The frames are specified, for example, by setting zones in the vertical direction in the images. More specifically, for example, the upper end "re" of the total area "fe" of the hair area "he" and the skin area "se" is used as a reference, and a zone is specified between a point a length "const_a" below the upper end "re" and a point a length "const_a"+"const_b" below the upper end "re."

Then, in step S24, the attention-degree-information generating section JB1 obtains the center "fg" of gravity of the total area "fe" of the skin area "se" and the hair area "he" and the center "sq" of gravity of the skin area "se" within the frames specified in step S23. In a subsequent process, both the horizontal components and vertical components of these centers of gravity can be used, or either the horizontal components or the vertical components of the centers of gravity can be used. As an example, a case in which only the horizontal components of the centers of gravity are used is taken, and will be described below.

In step S24, the attention-degree-information generating section JB1 obtains the center "fg" of gravity of the total area "fe" of the skin area "se" and the hair area "he" and the center "sq" of gravity of the skin area "se." In step S25, the attention-degree-information generating section JB1 calculates the difference obtained by subtracting the center "fg" of gravity of the total area "fe" of the skin area "se" and the hair area "he" from the center "sq" of gravity of the skin area "se."

Figure 65:
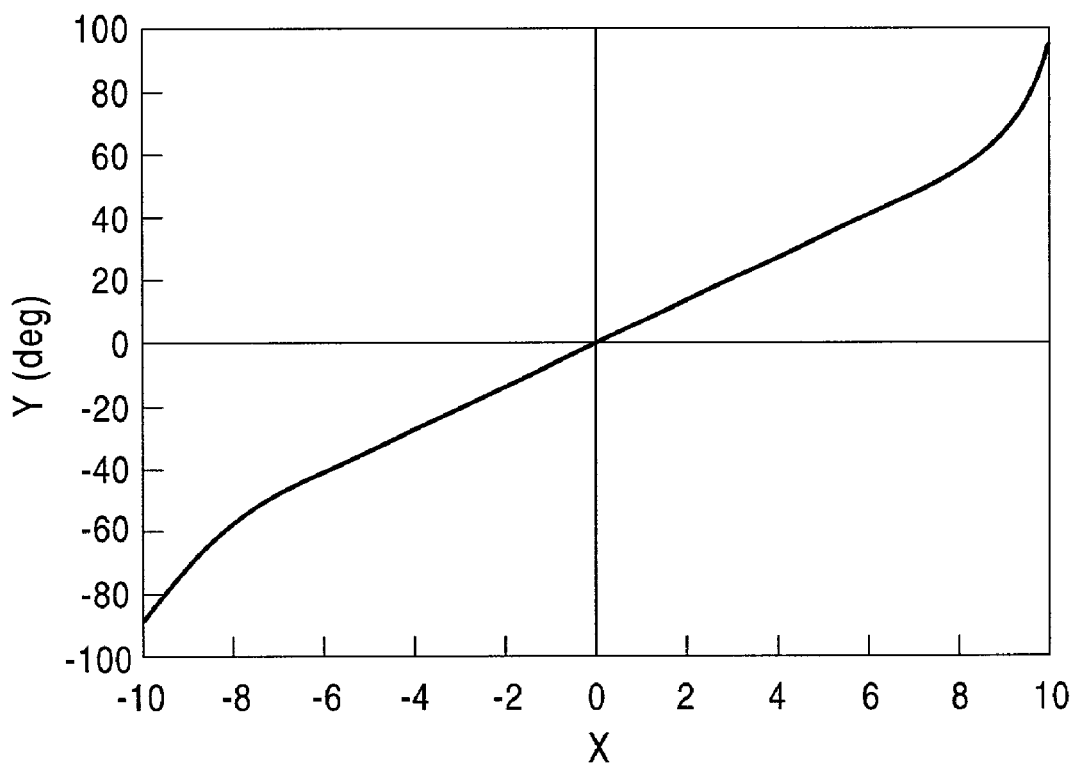
FIG. 65 is a view showing an example relationship between a difference and an angle during face-direction detection according to the embodiment.

Then, in step S26, the attention-degree-information generating section JB1 detects a face direction by using the difference obtained in step S25. More specifically, either of the following two methods are, for example, used to detect a face direction by using the difference. It is assumed that X indicates a difference, Y indicates a face-direction angle, and the angle of the face of the conference participant MH1 is set to 0 degrees when the conference participant HM1 is directed to the camera of the monitor device MDm. In one method used in step S26, prior to face-direction detection processing, data for the difference X and the face-direction angle Y is obtained in advance; the face-direction angle Y corresponding to the difference X is obtained, for example, as the average; their relationship is obtained as shown in FIG. 65; and the face-direction angle Y is obtained from the difference X obtained in step S25, according to the relationship shown in FIG. 65. In another method used in step S26, the face-direction angle Y is obtained from the following expression (10) by using the difference X obtained in step S25.

$$Y = \alpha \sin(X) \tag{10}$$

With the above flow, the attention-degree-information generating section JB1 detects the face direction of the conference participant HM1.

In still another method for detecting the direction in which the conference participant HM1 is directed, for example, an infrared ray is emitted to the face of the conference participant HM1; an infrared ray reflected from the face of the conference participant HM1 is received to form an image; and the face direction is detected from the image.

11. Structure of Monitor Device

Figure 66:
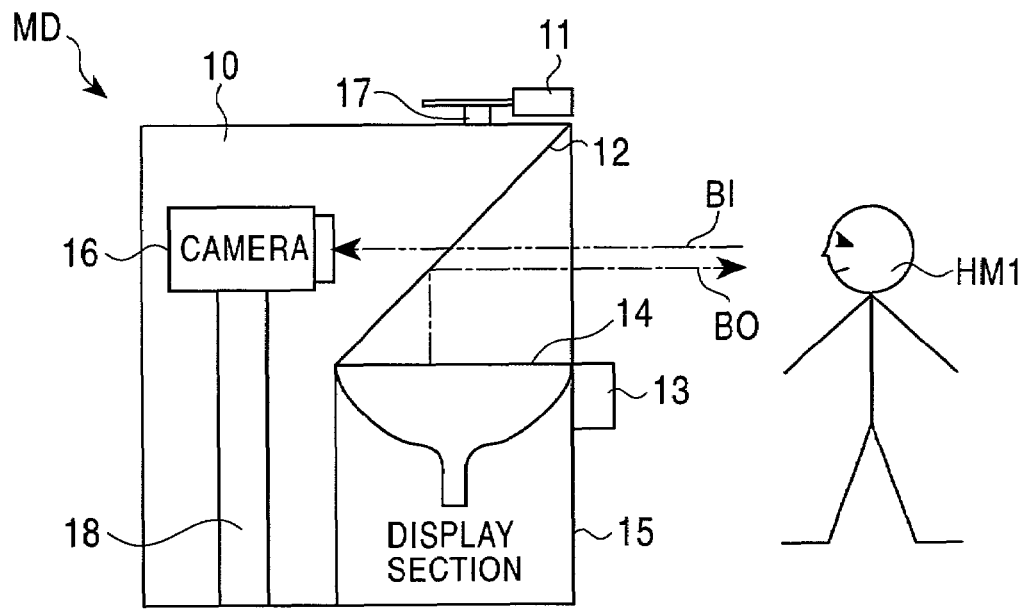
FIG. 66 is an outlined internal view of a specific monitor device, viewed from a side thereof, according to the embodiment.
Figure 67:
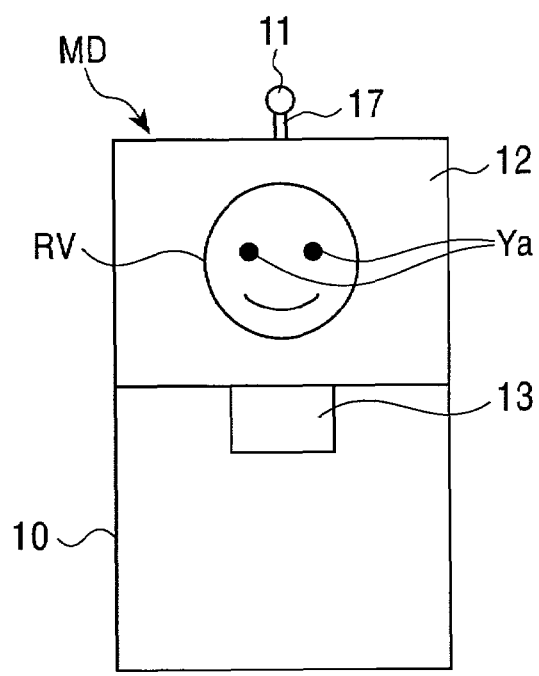
FIG. 67 is an outlined elevation of the specific monitor device according to the embodiment.

An example specific structure of each of the monitor devices MD2 to MDn in the structure shown in FIG. 2 will be described next by referring to FIG. 66 and FIG. 67. FIG. 66 is an outlined internal view of a monitor device MD, viewed from a side. FIG. 67 is an outlined elevation of the monitor device MD.

In the following description, for simplicity, a case is taken as an example, in which information related to conference participants HM1 to HMn is displayed on monitor devices MD1 to MDn in teleconference devices TCD1 to TCDn.

In the present embodiment, each of the monitor devices MD2 to MDn is provided, as shown in FIG. 66 and FIG. 67, with a cabinet 10; a speaker 13 disposed at the front (front of the monitor device MD) of the cabinet 10; a display section 15 disposed such that a screen 14 is directed in a predetermined direction (upper direction in the case shown in FIG. 66); a half mirror 12 for reflecting light emitted from the screen 14 of the display section 15 towards the front of the monitor device MD along a one-dot chain line BO in the figure and for passing light incident from the front of the monitor device MD along a two-dot chain line BI in the figure; and a camera 16 (such as a video camera) supported by a supporting section 18 behind the half mirror 12. On the upper surface of the cabinet 10 in the monitor device MD, for example, a microphone 11 supported by a supporting section 17 is also provided.

The microphone 11 may be provided, for example, only for the monitor device (monitor device MDm in the case shown in FIG. 2) disposed at the front of the conference participant HM1 among the monitor devices MD2 to MDn.

The camera 16 of each of the monitor devices MD2 to MDn receives incident light (such as an optical image of the conference participant HM1) passing through the half mirror 12 along the two-dot chain line BI in FIG. 66, and converts it to image data. The image data output from the camera 16 is sent to the information transmitting and receiving section TRB1 of the signal processing device SPD1, and then sent to the teleconference devices TCD2 to TCDn through the communication network NT. The image data output from the camera 16, for example, of the monitor device MDm disposed at the front of the conference participant HM1 among the monitor devices MD2 to MDn is also sent to the attention-degree-information generating section JB1 of the signal processing device SPD1 and is used for detecting lines of sight or a face direction when attention-degree information is generated, as described above.

The microphone 11 of each of the monitor devices MD2 to MDn converts sound, such as surrounding sound of the teleconference device TCD1 and what the conference participant HM1 says, to audio data. The audio data output from the microphone 11 is sent to the information transmitting and receiving section TRB1 of the signal processing device SPD1, and then, sent to the teleconference device TCD2 to TCDn through the communication network NT.

On the screen 14 of the display section 15 in the monitor device MD2 among the monitor devices MD2 to MDn, an image based on image data (that of the conference participant HM2 and the surroundings) captured by the camera 16 of the monitor device MD1 provided correspondingly to the conference participant HM1 in the teleconference device TCD2 and sent through the communication network NT is displayed. From the speaker 13 of the monitor device MD2, sound based on audio data (that of what the conference participant HM2 says) captured by the microphone 11 of the monitor device MD1 provided correspondingly to the conference participant HM1 in the teleconference device TCD2 and sent through the communication network NT is reproduced. In the same way, on the screen 14 of the display section 15 in the monitor device MD3, an image based on image data captured by the camera 16 of the monitor device MD1 provided correspondingly to the conference participant HM1 in the teleconference device TCD3 and sent through the communication network NT is displayed. From the speaker 13 of the monitor device MD3, sound based on audio data captured by the microphone 11 of the monitor device MD1 provided correspondingly to the conference participant HM1 in the teleconference device TCD3 and sent through the communication network NT is emitted. The situation is the same for the other monitor devices MD. An image sent from the corresponding teleconference device is displayed and sound is emitted.

In each of the monitor devices MD2 to MDn in the present embodiment, as shown in FIG. 66, since light emitted from the screen 14 of the display section 15 is reflected by the half mirror 12 in the direction indicated by the one-dot chain line BO towards the conference participant HM1, a face image and the like of the conference participant HM located at the other side is displayed on the screen 14 of the display section 15 as a mirror image, which is reflected by the half mirror 12 to be in a correct state. In FIG. 67, RV indicates an image (a virtual image of the conference participant HM at the other side) obtained when a mirror image of the conference participant HM located at the other side, displayed on the screen 14 of the display section 15 is reflected by the half mirror 12.

When a mirror image of the conference participant at the other side is displayed on the screen 14 of the display section 15 in a monitor device MD in the present embodiment, the positions of the eyes in the virtual image, which are optically conjugate with those of the eyes in the mirror image are displayed so as to almost match the principal point of the lens of the camera 16 through the half mirror 12. Therefore, the lines of sight of the conference participant HM1 and those of the conference participant at the other side match.

More specifically, a case in which the conference participant HM1 sees the monitor MDm (an image of the conference participant HMm) in the teleconference device TCD1 and the conference participant HMm sees the monitor device MD1 (an image of the conference participant HM1) in a the teleconference device TCDm is taken as an example and will be described. In this case, a mirror image of the face or the like of the conference participant HMm is displayed on the screen 14 of the display section 15 in the monitor device MDm in the teleconference device TCD1; and the camera 16 of the monitor device MDm captures an image of the conference participant HM1 who is directed to the monitor device MDm and sends image data to the teleconference device TCDm and others. A mirror image of the face or the like of the conference participant HM1 is displayed on the screen 14 of the display section 15 in the monitor device MD1 in the teleconference device TCDm; and the camera 16 of the monitor device MD1 captures an image of the conference participant HMm who is directed to the monitor device MD1 and sends image data to the teleconference device TCD1 and others.

In this condition, at the teleconference device TCD1, when a mirror image of the conference participant HMm at the other side is displayed on the screen 14 of the display section 15 in the monitor device MDm, the positions of the eyes in the virtual image, which are optically conjugate with those of the eyes in the mirror image are displayed so as to almost match the principal point of the lens of the camera 16. At the same time, at the teleconference device TCDm, when a mirror image of the conference participant HM1 at the other side is displayed on the screen 14 of the display section 15 in the monitor device MD1, the positions of the eyes in the virtual image, which are optically conjugate with those of the eyes in the mirror image are displayed so as to almost match the principal point of the lens of the camera 16. Therefore, at the teleconference device TCD1, the lines of sight of the conference participant HM1 match those of the virtual image of the conference participant HMm at the other side. At the teleconference device TCDm, the lines of sight of the conference participant HMm match those of the virtual image of the conference participant HM1 at the other side.

In general conventional teleconference systems, conference participants do not see virtual images made by half mirrors but directly see images (real images) displayed on the screens of display sections. In addition, cameras are disposed above or below, or at the right or left of the screens of the display sections in their vicinities. Therefore, in general conventional teleconference systems, the lines of sight of conference participants are directed to images (real images) displayed on the screens of the display sections, and are not directed to the lenses of the cameras. Consequently, the lines of sight of the conference participant at the other side, displayed on the screen of a display section does not seem to be directed to you. Unlike the present embodiment, it is impossible to perform conversation while the lines of your sight match those of the conference participant at the other side.

In contrast, in the teleconference system according to the present embodiment, when the monitor device of each teleconference device TCD has the structure shown in FIG. 66 and FIG. 67, a conference participant can perform conversation with the conference participant at the other side while they see their eyes each other, namely, the lines of their sight match.

In the present embodiment, when a plurality of monitor devices MD in a teleconference device TCD are disposed, as shown in FIG. 2, as if the conference participants HM2 to HMn located at the teleconference devices TCD2 to TCDn and the conference participant HM1 sat around a table, namely, when the plurality of monitor devices are disposed such that the relative positional relationships among the conference participants HM2 to HMn at the places where the teleconference devices TCD2 to TCDn are disposed are maintained, not only the lines of sight match between the conference participant HM1 and the conference participant at the other side, but also the conference participant HM1 understands whom the other conference participants HM are directed to.

12. Example Structure of Each Device

Figure 68:
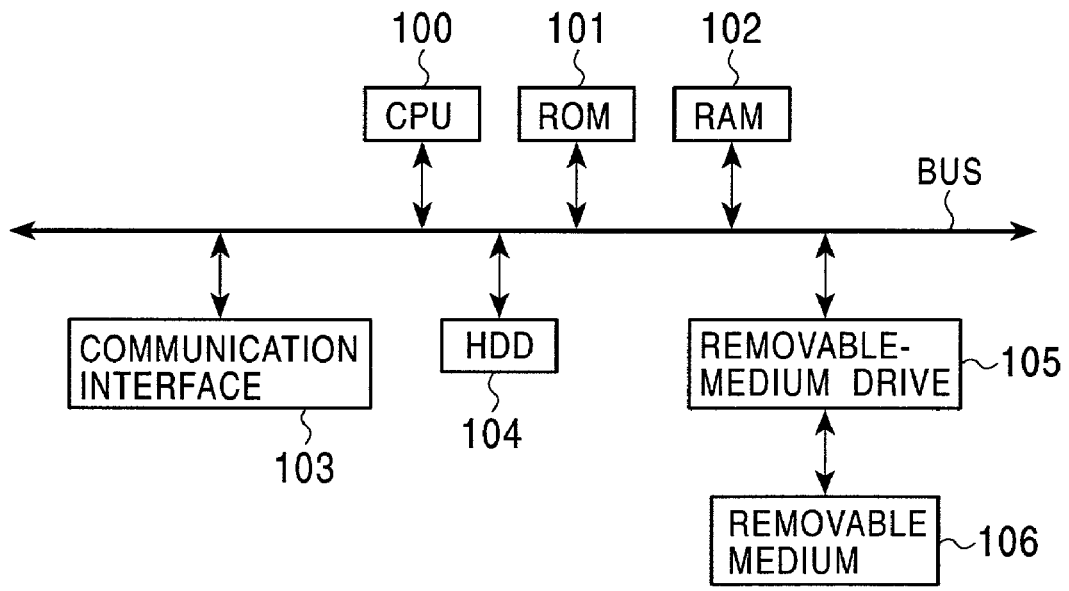
FIG. 68 is a block diagram of an actual structure implementing a signal processing device and a seating-order determination device in each teleconference device in the teleconference system according to the embodiment.

FIG. 68 shows an actual example device structure which can be used for the signal processing device SPD of each teleconference device TCD or the seating-order determination device GJD, in a teleconference system according to an embodiment of the present invention. These devices can be implemented, for example, by personal computers. The group-determination-table generating device like that shown in FIG. 47 can also be implemented by the following device structure.

The structure shown in FIG. 68 includes a CPU 100 for controlling each section; a ROM 101 for storing basic input and output systems (BIOS) and various initial values; a RAM 102 for tentatively storing various programs, data, and data obtained during calculation; a hard-disk drive (HDD) 104 for driving a hard disk for storing an operating system (OS), various application programs (computer programs), and other data; a removable-medium drive 105 for driving a removable medium 106, such as a CD-ROM, a CD-R, a CD-RW, a DVD-ROM, a DVD-RAM, a DVD-R, a DVD-RW, a removable hard disk, and a semiconductor memory; and a communication interface section 103 for connecting to an external communication network (the communication network NT), such as an ISDN, a commercial telephone line, a cable-TV line, and a digital communication-satellite line, and for connecting to an external bus, such as that conforming to the IEEE-1394 standard or a USB, and to various external connection terminals.

The structure shown in FIG. 68 can further include, for example, an input operation device, such as a mouse or a keyboard, operated-by the user and a monitor for displaying information, although they are not shown.

An application program for implementing the functions of the signal processing device SPD in the teleconference system according to the present embodiment described above, especially the attention-degree-information generating function in the attention-degree-information generating section JB1 and the information manipulation and distribution function in the information manipulation and distribution section PB, or the group determination processing, the seating-order determination processing, and the seating-order-information generating function is provided by the removable medium 106 or by communication through the communication interface section 103.

The application program provided by the removable medium 106 or by the communication interface section 103 is stored in the hard disk of the HDD 104, is read from the hard disk of the HDD 104, and tentatively stored in the RAM 102. The CPU 100 executes various operations in the teleconference system according to the present embodiment according to the application program tentatively stored in the RAM 102.

Figure 69:
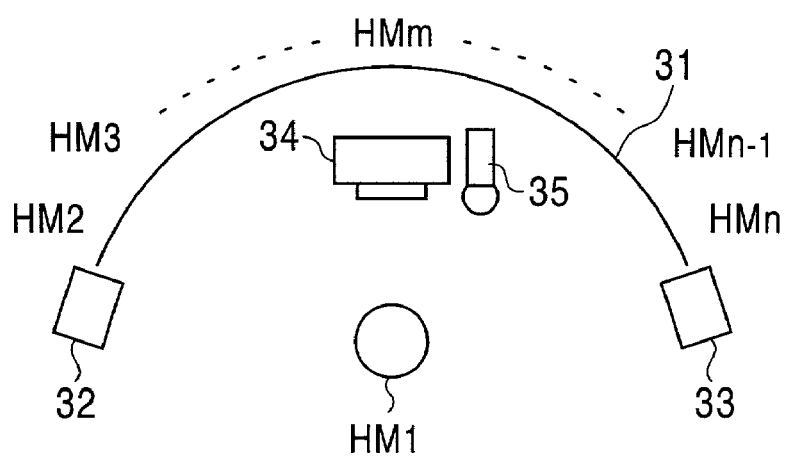
FIG. 69 is a view showing an outlined structure of another teleconference device which displays conference participants on a screen and disposes sound images by speakers according to the embodiment.

FIG. 69 shows another example structure of the teleconference device TCD1.

In the example structure shown in FIG. 69, as display means for displaying images of conference participants HM2 to HMn in teleconference devices TCD2 to TCDn, the monitor devices MD2 to MDn, such as those shown in FIG. 2, corresponding to the teleconference devices TCD2 to TCDn (the conference participants HM2 to HMn) are not provided, but, for example, one bent screen 31 is provided and images are displayed on the screen 31, for example, by a projector.

In the example structure shown in FIG. 69, images of the conference participants HM2 to HMn are displayed on the screen 31 as if the conference participant HM1 and the other conference participants HM2 to HMn sat around a table for a conference.

A camera 34 and a microphone 35 are disposed, for example, at the front of the conference participant HM1.

Image data of the conference participant HM1, captured by the camera 34 and audio data of the conference participant HM1, captured by the microphone 35 are sent to the other teleconference devices TCD2 to TCDn through the communication network NT. In the example structure shown in FIG. 69, the image data of the conference participant HM1, captured by the camera 34 is also sent to the attention-degree-information generating section JB1 of the signal processing device SPD1.

Audio data of conference participants HM2 to HMn, sent from the other teleconference devices TCD2 to TCDn are controlled such that individual sound images are formed in the vicinities of images of the conference participants HM2 to HMn, displayed on the screen 31, and are sent to speakers 32 and 33 disposed at the right and left of the screen 31 and emitted. With this control, the positions of images of the conference participants HM2 to HMn, displayed on the screen 31 almost match those of locations where the voices (sound) of the conference participants HM2 to HMn are heard.

In the present embodiment, the attention-degree-information generating section JB is disposed in each of the signal processing devices SPD1 to SPDn of the teleconference devices TCD1 to TCDn. On attention-degree-information generating section JB may be independently provided on the communication network NT.

In the present embodiment, as shown in FIG. 2, the monitor devices MD2 to MDn are separated from the signal processing device SPD1. Each or one of the monitor devices MD2 to MDn can have the function of the signal processing device.

In the present embodiment, as shown in FIG. 1, the seating-order determination device GJD is independently connected to the communication network NT. Each or one of the teleconference devices TCD1 to TCDn can have the function of the seating-order determination device.

In the present embodiment, as examples for detecting a direction, the lines of sight and a face direction are separately detected. They can be detected at the same time.

In the present embodiment, one conference participant belongs to only one group at each point of time. It is also possible that a plurality of groups is defined, such as a group to which a conference participant mainly belongs and a group in which a conference participant does not give opinions but from which the conference participant wants to obtain information; each conference participant is allowed to belong to a plurality of groups; and a seating order is determined according to which group each of the conference participants at the other sides belongs to.

As described above, according to the teleconference system of the present embodiment, even when a plurality of conference participants say at the same time, it is easier for a conference participant to listen to a speech in a group which the conference participant belongs to, and it is also easier to see images. Therefore, the teleconference system provides each conference participant with comfort and satisfaction with information.

What is claimed is:

1. A communication system comprising:
    at least three communication devices, and
    a seating-order determination device for generating seating-order information at each point of time for information sent from each communication device and for transmitting the seating-order information to each communication device,
    wherein the seating-order determination device groups the information sent from each communication device according to the degree of attention which each user pays to the information sent from each communication device, and generates the seating-order information according to the result of grouping.

2. A communication system according to claim 1, wherein the seating-order determination device generates the seating-order information at each point of time for information sent from the at least three communication devices, according to the degree of attention which the user of each communication device pays to the information sent from each communication device.

3. A communication system according to claim 2, wherein the degree of attention is determined according to user-behavior detection information or information specified by the user.

4. A communication system according to claim 3, wherein the user-behavior detection information includes user-sight-line detection information.

5. A communication system according to claim 3, wherein the user-behavior detection information includes user-face-direction detection information.

6. A communication system according to claim 1, wherein the seating-order information is generated such that information belonging to the same group is arranged.

7. A communication system according to claim 1, wherein the seating-order information is generated such that information belonging to the same group is dispersed almost uniformly.

8. A communication system according to claim 1,
    wherein each communication device controls the output position of the information sent from other communication devices, according to the seating-order information to output the information sent from the other communication devices in a seating order corresponding to the seating-order information, and
    when the seating order is changed according to the seating order information, each communication device outputs indication information indicating a change in the seating order to the user.

9. A communication system according to claim 8, wherein the indication information is image information.

10. A communication system according to claim 8, wherein the indication information is audio information.

11. A communication system according to claim 8, wherein the indication information includes image information and audio information.

12. A communication system according to claim 1,
    wherein each communication device controls the output position of the information sent from other communication devices, according to the seating-order information to output the information sent from the other communication devices in a seating order corresponding to the seating-order information, and
    each communication device outputs indication information indicating the state of grouping to the user.

13. A communication system according to claim 12, wherein the indication information is background image information obtained when the information sent from the other communication devices is output.

14. A communication system according to claim 13, wherein the background image information is generated such that information belonging to the same group has the same background color.

15. A communication system according to claim 1, wherein the grouping is performed according to the statistical relationship between a group structure and the degree of attention which the user of each communication device pays to the information sent from the other communication devices.

16. A seating-order determination device provided for a communication system having at least three communication devices, comprising:
 seating-order-information generating means for generating seating-order information at each point of time for information sent from each communication device;
 transmitting means for sequentially transmitting the seating-order information generated by the seating-order-information generating means to each communication device; and
 receiving means for receiving attention-degree information indicating the degree of attention which the user of each communication device pays to the information sent from each communication device,
 wherein the seating-order-information generating means groups the information sent from each communication device according to the attention-degree information received by the receiving means, and generates the seating-order information according to the result of grouping.

17. A seating-order determination device according to claim 16,
 wherein the seating-order-information generating means generates the seating-order information according to the attention-degree information received by the receiving means.

18. A seating-order determination device according to claim 17, wherein the degree of attention is determined according to user-behavior detection information or information specified by the user.

19. A seating-order determination device according to claim 18, wherein the user-behavior detection information includes user-sight-line detection information.

20. A seating-order determination device according to claim 18, wherein the user-behavior detection information includes user-face-direction detection information.

21. A seating-order determination device according to claim 16, wherein the seating-order-information generating means generates the seating-order information such that information belonging to the same group is arranged.

22. A seating-order determination device according to claim 16, wherein the seating-order-information generating means generates the seating-order information such that information belonging to the same group is dispersed almost uniformly.

23. A seating-order determination device according to claim 16, wherein the grouping is performed according to the statistical relationship between a group structure and the degree of attention which the user of each communication device pays to the information sent from the other communication devices.

24. A communication device in a communication system including at least three communication devices communicating with each other, comprising:
 receiving means for receiving information and seating-order information sent from other communication devices;
 attention-degree-information generating means for detecting the degree of attention which the user pays to the information sent from the other communication devices to generate attention-degree information;
 transmitting means for transmitting the attention-degree information generated by the attention-degree-information generating means;
 presenting means for presenting the information sent from the other communication devices; and
 information manipulation and distribution means for controlling the output positions of the information sent from the other communication devices according to the seating-order information received by the receiving means to output the information sent from the other communication devices in a seating order corresponding to the seating-order information,
 wherein the information manipulation and distribution means outputs indication information indicating a state of grouping, which is a basis of the seating information, applied to the information sent from the other communication devices, to the user.

25. A communication device according to claim 24, wherein, when the seating order is changed according to the seating-order information, the information manipulation and distribution means outputs indication information indicating a change in the seating order to the user.

26. A communication device according to claim 25, wherein the indication information is image information.

27. A communication device according to claim 25, wherein the indication information is audio information.

28. A communication device according to claim 25, wherein the indication information includes image information and audio information.

29. A communication device according to claim 24, wherein the indication information is background image information obtained when the information sent from the other communication devices is output.

30. A communication device according to claim 29, wherein the background image information is generated such that information belonging to the same group has the same background color.

31. A communication device according to claim 24, wherein the attention-degree-information generating means generates the attention-degree information according to user-behavior detection information or information specified by the user.

32. A communication device according to claim 31, wherein the user-behavior detection information includes user-sight-line detection information.

33. A communication device according to claim 31, wherein the user-behavior detection information includes user-face-direction detection information.

34. A communication method for a communication system having at least three communication devices, comprising:
 a seating-order generating step of generating seating-order information at each point of time for information sent from each communication device;
 a transmitting step of sequentially transmitting the seating-order information generated in the seating-order generating step to each communication device; and
 receiving step of receiving attention-degree information indicating the degree of attention which the user of each communication device pays to the information sent from each communication device,
 wherein the seating-order generating step groups the information sent from each communication device according to the attention-degree information received at the receiving step, and generates the seating-order information according to the result of grouping.

35. A seating-order determination method for a seating-order determination device provided for a communication system having at least three communication devices, comprising:

a seating-order-information generating step of generating seating-order information at each point of time for information sent from each communication device;

a transmitting step of sequentially transmitting the seating-order information generated in the seating-order-information generating step to each communication device; and a receiving step of receiving attention-degree information indicating the degree of attention which the user of each communication device pays to the information sent from each communication device, wherein, in the seating-order-information generating step, the information sent from each communication device is grouped according to the attention-degree information received in the receiving step, and the seating-order information is generated according to the result of grouping.

36. A seating-order determination method according to claim 35, wherein, in the seating-order-information generating step, the seating-order information is generated according to the attention-degree information received in the receiving step.

37. A seating-order determination method according to claim 36, wherein the degree of attention is determined according to user-behavior detection information or information specified by the user.

38. A seating-order determination method according to claim 37, wherein the user-behavior detection information includes user-sight-line detection information.

39. A seating-order determination method according to claim 37, wherein the user-behavior detection information includes user-face-direction detection information.

40. A seating-order determination method according to claim 35, wherein, in the seating-order-information generating step, the seating-order information is generated such that information belonging to the same group is arranged.

41. A seating-order determination method according to claim 35, wherein, in the seating-order-information generating step, the seating-order information is generated such that information belonging to the same group is dispersed almost uniformly.

42. A seating-order determination method according to claim 35, wherein the grouping is performed according to the statistical relationship between a group structure and the degree of attention which the user of each communication device pays to the information sent from the other communication devices.

43. A communication method for a communication device in a communication system including at least three communication devices communicating with each other, comprising:

a receiving step of receiving information and seating-order information sent from other communication devices;

an attention-degree-information generating step of detecting the degree of attention which the user pays to the information sent from the other communication devices to generate attention-degree information;

a transmitting step of transmitting the attention-degree information generated in the attention-degree-information generating step;

a presenting step of presenting the information sent from the other communication devices; and an information manipulation and distribution step of controlling the output positions of the information sent from the other communication devices according to the seating-order information received in the receiving step to output the information sent from the other communication devices in a seating order corresponding to the seating-order information, wherein indication information indicating a state of grouping, which is a basis of the seating information, applied to the information sent from the other communication devices is output to the user in the information manipulation and distribution step.

44. A communication method according to claim 43, wherein, when the seating order is changed according to the seating-order information, indication information indicating a change in the seating order is output to the user in the information manipulation and distribution step.

45. A communication method according to claim 44, wherein the indication information is image information.

46. A communication method according to claim 44, wherein the indication information is audio information.

47. A communication method according to claim 44, wherein the indication information includes image information and audio information.

48. A communication method according to claim 43, wherein the indication information is background image information obtained when the information sent from the other communication devices is output.

49. A communication method according to claim 43, wherein the background image information is generated such that information belonging to the same group has the same background color.

50. A communication method according to claim 43, wherein, in the attention-degree-information generating step, the attention-degree information is generated according to user-behavior detection information or information specified by the user.

51. A communication method according to claim 50, wherein the user-behavior detection information includes user-sight-line detection information.

52. A communication method according to claim 50, wherein the user-behavior detection information includes user-face-direction detection information.

53. A recording medium for storing a processing program related to seating information for information sent from each communication device in a communication system having at least three communication devices, the processing program comprising:

a seating-order generating step of generating seating-order information at each point of time for information sent from each communication device;

a transmitting step of sequentially transmitting the seating-order information generated in the seating-order generating step to each communication; and receiving step of receiving attention-degree information indicating the degree of attention which the user of each communication device pays to the information sent from each communication device, wherein the seating-order generating step groups the information sent from each communication device according to the attention-degree information received at the receiving step, and generates the seating-order information according to the result of grouping.

54. A recording medium for storing a processing program related to seating-order determination in a seating-order determination device provided for a communication system having at least three communication devices, the processing program comprising:

a seating-order-information generating step of generating seating-order information at each point of time for information sent from each communication device;

a transmitting step of sequentially transmitting the seating-order information generated in the seating-order-information generating step to each communication device;

a receiving step of receiving attention-degree information indicating the degree of attention which the user of each communication device pays to the information sent from each communication device; and in the seating-order-information generating step, the information sent from each communication device is grouped according to the attention-degree information received in the receiving step, and the seating-order information is generated according to the result of grouping.

55. A recording medium according to claim 54, wherein in the seating-order-information generating step, the seating-order information is generated according to the attention-degree information received in the receiving step.

56. A recording medium according to claim 55, wherein the degree of attention is determined according to user-behavior detection information or information specified by the user.

57. A recording medium according to claim 56, wherein the user-behavior detection information includes user-sight-line detection information.

58. A recording medium according to claim 56, wherein the user-behavior detection information includes user-face-direction detection information.

59. A recording medium according to claim 54, wherein, in the seating-order-information generating step, the seating-order information is generated such that information belonging to the same group is arranged.

60. A recording medium according to claim 54, wherein, in the seating-order-information generating step, the seating-order information is generated such that information belonging to the same group is dispersed almost uniformly.

61. A recording medium according to claim 54, wherein the grouping is performed according to the statistical relationship between a group structure and the degree of attention which the user of each communication device pays to the information sent from the other communication devices.

62. A recording medium for storing a processing program related to communication in a communication device of a communication system including at least three communication devices communicating with each other, the processing program comprising:

a receiving step of receiving information and seating-order information sent from other communication devices;

an attention-degree-information generating step of detecting the degree of attention which the user pays to the information sent from the other communication devices to generate attention-degree information;

a transmitting step of transmitting the attention-degree information generated in the attention-degree-information generating step;

a presenting step of presenting the information sent from the other communication devices; and an information manipulation and distribution step of controlling the output positions of the information sent from the other communication devices according to the seating-order information received in the receiving step to output the information sent from the other communication devices in a seating order corresponding to the seating-order information, wherein indication information indicating a state of grouping, which is a basis of the seating information, applied to the information sent from the other communication devices is output to the user in the information manipulation and distribution step.

63. A recording medium according to claim 62, wherein, when the seating order is changed according to the seating-order information, indication information indicating a change in the seating order is output to the user in the information manipulation and distribution step.

64. A recording medium according to claim 63, wherein the indication information is image information.

65. A recording medium according to claim 63, wherein the indication information is audio information.

66. A recording medium according to claim 63, wherein the indication information includes image information and audio information.

67. A recording medium according to claim 62, wherein the indication information is background image information obtained when the information sent from the other communication devices is output.

68. A recording medium according to claim 67, wherein the background image information is generated such that information belonging to the same group has the same background color.

69. A recording medium according to claim 62, wherein, in the attention-degree-information gene rating step, the attention-degree information is generated according to user-behavior detection information or information specified by the user.

70. A recording medium according to claim 69, wherein the user-behavior detection information includes user-sight-line detection information.

71. A recording medium according to claim 69, wherein the user-behavior detection information includes user-face-direction detection information.

* * * * *